INVENTOR.
ANTHONY C. PALATINUS

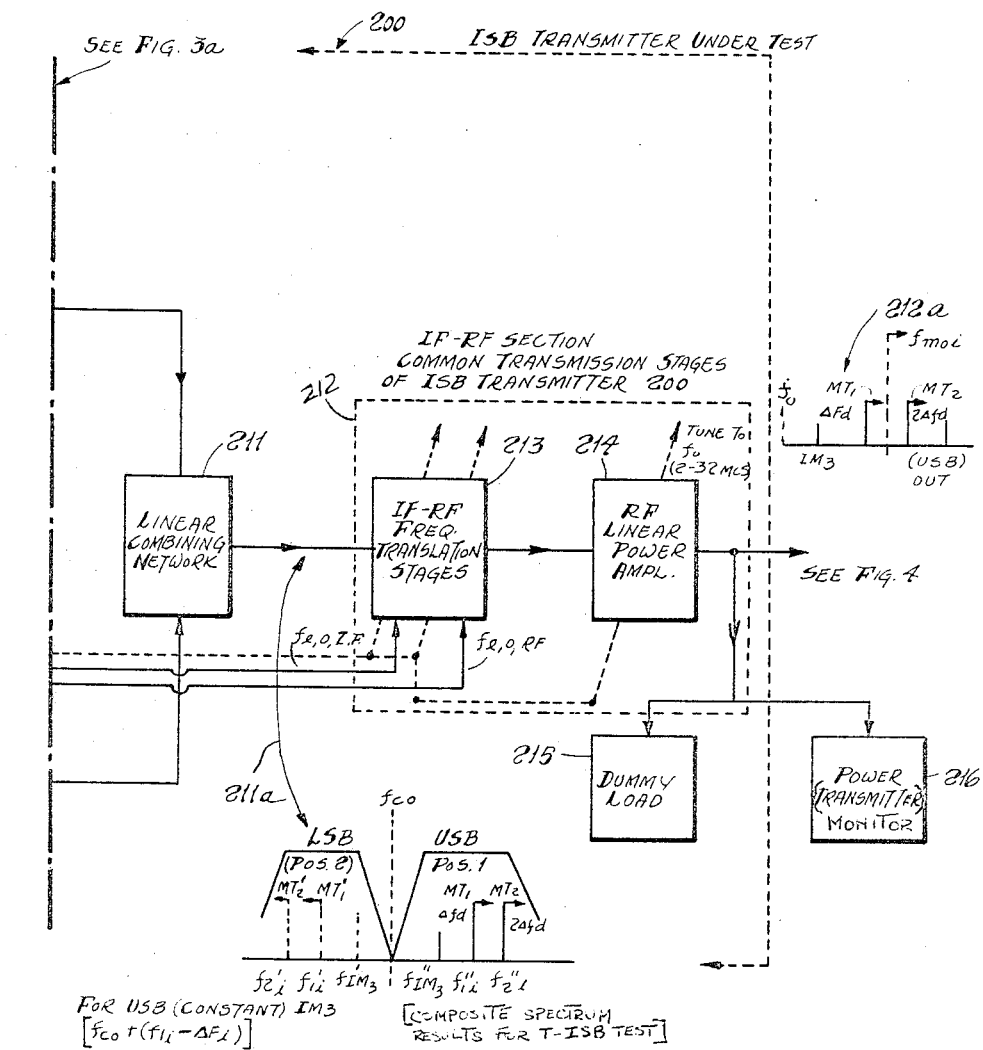

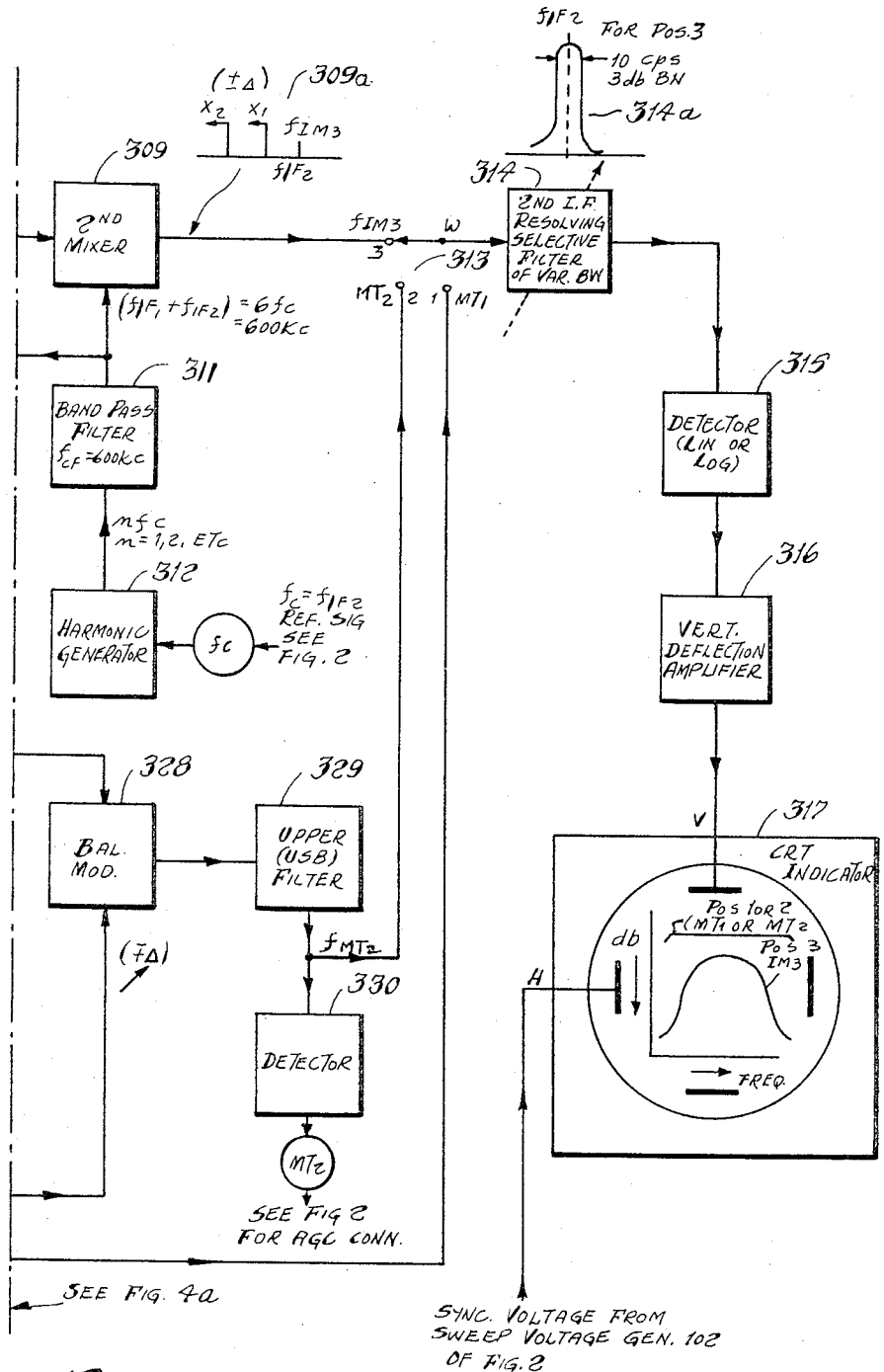

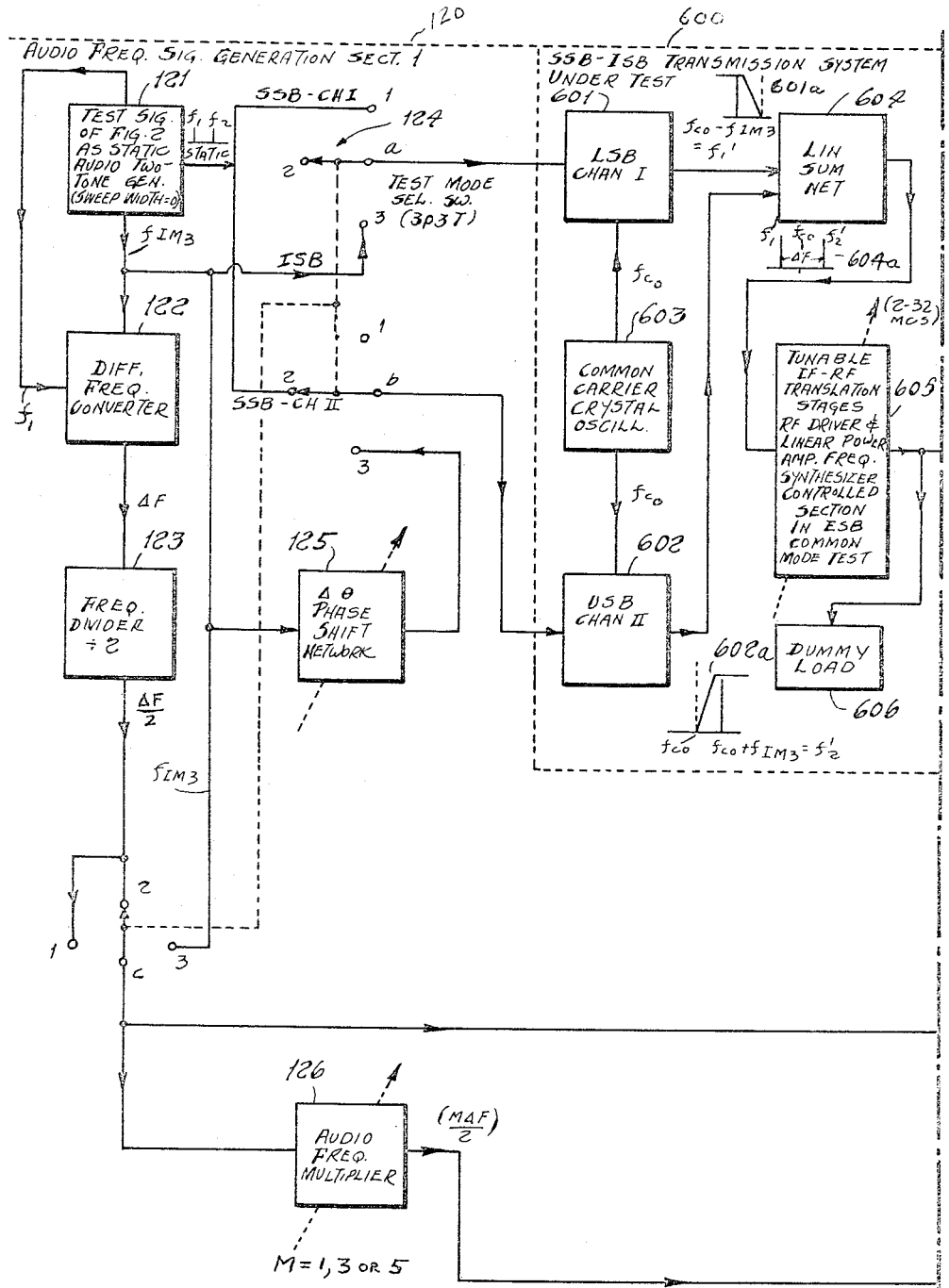

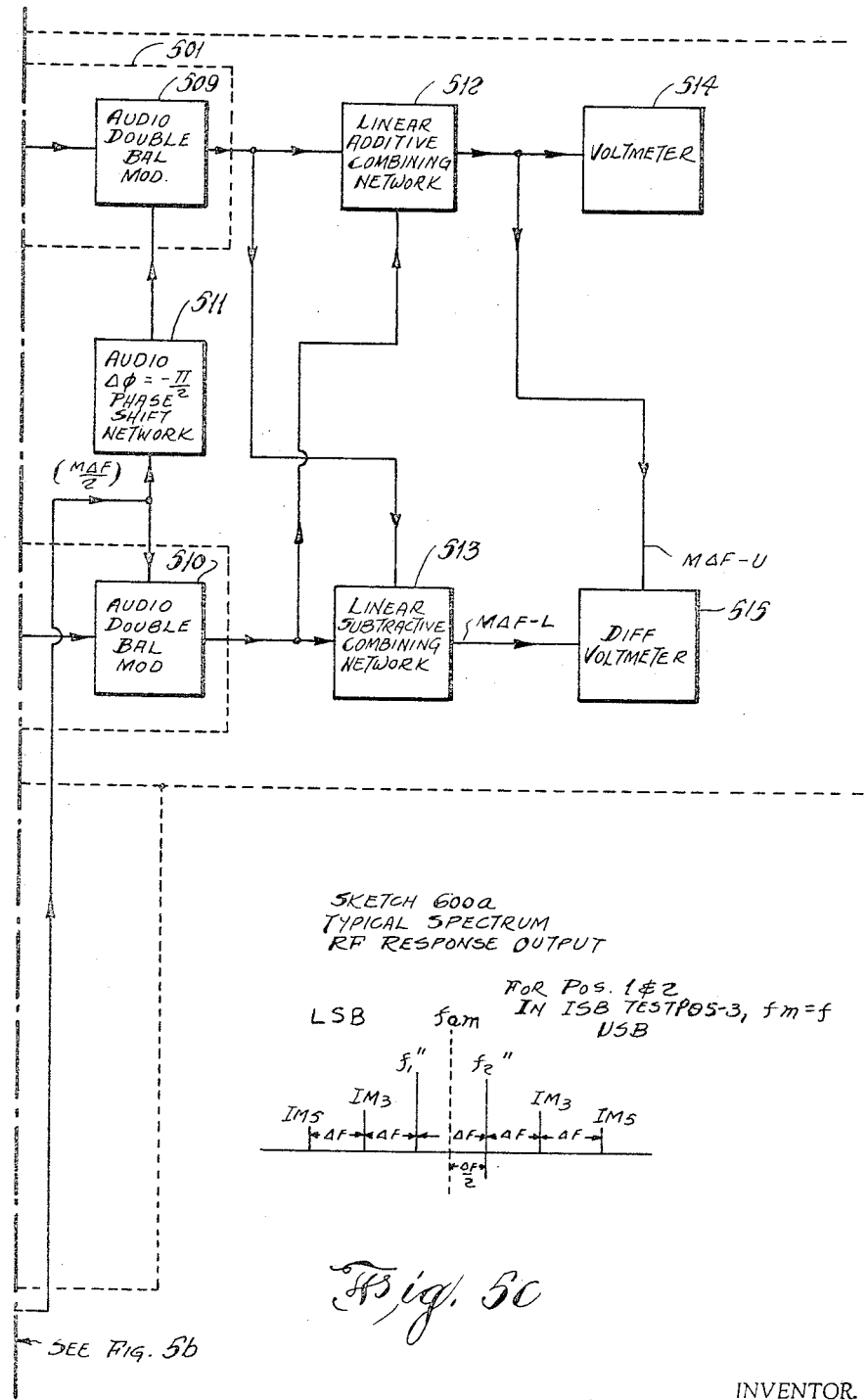

INVENTOR.
ANTHONY C. PALATINUS

United States Patent Office 3,337,804
Patented Aug. 22, 1967

3,337,804
TOTAL INDEPENDENT SIDE-BAND SIGNAL TEST
AND RESPONSE ANALYSIS SYSTEM
Anthony C. Palatinus, 68—17 60th Road,
Maspeth, N.Y. 11378
Filed Oct. 19, 1965, Ser. No. 498,165
11 Claims. (Cl. 325—133)

The invention described herein may be manufactured and used by or for the Government of the United States of America for governmental purposes without the payment of any royalties thereon or therefor.

The present invention locates in the broad art of two frequency test signal engineering and introduces an especially defined area therein of composite dual pair sweeping two frequency test signal analysis. In general, this invention relates to methods of, and apparatus for, the generation and signal test, response analysis, measurement and evaluation of the linearity characteristics of total Independent Sideband Transmission Systems and the like over their overall channel bandwidth covering a wide frequency range of operation.

Of further concern in this invention are the uniquely related techniques and circuitry for automatic frequency control and stabilization of high frequency translation operations within such test apparatus. More specifically, this invention embodies newly derived techniques of system's intermodulation distortion analysis, and in particular, the determination of the amplitude variation relationship of 3rd and 5th odd order intermodulation component terms over the overall bandpass region, either USB, LSB, or ISB-total, and the common IF-RF bandpass region of the particular ISB transmission system under test.

Additionally, the present invention, with special interest, involves dual automatic control techniques. One control is for the precise and stable frequency translation of high frequency response spectrums resulting from the passage therethrough of a non-stationary two-tone type test signal, wherein both the individual tones absolute frequency values and the frequency difference between them are linearly varied with time.

The other automatic control technique is for the establishment and maintenance of an equal amplitude relationship for the two tones in the course of their frequency excurison through the LSB or USB transmission channel under test, such operation being of automatic gain control nature.

The present invention is a continuation-in-part of my copending application, "ISB-IM Distortion Test Set," Ser. No. 483,380, filed Aug. 27, 1965. It relates mainly thereto by complementing the prior IF-RF common stage test purpose with both an advanced SSB mode test and an introductory test method for the entire ISB system on a total distortion basis. While the purpose of test relates, the means and methods by which the test purposes are accomplished well establish themselves to be analogous images that are inverted and opposites thereof. This is notable from the details throughout this specification which more clearly highlights such featured capabilities. For briefly stated examples, the audio sweep frequency oscillator of the present invention makes use of the same sweep width for 2:1 and 3:2 sweep ratio generation compared to the changing of sweep width in the copending application. Both a linear and also a nonlinear manner of local oscillator signal development along with extended use of such generation is herein being produced, while only a linear feedback operation concerned the prior case in the closed loop local oscillation generation. Single channel signal processing as done herein is unlike the dual channel operation of the prior generation.

AGC operation is required of the present generation, whereas such need was not present in the previous effort. This instant invention uniquely produces sweeping tone signals of the same sense, while the former copending invention introduces opposite sense sweep tone signal generation. Herein a singular common test input is supplied to the transmission system, while the previous test nature required an opposite and separate pair of supplied inputs. Total ISB transmission system distortion evaluation is herein disclosed compared to the partial evaluation resulting from amount due to the systems IF-RF common stages as introduced by the prior copending application. For common ISB testing, artificially induced phase off setting is now initiated in contrast to the natural process of the prior supplying of separate and opposite inputs. For comparison of the output response analysis means, the new AFC now operates over a linear feedback path with 1st I.F. pickoff, in contrast to the 2nd I.F. non-linear feedback approach of AFC previously done in the copending case. Additionally included within this instant application are AFC approaches of overall single frequency audio control; one approach being the special control for dual frequency response plotting and hum test mode capability, and the other case being fully tunable.

The present invention also partially relates to a second pending application of this inventor, "Intermodulation Spectrum Analyzer," Ser. No. 395,965, filed Sept. 11, 1964. It relates thereto in the further advanced implementation of the therein disclosed principles of sweep frequency removal and audio frequency shifting within a novel circuits arrangement whereby the dual automatic control operation of the present invention is attained.

Finally, a third copending application of this inventor, "Automatic Carrier Positioned IM Wave Analyzer," Ser. No. 468,180, filed June 29, 1965, also in a manner relates to the activated audio tunable selective filter arrangement present in this instant invention. The present invention makes further novel and advanced use of the newly introduced principles of such selective filtering signal processing operation to herein derive as a uniquely conceived technique therefrom the test methods for common stage and total ISB transmission system distortion measurement resulting in distinctly differing test apparatus embodiments. As described in my most recent copending application "ISB-IM Distortion Test Set," Ser. No. 483,-380, filed Aug. 27, 1965, unique use is made therein of a non-stationary two-tone test signal wherein the two frequencies are changing linearly with time, but the frequency scan directions and sweep excursions are of opposite sense for a scan cycle. As pointed out in my prior application, such a unique test signal is of great value, and, in conjunction with the disclosed test apparatus of this prior application, significantly useful data is readily secured in testing common IF-RF stages of the ISB transmission system in an automatic manner.

Now it is well known in the electronics art that the distortion content of a linear type transmission system is related to both frequency and level. Optimum linearity at a rated power level is a function of a particular load impedance value, and the load impedance itself is a function of frequency. A static two-tone test (that is, two constant but differing signal frequencies of equal amplitude) is standard in SSB communications linearity measurements, but supply only a limited amount of distortion data from a one pair tone application. Hence two tone generators, either audio frequency or RF, supply a selection of numerous tone combinations wherein a series of static tests can be made to obtain an evaluation of distortion content with respect to the frequency region. Even for only the very narrow channel of the SSB transmission made alone, a quantity of such measurements must be made and the process is tedious and time consuming. For the wider channel condition of ISB-SSB transmission, a greater need exists for multiple data within the audio input to RF high frequencies output total channel bandwidth, and to secure such data in a rapid and repeatable manner, automatic means should be considered, for both the SSB case and the ISB mode of operation.

The operation of ISB-SSB transmission is one of complete bandwidth utilization in that the two sideband channels are activated with separate and distinctly differing type of modulation information being simultaneously supplied from independent sources. Prior means for evaluation of SSB transmission capability center on static tone inputs. Clearly to supplement distortion evaluation data from static tone test response, a rapid sweep test and frequency analysis approach is desirable. Since usually the amplitude relationships of odd order terms above and below the main tone pair are symmetrical and equal, only one IM term need be measured. Taking the lower 3rd odd order terms as the main IM distortion component of immediate and fairly indicative importance, as is the usual case, then setting about to achieve the accurate generation and useful recording of the response of this major or main IM term or terms over the USB, LSB, or both bandwidth regions of the overall ISB-SSB transmission system in a rapid and repeatable manner becomes an objective of this invention.

The static nature of the prior art test methods, besides requiring numerous tests to gather data over a bandwidth region, also require fairly complex frequency scanning spectrum analyzers that are limited in dynamic range and resolution due to the possible development therein of ringing distortion. Such swept frequency spectrum analysis resolves the IM terms and main tones with the spectrum responses being individually displayed at one time on the same screen pattern. This results in IM term amplitude relationships that are difficult to accurately ascertain with respect to one another and the main tone amplitude especially where the relationship approaches 40 db or higher, and more so where the audio frequency separation between the tones is rather small. It is therefore desirous to secure an analysis, measurement, and display means for the proper signal processing of the IM terms of interest over a wide dynamic range with high selectivity and great resolution for both SSB and ISB that is of a non-scan frequency type operation.

A survey of present state of the art ISB-SSB transmission systems reveals the lack of a standardized common carrier frequency value that governs the designation of the first intermediate frequency. While a 100 kc. frequency value is given only as an example, herein, other presently widely used common carrier frequency values include 250 kc., 500 kc., 1.75 mc. It is therefore advantageous to apply test techniques that are independent of the particular carrier frequency value in use thus eliminating the necessity of providing cumbersome and complex RF tuning of the test signals being generated.

An additional object of this invention is to provide a method and apparatus for the generation of a dual sweep two frequency test signal emanating from a single sweep frequency modulated source, with related ratios of sweep width excursion.

Another object of this novel technique of dual sweep IM test of ISB transmission systems, and hence the invention means of the total ISB-IM ISB and SSB test system is to provide a method and apparatus for the evaluation of the distortion characteristics of both audio channels and the common IF-RF stages of the overall transmitter in producing the response traceouts on a CRT screen of the pair of inter-modulation components resulting over a frequency region encompassing its total channel bandwidth.

This invention and that described in my first mentioned application are similar in certain respects but differ in that additional frequency components of the sweeping difference frequency terms are translated to RF, and the sweeping second harmonic terms of the input frequencies are also translated to RF, with the sum frequency term also developing in the audio bandpass region. An additional difference in testing of the entire transmission system response is the amplitude frequency response characteristics of the audio stage of the transmission system and their effect on the equal amplitude relationship of the sweeping two tone test signal. In my prior and first mentioned pending application, discrepancies due to such an effect was of little consideration since the bandpass characteristic of IF-RF stages on the channel bandwidth portion can reasonably be assumed as being flat and uniform. In the case of the audio stages, such an assumption cannot be normally made and a novel method of automatic gain control operation and associated apparatus to account for any amplitude discrepancies that develop, is herein introduced and thereby becomes one of the objectives of this invention. In keeping with this newly stated objective, it then becomes a still further object to utilize the circuit arrangement for the automatic gain control (AGC) operation to stabilizing a high frequency translation operation within an automatic frequency control (AFC) loop.

It is then the object of this invention to provide the method and apparatus for the related ratio sweep two tone test and intermodulation distortion characteristic evaluation of the overall SSB-ISB Communications System, and to further provide a method and apparatus for the static two tone test and intermodulation distortion characteristic evaluation of the common stages of ISB transmission systems. Another object of this invention is to provide the method and ratio sweep apparatus for the stabilized frequency translation of the related ratio sweep two tone type response output of the communications system, that establishes and maintains the constant frequency value components of the translated spectrum at or centered about the I.F. carrier frequency value of the selective bandpass filter arrangement of the output measuring system.

It is an additional object of this invention to provide the method and apparatus for the test signal generation, audio frequency tuning, and frequency stabilization by a single audio frequency oscillator reference source of control.

Another object is providing for the hum analysis capability for such test systems. The objective to provide automatic establishment and repeatability of the swept audio frequency ratio between two common test signal inputs and the subsequent dual plotting of the separate intermodulation response of the overall stages of an ISB transmission system resulting from this specific type test signal input is to be met.

Further an additional object of this invention is to provide stabilized frequency translation of the transmission system's response output in an automatic manner.

Other objects and advantages will appear from the following description of example embodiments of the present invention, and the novel features will be particularly pointed out in the appended claims.

Figure 5B:
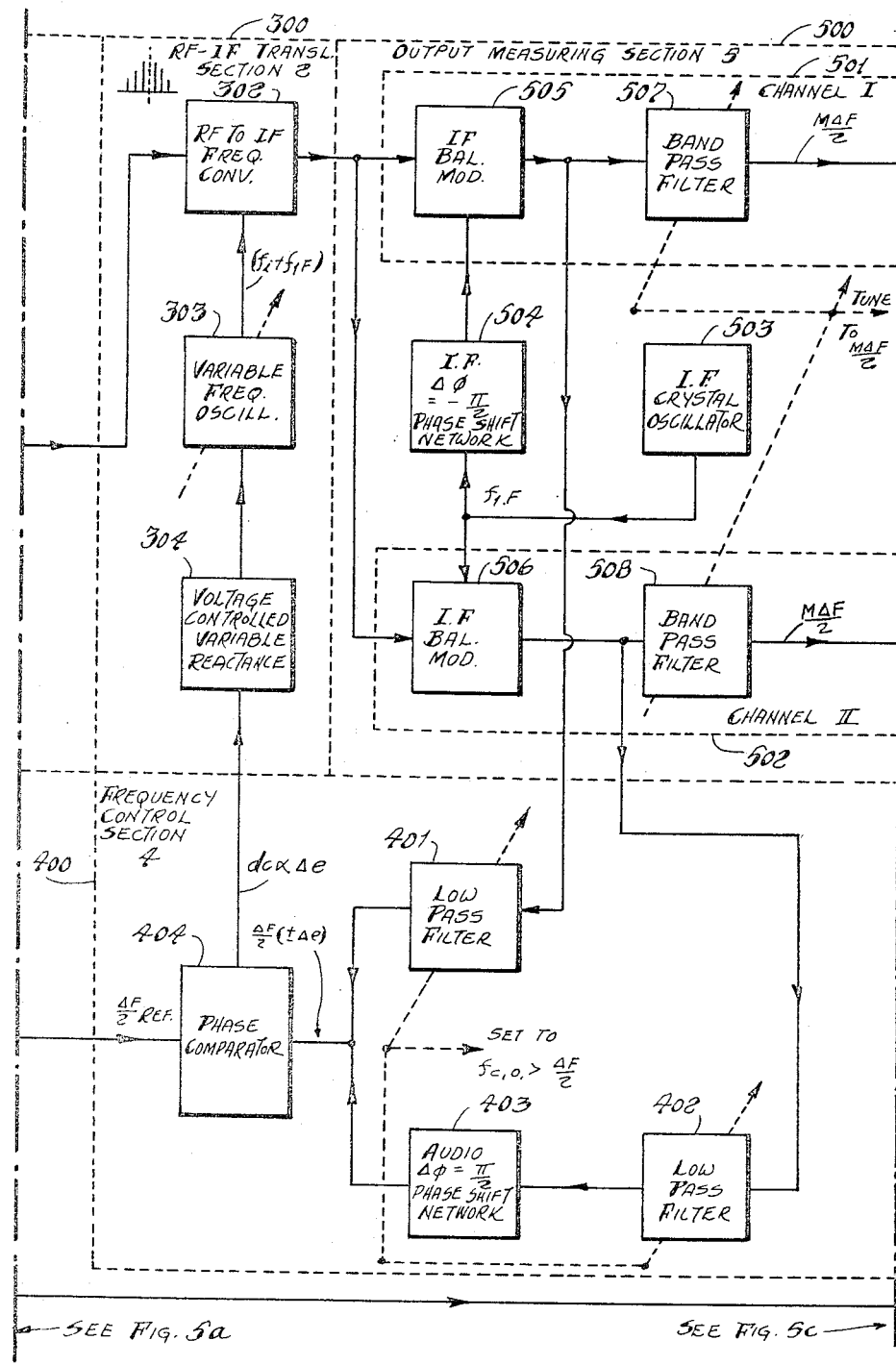

FIG. 5 (comprising FIGURES 5a, 5b and 5c) is an elementary overall test system block diagram of a practical embodiment made in accordance with this invention for illustrating the test method for sideband transmission system linearity, that features single audio frequency multiplication tuning operation and frequency stabilized frequency translation circuits arrangement.

Figure 1A:
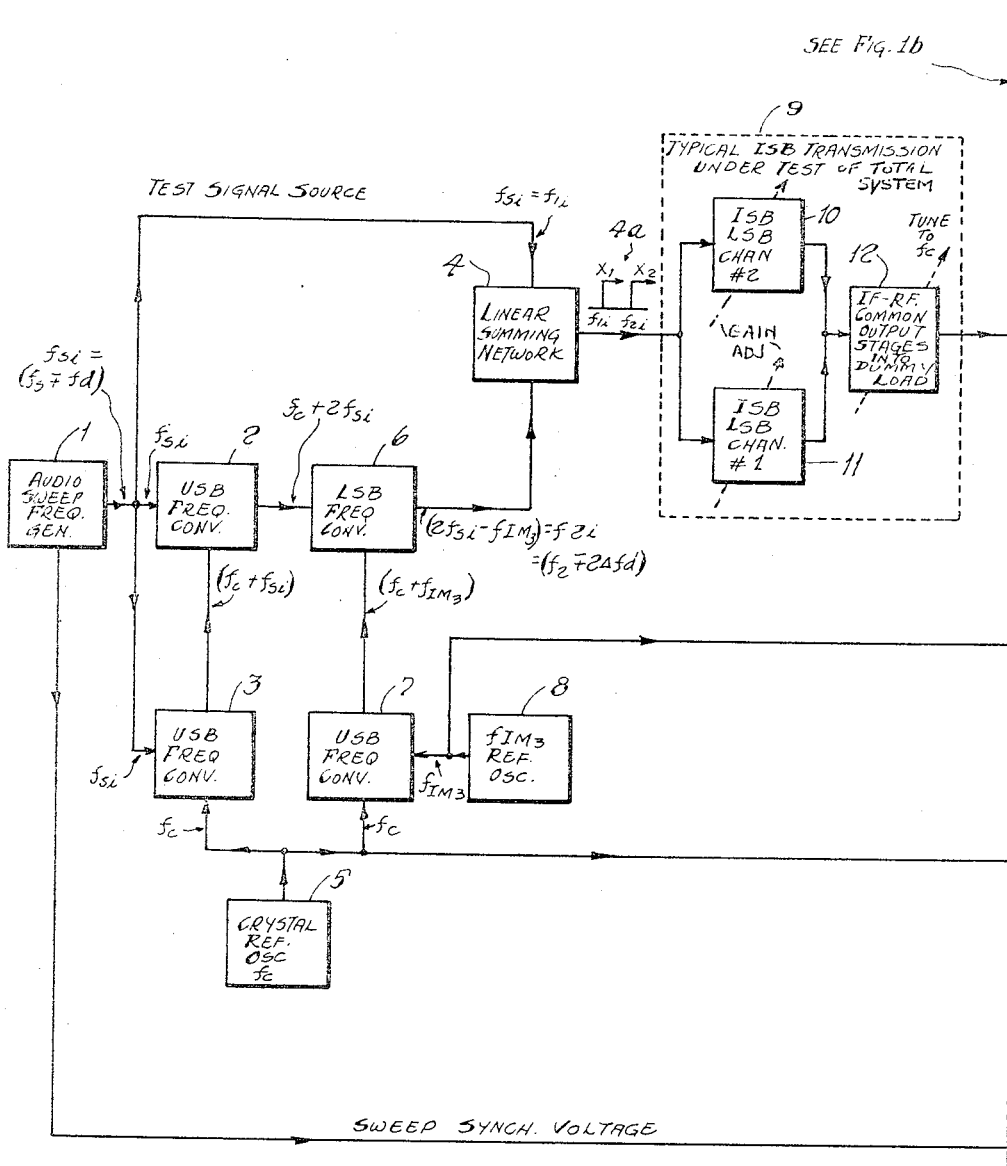
FIG. 1 (comprising FIGURES 1a and 1b) is an elementary block diagram of an embodiment illustrating the novel circuits arrangement of the technique of total ISB-IM distortion measurement employing dual frequency response plotting of constant IM terms in accordance with the invention.
Figure 1B:
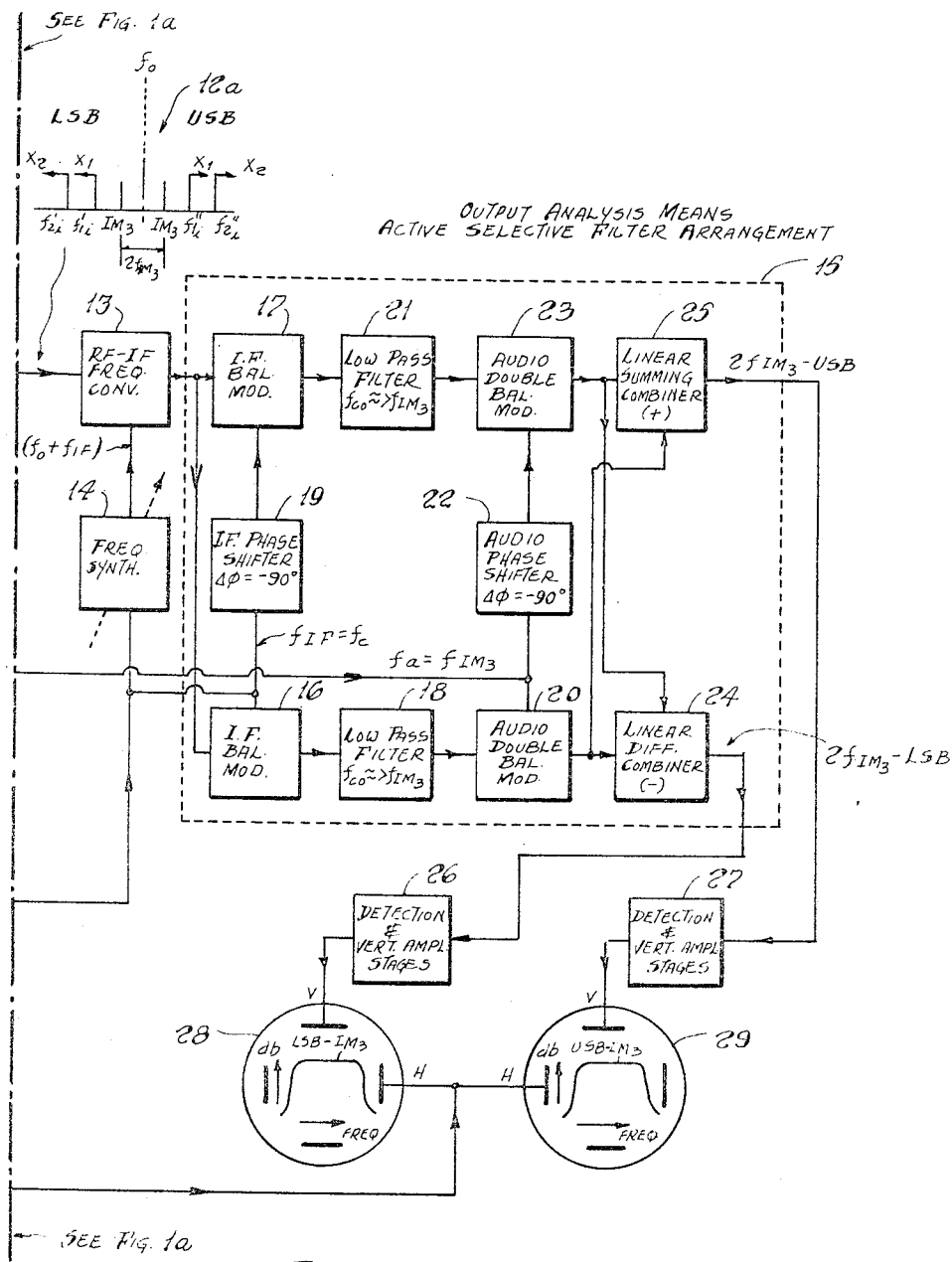
Figure 6A:
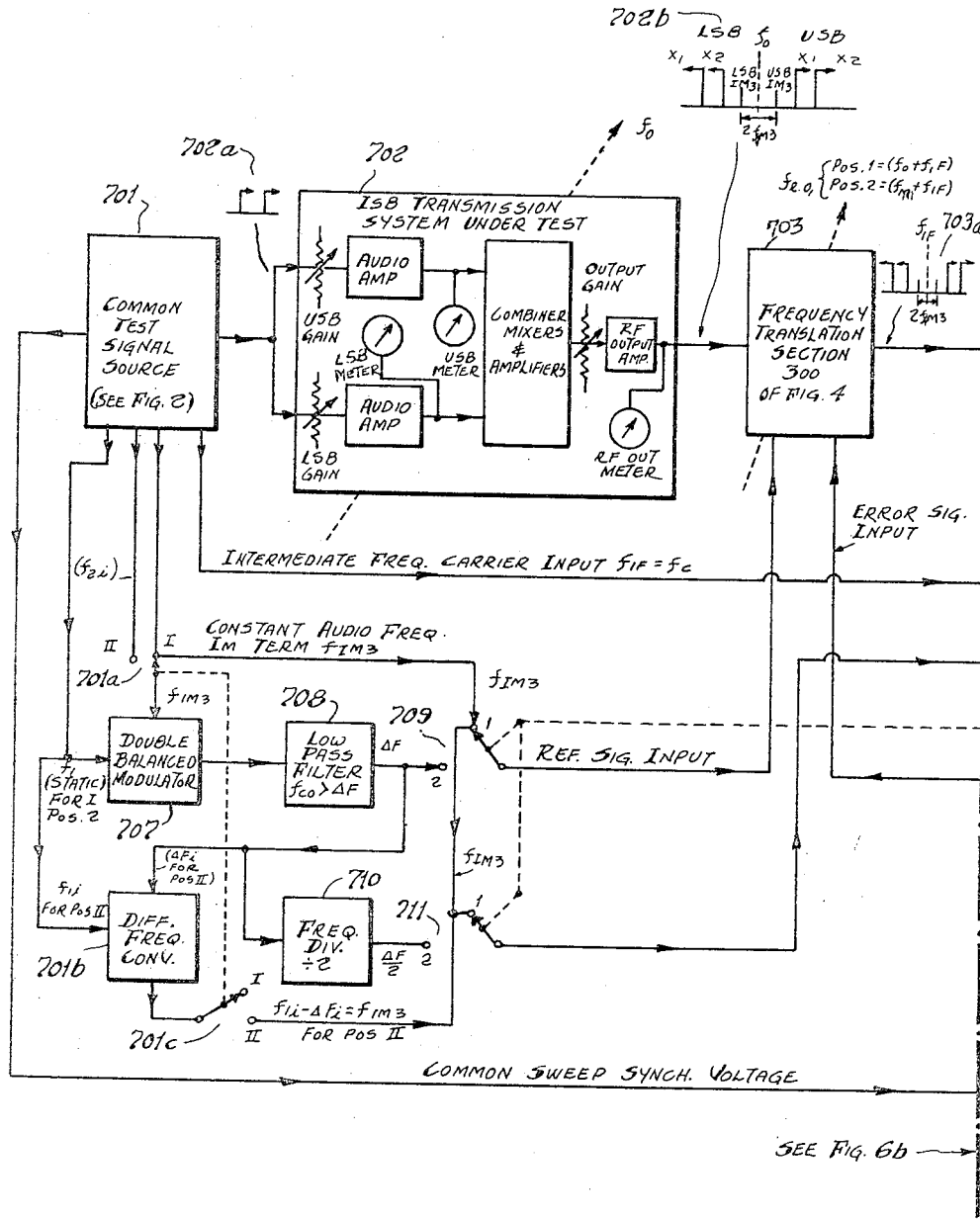
Figure 6B:
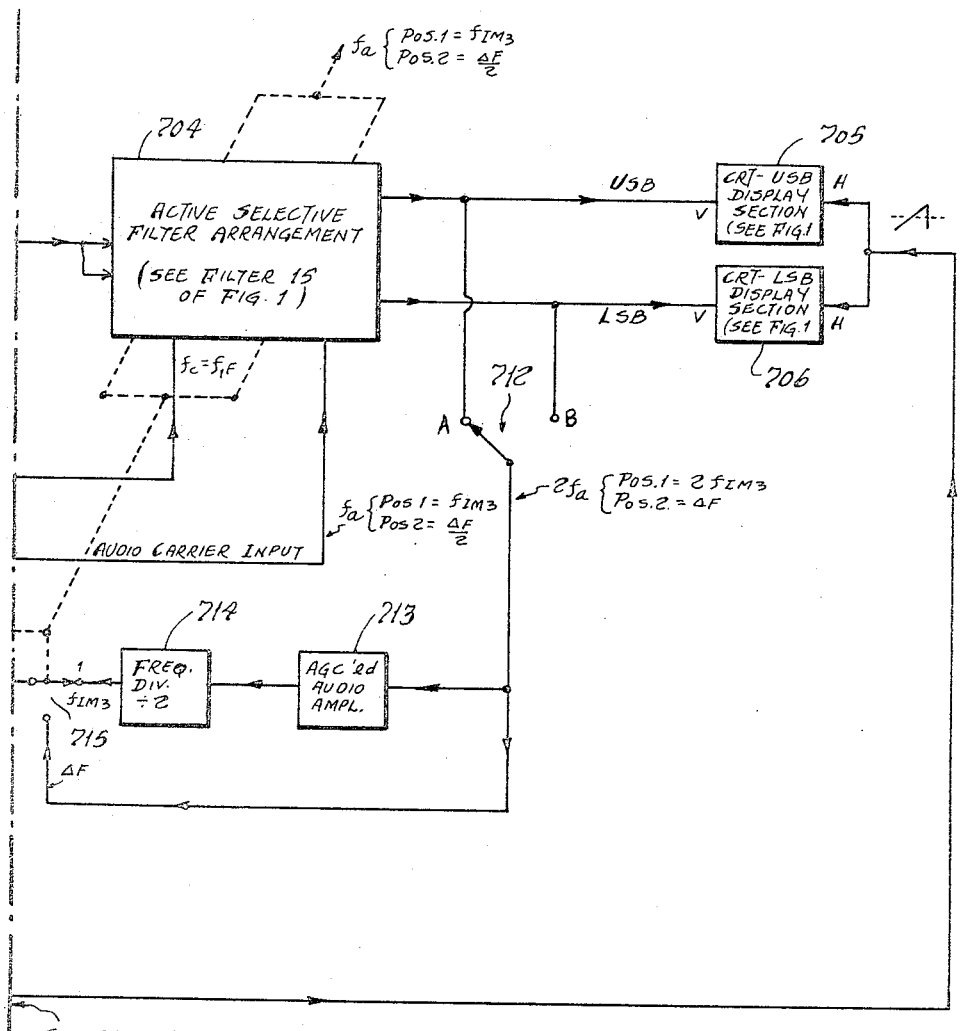

FIG. 6 (comprising FIGURES 6a and 6b) is a block diagram of an overall circuit arrangement of the test system apparatus of FIG. 1 wherein the test signal generation section and the audio operating signal generation section for the test method are applied to a total SSB-ISB transmitter test.

*Elements of theory*

ISB transmission consists of two modulation inputs that are separate, distinct, and accordingly fed to separate channel modulators. Thereafter, the two different sidebands are linearly combined by summation, frequency translated to the high frequency region for linear power RF amplification and transmission. It is generally well known that static two tone test signals have frequency values, $f_1$ and $f_2$, where $f_1$ represents the lower main excitation tone and $f_2$ being the upper main excitation tone, which are separated from each other by an audio frequency difference interval $\Delta f_a$, and of equal amplitude. When they are applied to a transmission system to be tested, new frequencies are developed in the output of the tested transmission system due to existing degrees of non-linearity within the bandpass region of the system.

The new frequencies that locate themselves closest about the main tone frequency locations are commonly known to be the odd order difference frequency terms, and they are conventionally in the form of 3rd odd order terms as $(2f_1-f_2)$ and $(2f_2-f_1)$; 5th odd order terms as $(3f_1-2f_2)$ and $(3f_2-f_1)$; and so forth in the manner whereby a $(M+N)$ odd order term is $(Mf_1-Nf_2)$ and $(Mf_2-Nf_1)$. In single sideband type systems, wherein the bandwidth of transmission for the system is relatively narrow, only the closest odd order terms come within the usable sideband or fall into the adjacent sideband and are of the most paramount interest.

These odd IM terms are usually of the 3rd and 5th order, with the 3rd order term being of greater importance. Accordingly, in the static measurement of some SSB systems, wherein the 3rd order predominates in being substantially of a greater magnitude than the 5th, etc., the comparison of the signal level to the 3rd order level serves to provide an indication of the signal to distortion $(S/D)$ ratio of the system. It is common to find the higher order terms of a lower amplitude than the 3rd order, which is the lowest order. Hence, many times, a rapid and equally useful indication of the degree of system linearity can be satisfactorily derived by sole consideration of the 3rd odd order IM term. Here, as in most common applications, the 3rd upper term of $(2f_2-f_1)$ is of an amplitude equal to the 3rd lower term of $(2f_1-f_2)$. It is of greater benefit to select the measurement technique at the 3rd lower odd order IM term of $(2f_1-f_2)$ due to the lower frequency value at which it exists.

The lower 3rd odd order IM term of a two tone test $f_1$ and $f_2$, separated by $\Delta f_a$, is located at a frequency value that is less than the lower main excitation frequency value by the interval, $\Delta f_a$, and has an absolute frequency value equal to the difference of twice the frequency of the lower main excitation tone from the upper main excitation tone frequency value, where $$f_{\text{LIM3}}=2f_1-f_2=f_1-\Delta f_a$$

Now as fully described and detailed for the common IF-RF stages consider here the situation where for the SSB-ISB total case, the lower main tone of $f_1$ is varied at a linear rate with time and simultaneously the audio frequency difference interval between this lower $f_1$ varying tone and the upper main tone of $f_2$, that is, $\Delta f_{a1}$ is set to vary with time in a linear manner by a proportionate frequency amount such that the initial value of $$f_{\text{LIM3}}=(f_{11}-\Delta f_{a1})=(2f_{11}-f_{2i})$$

is constantly maintained at its fixed value during the changing interval.

Observe now, a tone frequency $f_1$ which increases by an amount say $\Delta$ c.p.s. to become $(f_1+\Delta)$, an dthe initial difference frequency separation value of $\Delta f$ c.p.s. for a second tone frequency $f_2$ also increasing by an equal amount, to say $(\Delta f+\Delta)$. Then the third odd order resulting IM term frequency value becomes $(f_1+\Delta)-(\Delta f+\Delta)$ or $IM_{3L}=(f_1-\Delta f)$ and is therefore of a constant frequency. In a like manner for the 5th IM term frequency, where $f_1$ increases by $\Delta$ value and $\Delta f$ increases by $\Delta/2$ amount, then $$f_1+\Delta-2\left(\Delta f+\frac{\Delta}{2}\right)=f_1-2\Delta f=IM_{5L}$$

For $\Delta f$ and $f_1$ to increase by like amount of $\Delta$, $f_2$ must increase at twice that amount or $2\Delta$.

For $\Delta f$ to increase at one-half the amount of $f_1$ increase, $f_2$ must increase at 3/2 amount of $f_1$. Hence to obtain a fixed frequency location, for $IM_3$ the sweep tones become $f_1\pm\Delta f_d$ and $f_2\pm2\Delta f_d$. For $IM_5$, the sweep tones become $f_1\pm\Delta f_d$ and $$f_2\pm\frac{3}{2}\Delta fd$$

where $\Delta f_d$=sweep frequency deviation. Accordingly, $$2(f_1+\Delta)-(f_2+2\Delta)=2f_1-f_2=IM_3$$

and $$3(f_1+\Delta)-2\left(f_2+\frac{3}{2}\Delta\right)=3f_1-2f_2=IM_5$$

In accordance with the above frequency deviation relationships, the dual audio sweeping test signal common input to the ISB transmission system under test are thus generated and applied by way of the present invention. Also provided is the unique method of producing continuous DC gain control voltages varying inversely with the strength of each swept main tone response, and tone generation channel gain variation that maintains constant equal amplitudes for the fundamental tone responses. Since but one sweep source is used, and $f_1$ and $f_2$ may not harmonically relate, one swept tone undergoes a novel audio frequency shift prior to combining that provides the strict stability requirement demanded throughout this specification.

*Elements of overall technique for total ISB test*

Simplified FIG. 1 serves to introduce and illustrate one embodiment of the invention useful in the simultaneous measurement of the LSB and the USB constant $IM_3$ terms. Audio sweep frequency generator 1 is also fed over a second path to the horizontal or X-axis inputs of the dual pair of CRT indicators 28 and 29 for synchronization.

Audio Sweep frequency signal $f_{s1}$ is applied over one path to the signal input of USB Frequency Converter 2, which itself comprises a balanced modulator and USB Filter, and fed over a second path to one input of USB Frequency Converter 3. A third and final path supplies $f_{s1}$ as one input to linear sum network 4. Reference crystal oscillator 5 generates a carrier frequency signal, $f_c$=100 kc., which is fed over four paths. A first and a second path supply signal, $f_c$, as the common local oscillator signal to the carrier inputs of USB frequency converter 3 and USB frequency converter 7.

A third path connects $f_c$ to the standard input of variable frequency synthesizer 14. A fourth path feeds $f_c$ as a reference signal to the audio frequency tuned active selective filter arrangement 15 as the common I.F. signal.

Considering first the common carrier input to the balanced modulator of converter 3, then sum and difference frequency products develop at the modulator output and by way of an upper sideband filter, which passes unattenuated the sum product term of $(f_c+f_{si})=(f_c+f_s\mp\Delta f_d)$ and readily suppresses all other modulator output components. The output of USB frequency converter 3 becomes the carrier signal of USB frequency converter 2, which has input signal $f_{si}=(f_s\mp\Delta f_d)$.

Thereupon in a similar manner, USB frequency converter 2 allows passage of only the upper sideband or sum product of $(f_c+2f_1)$ at its output which becomes the signal input to the LSB frequency converter 6 that comprises a balanced modulator and low pass filter combination. USB frequency converter 7 has signal input of $f_{IM3}$ supplied from $f_{IM3}$ static reference oscillator 8, with $f_{IM3}$ also being fed as the audio operating signal to the output analysis means. Only the sum product of $(f_c+f_{IM3})$ is passed at USB frequency converter 7 output which feeds therefrom to the carrier input of LSB frequency converter 6.

Sum and difference products develop in LSB frequency converter 6 and produce a low pass filter output. The output of converter 6 low pass filter passes only the difference frequency product of $(f_c+f_{IM3})-(f_c+2f_s\mp2\Delta f_d)$, which becomes $(2f_s-f_{IM3}\mp2\Delta f_d)$ giving a higher valued tone of like direction of sweep. This sweep frequency output, as low pass filtered is applied as the second sweeping tone of the pair of generated tones and may be expressed as $f_{2i}$ instantaneous, where $f_{2i}=f_2\mp2\Delta f_d$, with $f_2=(2f_s-f_{IM3})$. The direct signal of $f_{si}=f_s\mp\Delta f_d$, being one input of linear summation network 4, thereafter serves as one of the pair of desired audio sweeping tone signals, herein the present example namely, the lower valued tone of $f_1\mp\Delta f_d=f_{1i}$.

This sweep frequency signal of twice the frequency excursion as passed by the low pass filtering at converter 6 output is the lower sideband or difference frequency product of $(2f_{si}-f_{IM3})$. This output, upon being applied to the other input of linear summing network 4, (as $f_2$ instantaneous) serves as the other higher sweeping audio tone of the 2:1 swept pair of tones that becomes the input to ISB transmitter, in being applied to ISB-LSB channel I, 11 and ISB-USB channel II, 10 simultaneously. Note here that the frequency deviation is being doubled by additive means and only one audio sweep oscillator and one reference crystal oscillator need be employed. The nature of this type of signal frequency generation will become more apparent by way of the subsequent detailed description of the signal processing in the second example embodiment illustrated in FIG. 2.

Typical Independent Sideband Transmission System under test or ISB transmitter 9 in elementary form comprises separate ISB-LSB channel I, 11, ISB-USB channel II, 10; and with both channel outputs being linearly combined and feeding into IF-RF common stages under test 12, which is properly terminated in a dummy load with the power output being monitored.

Observe from spectrum sketches shown herein that the arrowed amplitude representation of a frequency component is used wherever the designated term is of non-stationary nature, its frequency variation being as directed. Hence, the output of linear sum network is represented by spectrum sketch 4a, and consists of one audio lower value sweeping tone $f_{si}=f_{1i}$, where $i$=instantaneous; and the other higher value sweeping tone of $(2f_{si}-f_{IM3})=f_{2i}$, each tone also being set to be of equal amplitude in the course of their sweep excursion. This test signal becomes the common audio modulating signal input to the ISB transmission system under test 9, and simultaneously applied to IBS-USB channel II, 10, and ISB-LSB channel I, 11. The independent channels of 10 and 11, have a common carrier signal and thereby frequency translate the modulating test signal input into the upper sideband (USB) and the lower sideband (LSB) regions respectively about the transmission system's carrier frequency value, say $f_{co}$, that thereupon represents the 1st I.F. value of the transmitter. Hence, ISB modulation provides for the signal processing of sweeping test signal inputs as described in the following manner:

The dual tone swept audio frequency wave that has an excursion from a lower frequency value to a higher frequency value with time of positive going direction is applied to the ISB-LSB channel 1 input. The balanced modulator of channel I heterodynes this type input with the much higher frequency valued local (carrier) oscillator signal $f_{co}$. The double-sideband suppressed carrier output is then applied to the lower sideband (LSB) filter wherein the upper sideband is suppressed. The resultant output being applied to linear combining stage thru LSB channel I, 11 path then becomes a dual sweeping tone transversing from the low frequency portion of the LSB channel away from the virtual suppressed carrier frequency value; and when combined, functions as the lower sideband tone pair of the sweeping variation of the equivalent four tone type test signal that functions as the common test signal from this point on.

Simultaneous with the above described action, the dual tone linear swept audio frequency wave that has an excursion from a lower frequency value to a higher frequency value with time is applied to the ISB-USB channel input II, 10. The balanced modulator of channel II heterodynes this type with the same local (carrier) oscillator signal mentioned above. In this case, the double sideband suppressed carrier output is then applied to the upper sideband (USB) filter wherein the lower sideband is suppressed. Here the resultant output being applied to linear combining stage thru USB channel II path becomes a dual sweeping tone pair of related ratio sweep from the low frequency portion of the USB channel away from the virtual (suppressed) carrier frequency value; and when combined, functions as the upper sideband tone pair of the sweeping dual tone pairs that is now so derived to develop the main IM terms (3rd) of constant frequency where non-linearity is experienced in the IF-RF common stages 12 of the ISB system. It is here evident that while the audio sweep frequency test tone pairs are separately applied to each one of the ISB channel inputs, the ISB type SSB transmission system functions to linearly combine oppositely sweeping tone pairs in the linear combining (i.e. summation) stage of the transmitter and to thereafter act as the dual pair of sweeping frequency tone combination. This combination is applied to the remainder of the system, and maintains the constant fixed frequency location (value) of the IM terms of interest, in this case, the 3rd lower odd order terms of $f_{IM3}-LSB$ and $f_{IM3}-USB$.

The further frequency translation occurring after the linear combining operation within the ISB transmission system, which conventionally involves heterodyning with highly stable and accurate frequency synthesizer controlled local oscillator signals, serves to upconvert the sweep test signal spectrum and its accompanying related IM terms to the high frequency (2–32 mc.) region for which the transmitter is tuned. While the absolute frequency values of the sweeping tone pairs are changed in an equal manner, the linear sweep variation of these tones is maintained in accordance with the amount by which they were initially commonly supplied in the audio region by the test signal source.

Since the channel bandpass regions of ISB-SSB systems are set to suppress the undesired sideband and the carrier, very steep aides are exhibited by the channel filter, particularly so by SSB filters which are asymmetrical in response shape. The more rapidly attenuated region in being close to the carrier, locates at the low frequency of the bandpass region for USB; at the higher frequency for the LSB filter unit.

Typically, the ISB transmitter 9 is say tuned to $f_0$. Non-linearities that exist in the IF-RF common stages under test 12 result in the further production of intermodulation products of the two frequency input signals which appear in the ISB transmitter 9 response output. As noted earlier a pair of constant frequency signals develop for the lower third, LSB and USB, odd order difference frequency intermodulation terms designated $LSB-f_{IM3}$ and $USB-f_{IM3}$. The spectrum sketch 12a shows for convenience only the two $f_{IM3}$ terms and the translated $f_1'$ and $f_2'$ terms designated $f_{MT1}$ and $f_{MT2}$ wherein subscript MT refers to main tone, both in the LSB negative going and the USB positive going, where accordingly $f_{MT2}$ is changing at twice the rate of $f_{MT1}$.

Note the symmetrical location of the primary frequency components, with the audio frequency separation between the two IM3 terms being equal to twice the audio frequency of the fixed IM term developed in the audio range, or $2f_{IM3}$. While the response output IM3 terms are shown for a simple example as being of equal amplitudes; in actual practice, (FIG. 6), proper performance of the present invention is attained without reliance upon exacting IM spectrum symmetrical amplitude distribution. Then for simple examination, by assuming a sweeping four tone signal complex, consisting of inverted sweep two tones located in LSB and a like non-inverted two tone of same deviation ratio rate in the USB region equally displaced about the transmitter carrier frequency value, a so-called composite four tone-opposite pair swept signal is generated. Likewise consider development of only fixed lower 3rd odd order main IM distortion components about the carrier frequency position, one being the LSB-IM3 term below and the other representing the above similarly displaced fixed frequency term of USB-IM3.

As more than one frequency is required to produce intermodulation and tones of equal amplitude produce more demanding test requirements on a system than are likely to occur in normal use, the two tone signal is standard. Usually, more than two tones produce complex product results in intermodulation. While a static four tone type signal may be of somewhat similar nature, the spectrum structure of what appears as a resultant of the four tones of oppositely swept pair output response signal generated is the total ISB test mode signal that is distinctly different from that of prior art. Interestingly, a form of controllable wave analysis is accomplished herein with only a pair of constant frequency IM terms undergoing analysis while all other frequency components are beyond the analyzer's resolving bandwidth. Coupled with the disclosed output signal analysis technique is the companion and conditional property that the spectrum bandwidth region between the constant frequency IM component pair is free of other frequency components. As such, it is evident now that the developed pair of constant frequency IM components along with the generated dual pair oppositely swept tone signal coact as partner pals to thereafter position themselves to be without existence of either a carrier reference or other frequency component therein between.

Normal two tone type IM structure has long been recognized by prior art as equivalent in spectrum distribution to double sideband suppressed carrier amplitude modulation with the notable exceptions that sideband phase coherence to a carrier position is non-stationary and random which thereby in effect is to be lost with time; and that carrier suppression for two tone denotes the frequency spectrum devoid of the carrier component. Indeed, the pair of constant frequency IM terms, one at LSB and another at USB, develop as pals independent of any carrier phase coherence; and in the subsequent frequency analysis process, a static frequency tone pair of the tine type, that is, to be lost of carrier, undergoes dual selective channel filtering within phase cancellation paths to then be singularly resolved for separate frequency response plotting.

When one considers further that selectably differing gain ratios may be imparted to the ISB channels themselves as is advantageously done and described with reference to the embodiment of FIG. 6, then the resultant signal is in the nature of the simulation of a non-phased related pair of dual tone related rate swept frequency, double sideband signals. This results in a pal pair of fixed spectrum components as boon companions, tine or lost of carrier which terms fail to suffice as a definition thereof.

More appropriately, the so-called type of four tone-opposite pair swept signal being assembled at an ISB combiner output embodies and exhibits innate characteristics identifying their property behavior within the presently shown principal effective usage of such formulated behavior that finds itself most aptly defined and best termable as a "palatineus" signal test.

In technical science, a word can have meaning only as the word as associated with an action or an operation. For exacting examination one need but refer to the generally available published text "Funk and Wagnall's New College Standard Dictionary," 1947, pages 844, 1224, 855 and 1287, for the long standing definition of the words "pal," "tine," "palatine" and "us" respectively. Uniting as combined and meaningful term of "palatineus," which as presented herein, secures a clear expression of the germane qualities of the subject test signal.

Since the referred to constant frequency IM component pair are hereinafter to undergo highly selective wave analysis through a narrowly fixed low pass region, then a quite stable frequency shift operation is needed in the test signal source. In FIG. 1, note a separate $f_{IM3}$ reference oscillator 8. As well known in frequency generation art, crystal reference oscillator 5 can readily supply the $f_{IM3}$ signal and of like stability. A useful $f_{IM3}=400$ c.p.s. signal is directly produced from feeding $f_c=100$ k.c. p.s. to three cascaded frequency dividers of $\div 10$, $\div 5$ and $\div 5$ factors. This self-evident operation is best applied where also desired is a static two tone generation as later required in the embodiment of FIG. 5. Included herein are differing novel approaches for the $f_{IM3}$ generation as presented later in FIGS. 2 and 6; however, the embodiments exampled are not intended to be limited thereby.

Alternatively, for a differing FIG. 1 signal process, USB freq. converter 7 output feeds to a LSB, not USB, type freq. converter 2. USB frequency converter 3 output then connects to LSB freq. converter 6 for like $(2f_{s1}-f_{IM3})$ signal generation.

*Output analysis means—FIG. 1*

The output analysis section of FIG. 1 comprises RF-IF frequency converter 13, frequency synthesizer 14, active selective filter arrangement 15, a pair of detection and vertical amplification stages 26 and 27, and dual CRT displays 28 and 29. The illustrated circuits arrangement functions to supply a pair of frequency response traceouts of the constant main IM terms of interest, IM3–LSB and IM3–USB respectively on CRT displays 28 and 29.

RF-IF translation frequency converter 13 receives the transmitter 12 RF output signal at its input and also has the local oscillator signal of $(f_0+f_{IF_1})$ applied to it from frequency synthesizer 14. Conventional frequency synthesizer 14, used only at the moment for illustrative convenience in the basic explanation of this invention has its variable frequency output of equal stability as the fixed reference signal of 100 kc., which is supplied from reference crystal oscillator 5. Synthesizer 14 is tuned to generate $(f_0+f_{IF_1})$, since $f_{IF_1}$ is predetermined for converter 13 and $f_0$ is derived from the tuning of the transmitter 12 carrier output frequency, $f_0$; with the constant IM3 terms that develop thereat, being equal to $[f_0(\mp)f_{IM3}]$. Frequency converter 13 output thereby has the $f_{IM3}$ terms located at above and below $f_{IF1}$ center frequency and the translated spectrum, becomes centered about the new quiescent frequency of $f_{IF}$; and serves thereafter as the common input signal to the IF balanced modulators 16 and 17 of active selective filter 15. Active selective filter unit 15 as mentioned earlier is somewhat similar to that illustrated and described in detail in my pending application "S.N. 468,180," filed June 29, 1965, "Automatic Carrier Positioned IM Wave Analyzer." In essence, active selective filter unit 15, which herein in FIG. 1 is as the output measuring analyzer, functions and operates according to the following description. Reference carrier frequency, $f_c$, serves as the IF common carrier signal of $f_c=f_{IF}$. Frequency converter 13 output is simultaneously applied to similar polymodulator channels. Each channel comprises an IF balanced modulator 16 (and 17), a fixed low pass filter 108 (and 21) and an audio double balanced modulator 20 (and 23) with a pair of linear combining networks, 24 being difference combiner and 25 being additive. A pair of quadratic carrier signals are supplied to the modulators of the channels, such that reference crystal oscillator 5 directly applies its output, $f_c$ as frequency $f_{IF}$, as the carrier signal to IF balanced modulator 16; and after a lagging phase shift of 90° upon passage through phase shifter 19, as the quadrature carrier signal to IF balanced modulator 17. Likewise, audio common carrier signal $f_a=f_{IM3}$ supplied as an operating signal from the test signal section of the test system, is directly applied to audio double balanced modulator 20, and, after a lagging phase shift of 90° upon passage through phase shift network 22, as the quarature carrier signal to audio double balanced modulator 23.

In the simple arrangement of FIG. 1 only fixed similar low pass filters 18 and 21, of cut-off frequency, $f_{co}$, slightly greater than $f_{IM3}$, are shown. In other instances greater attenuation characteristics may be achieved by combining the response of different filter types, as for example, parallel-T notch filters cascaded in conjunction with the active low pass filters, whereby the notch filter rejection slot is tuned at some frequency location beyond the cut-off frequency of the low pass filter to further enhance the rate of attenuation. Then in accordance with the described signal processing of active selective type filter 15 given in the detailed paragraphs concerning the application embodied in FIG. 5, the output of summing combiner 25 is $2f_{IM3}$, being representative in amplitude proportional to the USB-IM3 term. Difference combiner 24 has the like signal frequency output of $2f_{IM3}$ value but here being proportional in amplitude to the LSB-IM3 component of the spectrum being analyzed. The sum and the difference outputs are applied for conventional detection and vertical CRT display indication of their amplitudes.

Hence, resolving by active selective frequency filter 15, which possesses internally highly selective lowpass filters after its first mixer pair, passes only the constant $(f_{IF1}-f_{IM3})$ terms and rejects all other components in its outputs. These singular and constant $f_{IM3}$ audio terms are now translated to twice audio value, i.e. $2f_{IM3}-LSB$ and $2f_{IM3}-USB$, and separately applied to the input of like pairs of detection and vertical amplification stages 26 and 27. The resultant pair of varying $dc$ outputs are fed to the vertical plates of CRT indicators 28 and 29. The linear sawtooth synchronized voltage provides the common X-axis time base of the CRT indicators 28 and 29 and the resultant plots of amplitude variation versus frequency location are obtained on the CRT screen displays.

While the example embodiments illustrated herein make use of two entirely separate CRT display systems, it is also evident that presently available single CRT display systems of identical Y input channels and dual beam deflection can likewise be advantageously employed.

The output analysis section functions as a narrow band, high selective, frequency stable, wave analyzer, tuned tb pass only the AF equivalents of the dual audio constant IM (3rd lower odd order) terms, its high stabilized selectivity passing only these frequency components in the final AF (2nd) poly-quadrature audio modulation operation and effectively attenuating all other frequency components that are present in the output spectrum of the ISB transmission system. This analysis constitutes 100% intercept of constant IM terms, which are thereafter simultaneously visually plotted.

The visual display plotting of these constantly maintained 3rd lower IM terms is achieved by the synchronization of the sweep frequency excursion of the audio sweep generator source with the horizontal deflection of the electron beam on a CRT screen of the separate associated CRT indicator devices, having a common linear sawtooth generation stage drive. The modulating element of the audio frequency modulated oscillator source is applied to the horizontal deflection plates of the dual CRT's 28 and 29.

The amplitude of the 3rd lower odd order IM terms are plotted, and with a calibrated vertical scale in db, versus a horizontal CRT frequency axis calibration of the virtual center or mean frequency value of the instantaneous location of the two sweeping tones. This virtual center value represents one half the difference frequency at any time between the tones, that is then added to the lower tone value at that instant or may be expressed as the mean value of $$\frac{(f_1+f_2)}{2}$$

The dynamic range of this technique is enhanced and is dependent upon the dynamic range of the active selective analyzer and can be greater than 60 db. The final resolving bandwidth does not experience swept frequency energy within its narrow bandpass region, serving mainly to select the constant ever present 3rd odd order IM terms on a 100% intercept basis, and thereby "ringing distortion" does not develop to give erroneous screen indications.

For an ISB-SSB transmission system not illustrated where a notch rejecting filter is used to further suppress the carrier frequency, a rather slow sweep rate need not be used to avoid development of "ringing" distortion since injection of swept modulated energy into the highly selected attenuation slot is not experienced. Thus these techniques are compatible with both ISB transmission systems since a frequency swept component does not develop at the carrier frequency location.

This embodiment as exemplified by the designation of existing general purpose synthesizer 14 given in FIG. 1 can be regarded as an actual implementation of the invented technique. The detailed circuit block arrangements given in FIGS. 2 and 4 constitutes the essential test method and instrument to formulate an SSB IM distortion mode of operation for a like test set as hereinafter described. As pointed out in the invention description given earlier, the frequency synthesizer 14 has been shown used for the moment in FIG. 1 for purposes of conveniently introducing the overall signal processing operation of the essential elements of the overall method and invention apparatus. Now in further accordance with the principles of the present invention and the stated objectives of less complex and more economical test apparatus, the synthesizer 14 is herein directly replaced by a unique frequency stabilization techniques fully detailed and described hereinafter.

It is to be understood that the unique frequency stabilization techniques are disclosed herein to thereby readily achieve the novel overall test methods and therefore produce further useful implementation of the invention apparatus illustrated and described by way of this present specification. However, these methods of frequency stabilization by themselves are generally applicable in all cases wherever such described two tone type signals are to undergo frequency translation, as for example in conventional frequency scanning type spectrum analyzers.

Figure 2A:
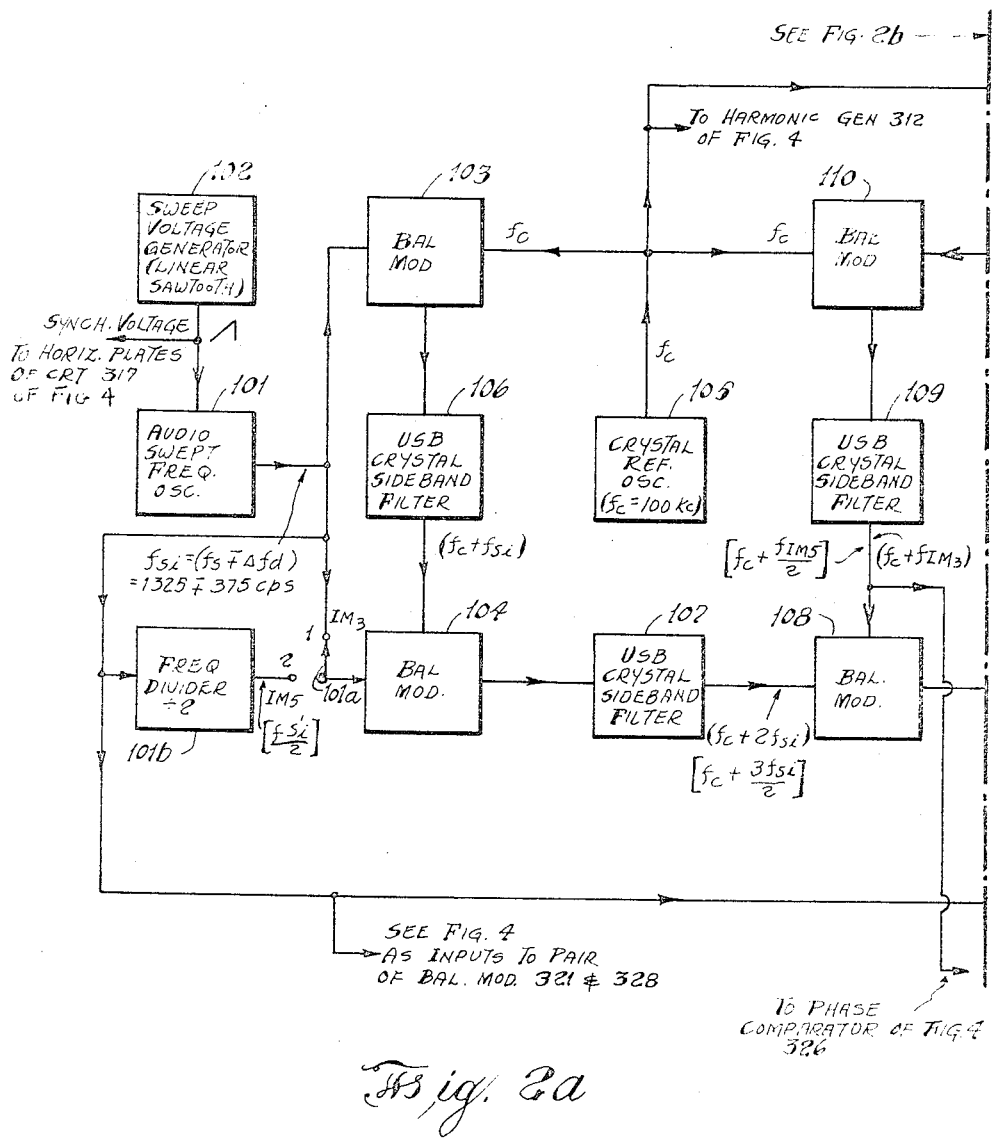
FIG. 2 (comprising FIGURES 2a and 2b) is a detailed block diagram embodiment of a circuit arrangement for the generation of a controllable sweeping two-tone type test signal in accordance with this invention.
Figure 2B:
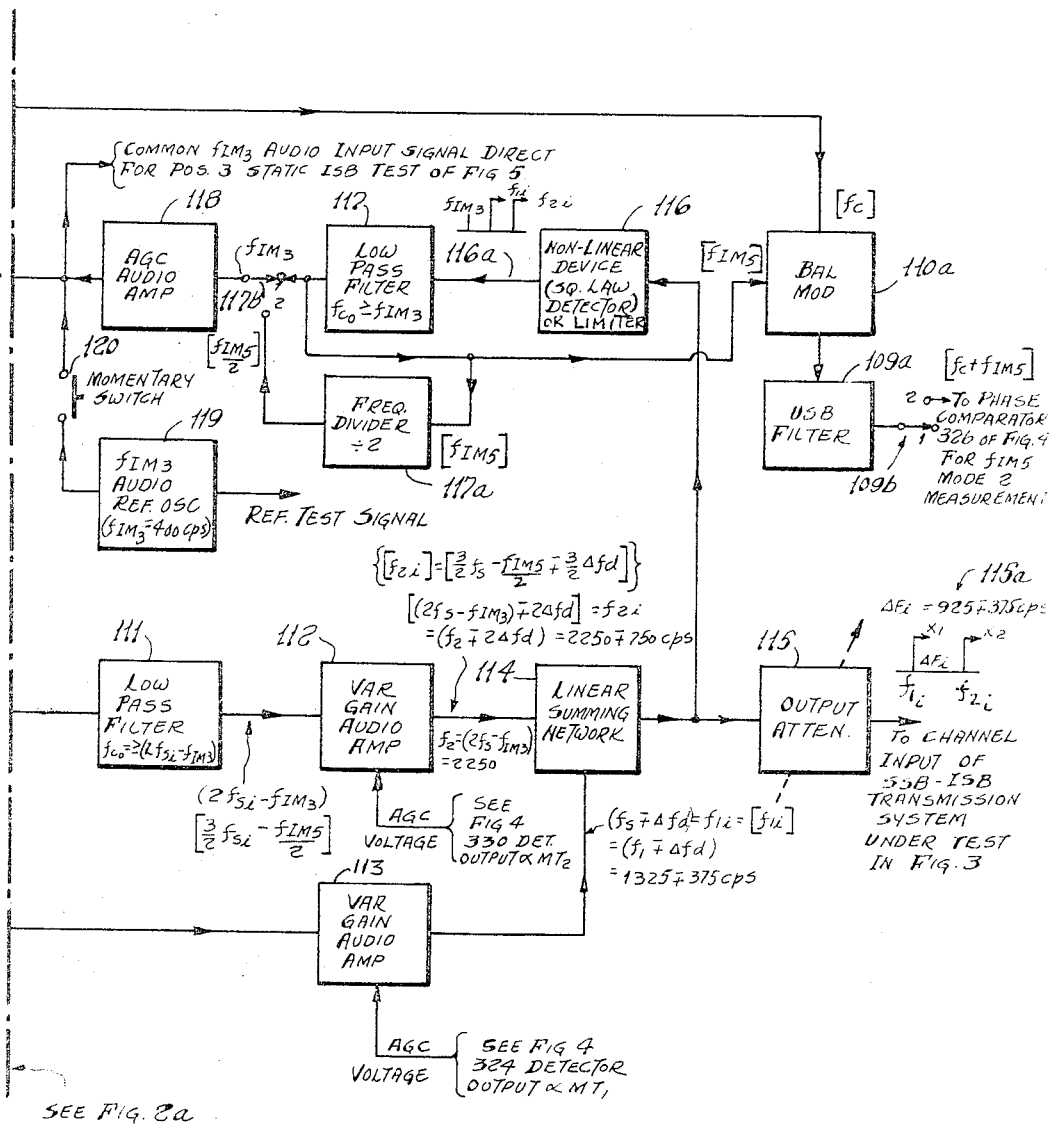

In the illustrated circuits arrangement of FIG. 2, the sweep generation technique employs a pair of tone generation chanels and serves throughout this specification as the common test signal source. One tone channel is direct, the other chanel produces frequency doubling in an additive manner, along with an additive increase of one and one-half times in a separate mode, and provides audio frequency shifting thereafter.

As shown in FIG. 2, the signal relationships given within parenthesis, ( ), pertain to mode 1 operation whereby third odd IM is to be measured. The expressions contained within brackets, [ ], represents mode 2 operation for measurement of the fifth IM terms; and the additional items required are numbered with letter subscript.

In such cases where the two third order products and the two fifth order products may have different amplitudes, a separate response measurement curve for each term may be made in accordance with the disclosed technique of this invention. For upper odd order IM distortion term measurement, swept signal tones $f_{1_i}$ and $f_{2_i}$ are applied to the upper sideband ISB channel II, while $f_{1_i}$ and $f_{2_i}$ feed to LSB-ISB channel I thereby automatically reversing the sweep direction of the combined test signal.

To secure the maximum deviation, the sweep audio frequency test signal $f_{1_i}$ is set to start at the lowest frequency value of the upper sideband channel, that is, in a typical ISB-SSB system of BW bandwidth 300 c.p.s. to 3000 c.p.s. It is now accordingly desirous to effect location of the constant main 3rd odd order IM term within the flat portion of the ISB channel, in the illustrated case the lower main IM term; with the audio bandpass sideband channel being 300 c.p.s. to 3000 c.p.s. with respect to virtual carrier frequency value. The lowest acceptable frequency value would be 300 c.p.s. about the carrier. However, let 400 c.p.s. be set for the example case. This effectively will allow for the sweep width excursion of 1500 c.p.s. and the start frequency value of the swept audio frequency signal ($f_1$) becomes 950 c.p.s. as determined by the following. In the application of the specific test signal of this invention to the audio pass region, the development of the instantaneous difference frequency separation term of $\Delta F$ appears due to non-linearity. To provide for suitable frequency control and resolving within the output analysis apparatus of the test set of this invention, the sweep excursion of the difference frequency term $\Delta F$ is set to be disposed from the frequency location of the IM3 term at its lowest value of excursion.

In the example, a 150 cycle interval is acceptable, thus locating the lowest $\Delta F$ value at 550 c.p.s. Since the lower main tone of $f_1$ then is disposed at ($f_{\text{IM3}} + \Delta F$) its lowest value becomes (400+550)=950 c.p.s. Accordingly, lowest value of $f_2$ becomes ($f_1 + \Delta F$) or 1500 c.p.s. With the sweep frequency excursion of the tone remaining within the audio bandpass region, the upper frequency limit of 3000 c.p.s. becomes the maximum excursion of the upper main tone frequency of $f_2$, which establishes a sweep width of 1500 c.p.s. or a frequency deviation of $\mp 750$ c.p.s. about a rest or center frequency of $$f_{2\text{CF}} = (1500 + 750) = 2250 \text{ c.p.s.}$$

For the lower main tone frequency of $f_1$, which is of one half frequency deviation of $$f_2 f_{1\text{CF}} = \left(950 + \frac{750}{2}\right) = 1325 \text{ c.p.s.}$$

The frequency separation range thereby becomes $\Delta F_i = 925 \mp 375$ c.p.s.

Audio sweep frequency oscillator 107 generates a linearly frequency modulated signal, $f_{si} = (f_s \mp \Delta f_d)$, where the ($\mp$) designation defines positive slope direction of change, upon being modulated by the linear sawtooth voltage from sweep voltage generator 102 applied to its modulating element. The sweep voltage output of sweep generator 102 is also fed over a second path to the horizontal or X-axis of CRT indicator 317 of FIG. 4 for synchronization.

Sweeping frequency signal, $f_{si}$, is applied over six paths; one path to the input of automatic gain controlled variable gain audio amplifier 113 and a second path to the input of frequency divider ($\div 2$) 101b. The third path connects to contact 1 of IM mode selector switch 101a, and the remaining three paths supply $f_{si}$ as a common input modulating signal to balanced modulator 103 of FIG. 2 and balanced modulator pair 321 and 328 of FIG. 4.

With switch 101a in position 1, the wiper contact connects $f_{si}$ as the input signal to balanced modulator 104. Crystal reference oscillator 105 generates carrier frequency signal, $f_c = 100$ kc. p.s., which is applied over four paths. A first path feeds reference signal $f_c$ to the input of harmonic generator 312 of FIG. 4. The remaining three paths supply common reference carrier signal $f_c$ to the carrier inputs of balanced modulators 103, 110, and 110a.

Alternatively a path may be added for direct $f_{\text{IM3}}$ generation as described in FIG. 1.

The sweep frequency excursion ($f_s \mp \Delta f_d$) obtained from audio sweep frequency oscillator 101 is then applied directly to serve as the swept lower main tone signal of $f_{11}$ of the sweeping two tone test signal. Hence $$f_{si} = f_{1i} = f_1 \mp \Delta f_d$$

where $f_1 = 1325$ c.p.s. and a frequency dispersion of 750 c.p.s., or a frequency deviation about the center frequency of $\mp \Delta f_d = \mp 375$, gives a sweep excursion from 950 c.p.s. to 1700 c.p.s.

Various audio swept frequency oscillator configurations are known in the art; and one that complies with the requirements of high stability and fine linearity within the swept frequency range is, by way of preferred example, the phase-shift type of oscillator described in U.S. Patent 2,321,269 issued June 1943.

A further description of this frequency shifted oscillator is given by M. Artyt, "Frequency Modulation of Resistance-Capacitance Oscillator," Proceedings IRE pages 409–414, vol. 32, No. 7, July 1944. Direct sweep modulation of such R-C phase shift oscillators using control triode tubes, such as of cascade amplifier arrangement, as voltage sensitive variable shunt resistances, are practical for the large excursion of $\mp 375$ c.p.s. or $\mp 28\%$ of the relatively low rest frequency of 1325 c.p.s. Center or rest frequency change is made by a change of the fixed cathode bias voltage for the control tubes, with the input modulating voltage varying the grid bias.

The amplitude of oscillations resulting therefrom are substantially constant as the frequency is varied, and when necessary, a conventional automatic amplitude control system can be used to insure such operation. One such example of a control is given in the book by Terman and Pettit, entitled, "Electronic Measurements," published by McGraw-Hill Co., 2nd edition, 1952, p. 488.

Rapid AGC systems, which eliminate amplitude variation but do not limit the rapidity of response of the system, are used. However, a further benefit, in the present case, is noted where a high percentage of center frequency is developed, the 180 degree phase shift ladder network of M. Artyt's referenced frequency modulated oscillator may accomplish its own amplitude limiting circuit itself.

In mode 2 operation, the sweep frequency signal is changed to $f_{si} = (1755 \mp 375$ c.p.s.). Hence, the sweep center frequency value is switched from 1325 c.p.s. to 1755 c.p.s., and the sweep frequency deviation $$(\mp \Delta f_d = \mp 375 \text{ c.p.s.})$$

and the sweep direction remains unchanged.

The reduced frequency deviation for 5th IM operation is produced in position 2 by switching sweep frequency generator 101 output to a lesser predetermined frequency division by two excursion about its new reference or rest value. The new center frequency value for position 2 is obtained by switching the quiescent or rest frequency of audio swept oscillator 101. For mode 2 case, thus at contact 2, $$\left(\frac{f_{si}}{2} = \frac{f_s}{2} \mp \frac{\Delta f_d}{2}\right)$$

becomes in this example $662.5 \mp 187.5$ c.p.s. Accordingly for mode 2, USB filter 107 output becomes (101.987.5 kc. p.s.$\mp 562.5$ c.p.s.) and is fed to the other input of balanced modulator 108. USB filter 107 may be of a type conventional crystal sideband filter, which is of asymmetrical bandpass characteristic readily rejecting the carrier signal and lower sideband components.

Considering first the common carrier input to balanced modulator 103, wherein the sum and difference frequency products are developed and fed to upper sideband filter 106, which may be of crystal filter type of asymmetrical selectively. USB filter 106 passes unattenuated all frequencies slightly greater than $f_c$ including the sum product term only of $(f_c+f_{si})=(f_c+f_s \mp \Delta f_d)$. It readily suppresses all other modulator 103 output components. Numerically this becomes (101.325 kc.$\mp 375$ c.p.s.).

The output of USB filter 106 becomes the carrier input to balanced modulator 104, whose input modulating signal is audio swept signal $(f_s \mp \Delta f_d)$, when selector switch 101a is in position 1. Sum and difference products developing at modulator 104 output are applied to upper sideband filter 107, which selects without attenuation only the sum product terms while heavily rejecting all other components in the output of modulator 104.

It is to be noted that like direction sweep frequency excursions are being applied to the inputs of balanced modulator 104 and thereby the sum frequency product results in the additive combining of the input signals to thereby effect the doubling of the sweep excursion without harmonic generation.

For mode 1, the sum product output of upper sideband filter 107 becomes:

$$(f_c + f_s \mp \Delta f_d) + (f_s \mp \Delta f_d = (f_c + 2f_s) \mp 2\Delta f_d)$$

Numerically expressed in the given example, therefore for pos. 1 or mode 1 this becomes (102.650 kc.$\mp 750$ c.p.s.) and for pos. 2

$$\left(\frac{f_s}{2} \mp \Delta \frac{f_d}{2}\right) + (f_s \mp \Delta f_d + f_c) = \left(f_c + \frac{3f_s}{2} \mp \frac{3}{2}\Delta f_d\right)$$

The output of USB filter 107 becomes the signal input to balanced modulator 108 $(f_c + 2f_{si})$. In turn the carrier input of balanced modulator 108 is the common local oscillator signal $f_{lo}$, of frequency value 10.4 kc. supplied from the output of upper sideband filter 109.

The 100.4 kc. $f_{lo}$ signal is predetermined to be $(f_c + f_{IM3})$, and is generated and supplied "momentarily" in the following way, $f_{IM3}$ Stable Audio reference oscillator 119 generates signal $f_{IM3}=400$ c.p.s. which also serves as in FIG. 5 as a reference signal input to the ISB transmission system under test. The signal output of frequency 400 c.p.s. is also fed to one contact of momentary switch, MS 120, which is normally open as shown. The other contact of MS 120 connects to the signal input of balanced modulator 110. Modulator 110, receiving the reference carrier input $f_c$ has its double sideband output fed to USB filter 109 which selects only the sum product term of $(f_c + f_{IM3})=100.4$ kc. This signal is also supplied to serve as the reference signal input to phase comparator 326 of FIG. 4. USB filter 109 output becomes $f_{lo}=100.4$ kc. upon the momentary closing of MS 120. USB filter 109 may be like unto USB filter 106, or be of fixed 400 c.p.s. BW selective bandpass filter type of center frequency value $f_{cF}=100.4$ kc.

Sum and difference products developed in modulator 108 output are fed to low pass filter 111. Low pass filter 111 passes only the difference frequency product of $(f_c + 2f_s) \mp 2\Delta f_d - (f_c + f_{IM3})$ namely $(2f_s - f_{IM3}) \mp 2\Delta f_d$. Numerically expressed this becomes $$(2250 \text{ c.p.s.} \mp 750 \text{ c.p.s.}).$$

This sweep frequency excursion is to hereafter function as the swept upper main tone signal of $(f2 \mp 2\Delta f_d)$, since $$(2f_s - f_{IM3}) = [2f_1 - (f_1 - \Delta F)] = (f_1 + \Delta F) = f_2$$

This sweep frequency output of low pass filter 111 is fed to the input of automatic gain controlled variable gain audio amplifier 112. It is not intended that the present invention be limited by the use of the particular variable gain audio amplifiers 112 and 113 which are capable of responding to produce the controlled amplitude or AGC'ed signal output. These stages may by design be replaced by other devices as elements for varying amplitude (or frequency) are known in the art. Unique utilization is then derived in automatic control whereby the controlled element functions as but one unit of the system's closed loop operation. In this respect, examine the "momentary" $f_{IM3}$ signal applied that, for closed loop description, stands as simple illustration substituting for the independently generated signal of $f_{IM3}$ audio reference oscillator 119. Clearly, self-starting action is a practical advantageous feature; since otherwise in interrupted operation, resupplying of the starting $f_{IM3}$ signal transient is needed. In self-start condition as notably evident therefrom, switch MS 120 is omitted by replacing the momentary signal with a preferred frequency synchronized $f_{IM3}$ oscillator 119, for example like General Radio Co. 1310-A Oscillator, making use of an injection phase lock method. AGC'ed audio amplifier 118 output then serves as the $f_{IM3}$ synch input to the preferred oscillator 119, whose frequency output thereafter remains equal to the antiphase intermodulated feedback $f_{IM3}$ signal.

Closed loop operation is based on the realiation that odd difference IM products generate themselves either in phase or in antiphase of 180°, and further that a non-linear positive curvature element and a corresponding negative curvature non-linear element produce distortion products opposite in sign (see reference theory, pp. 181–185 "SSB Principles and Circuits," by E. Pappenfus et al., McGraw-Hill, 1964). Therefore, coupled with $f_{IM3}$ frequency invariations as this antitone frequency will be caused to vary modulated feedback $f_{IM3}$ controlling signal will not reflect variations as this antitone frequency will be caused to vary simultaneously within the feedback loop in such a way as to keep $f_{IM3}$ oscillator output constant. The loop gain may be adjusted to be substantially unity. As now becomes obvious, oscillator 119 may be any oscillator susceptible of synchronization, together with cooperative apparatus where needed to effect synchronization. Example of such is a conventional phase comparator-reactance control combination whereby the oscillator 119 output and IM-FB antitone $f_{IM3}$ phase comparison feeds an error correction to a phase control element of oscillator 119.

An example of long standing prior art, recognized reference textbook, "Modulators and Frequency Changers," by Dr. D. G. Tucker, 1963, Macdonald and Co., England, gives the term "anti-phase" on p. 184, the definite terming of modulated feedback on pp. 180 and 183 and also reference tone used in paragraph on p. 61 "Modulators (note in this inventor's case non-linear stages functioning as intermodulators) in Control Circuits." In full keeping with Dr. Tucker's terminology, the term use of "intermodulated feedback," or IM-FB, stands as clear designation of the new signal process described herein.

In like manner, since disharmonies of the non-stationary two-tone frequency pair must prevail during the scan excursion where absolute frequency values change without harmonic relation, then the constant IM3 terms from the non-linear IM-FB operation results with the antiphase feedback relation being present and usable for maintaining a local oscillator relative to the referency tone. Hence, for the feedback $f_{IM3}$ signal, the new connotation of "antitone" is clearly appropriate and in close accord with Dr. Tucker's reference. Therefore, while first given herein, no further definition need be required in view of this above referenced art.

The sweeping signal outputs of AGC'ed audio amplifiers 112 and 113 are connected to separate inputs of linear summing network 114. At the output of summing 114, the two signals are linearly combined to form the sweeping two-tone signal of linearly varying absolute frequency values and having linear variation of the difference frequency separation $\Delta F$ between them with time. Any IM distortion resulting in the test signal source itself is minimized by the presence of low pass filters 111 and 117, and resistive isolation padding within the linear additive combining network 114. Summer 114 feeds its output over two paths, one path being to the variable output attenuator 115 while the other path feeds the input of non-linear device 116.

Figure 3A:
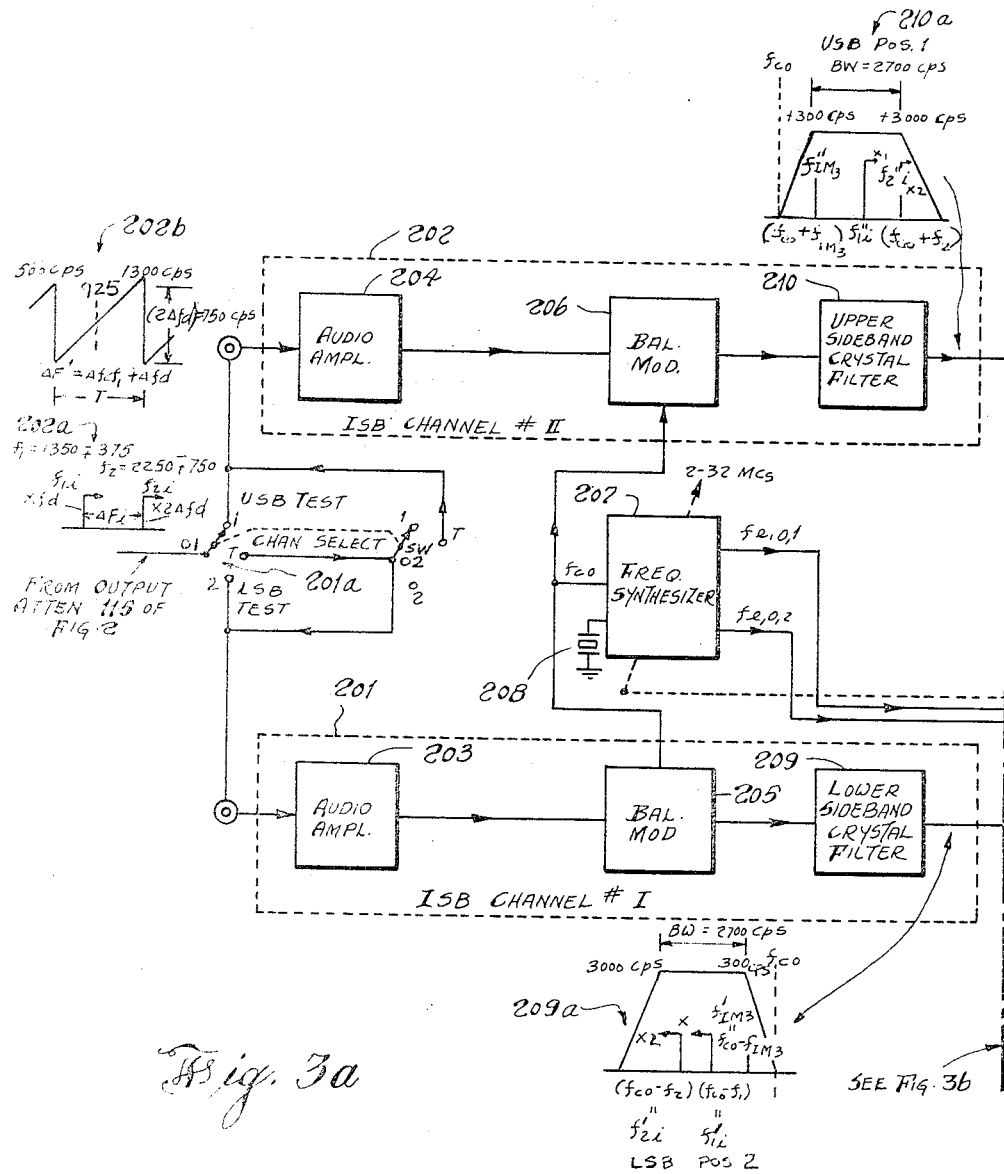
FIG. 3 (comprising FIGURES 3a and 3b) is a block diagram of a typical Single Sideband (SSB) and Independent Sideband (ISB) Transmission System under test and the modes of test signal application.

The output of attenuator 115 becomes the test signal supplied to the audio input of the SSB-ISB transmission system 200 under test of FIG. 3. A difficulty experienced in practice by the use of the complex frequency synthesizer 14 of FIG. 1 is the fact that while the synthesizer may be set to the exact local oscillator frequency value desired and thereafter so remain, the stability of the test signal being used itself may well result in a changing of the resultant translation to about a new IF frequency value other than the predetermined IF. As such, the further goal of the present invention is to provide a controlled local oscillator signal frequency that secures and maintains the translation to about the predetermined frequency IF, and fairly independent of test signal stability. Thus, equally relied upon in the sustaining generation of reference signal $(f_c + f_{IM3})$ and for within the novel AFC operation is the further realization one may now make that although the associated main tones and intermodulation product terms are continuously varying their frequency with time, the principle IM term being developed is of constant and invariant frequency location in the course of the sweep cycle. Since the sweeping signals are derived from a common sweep source and the sweep rate is doubled for one of the pair of swept signals in an additive manner, any frequency drift in the common source does not affect the quiescent frequency location of the constant IM term of interest since the two to one sweep ratio remains in effect. Subsequently any frequency discrepancy from its specified location after response output frequency translation, is directly traceable to the frequency error that occurs only in the first translation operation of the output analysis sections of FIGS. 4, 5, and 6. Accordingly, the frequency error is hereinafter further localized to be resultant from solely the first RF to IF translation operation of the double conversion processes.

It now remains to describe the continuing generation of the controlled local oscillator signal of $(f_c + f_{IM3})$ as accomplished by non-linear type feedback IM whereby an "antitone" $f_{IM3}$ signal develops indirectly of the two-tone signal generated at the output. The combined two frequency signal output from summer 114 feeds to input of non-linear device 116.

Intermodulation and harmonic distortion terms develop, and the non-linear device 116 output is then fed through a flat topped active lowpass filter structure 117, herein comprising a cascade arrangement with sharp skirt selectivity. The pass region of the low-pass filter encompasses $f_{IM3}$ only, say, at 400 c.p.s. bandwidth, with the cutoff a frequency value of $f_{co} > 400$ c.p.s. It is to be noted that the AFC operations being herein described may be effected by static $f_{IM3}$ type test signal generation which may at times be desirable, for the very high output tuning frequencies of the transmission system under test.

A two-terminal device having a voltage current relationship which is expressable as an expanded power series of $i = A_0 + a_{1e} + A_2 e^2 + A_3 e^3$, or a dual even order, is a usable non-linear device, and such an element is a square law detector. Where the power series expansion is of the odd function type of say $$e_0 = A_1 e_1 + A_3 e_1^3 + A_5 e_1^5 + \ldots$$

this represents the input-output transfer characteristic of a limiter or clipper or push-pull non-linear stage 116. Accordingly, there occurs splatter (intermodulation) frequency components of the odd order in the output, of which the lower third term is static and of $f_{IM3}$ value. LPF 117 applies its output of $f_{IM3}$ to the input of AGC'ed Audio Amplifier 118, as an anti-tone reference.

The output of AGC'ed audio amplifier 118 becomes the modulating signal input of $f_{IM3}$ to balanced modulator 110, thereby closing the control loop for the stable generation of local oscillator signal of $(f_c + f_{IM3}) = fl \cdot o \cdot$. This continuous signal of $(2f_{1i} + f_{2i}) = f_{IM3} = 400$ c.p.s. replaces the momentary signal that was initially supplied by the closing of momentary switch 120. Observe then that only crystal reference oscillator 105 and audio sweep frequency oscillator 101 remain as the direct signal generating sources in the unique signal producing and processing circuits arrangement of FIG. 2. Note further that only SFO101 of the above designated oscillators is commonly supplied to each tone channel in the development of the sweeping tone test signal outputs of interest. This disclosed signal generation operation serves to negate any frequency error discrepancy due to frequency instability such as would result from the use of more than one crystal oscillator, where existing differing frequency drift amounts and direction are known to introduce undesirable effects in the area of narrow band, highly selective measurements. Whereas the stages of FIG. 1 represent one embodiment, and the generation principles are further shown by the block diagram example of FIG. 2, it is clear that the scope and applications of this nature of signal generation is of broad range and may be readily extended in an evident manner in accordance with the teachings of the given examples.

Of a further particular interest in the detailed generation description of FIG. 2 is the capability of producing the desired sweep relation for the development of a constant 5th odd order intermodulation distortion term as mode 2, in addition to the already described mode 1 constant 3rd IM term relationship. Herein, it is advantageous to establish the constant frequency $f_{IM5}$ term to be of like audio frequency value as that of $f_{IM3}$ or equal to 400 c.p.s., and with the same sweep width excursion of $f_{si} = f_{1i}$.

Taking note now of the relationship as expressed for tone channel $f_2$ (within brackets), then setting of IM mode selector switch 101a to position 2 results, generated sweep signal output $f_{si}$ of ASF osc. 101 feeding the input of divide by two frequency divider 101b; and producing $f_{si}/2$ which becomes the signal input to balanced modulator 104. The sum output of USB crystal sideband filter 107 then is expressed as $$\left[ f_c + \frac{3f_i}{2} \right]$$

Assume now a momentary carrier signal input to balanced modulator 108 of frequency value $$\left[ f_c + \frac{f_{IM5}}{2} \right]$$

which is to be derived in a similar manner as earlier done for $(f_c+f_{IM3})$. Here $f_{IM3}$ audio reference oscillator 119 may be switched to generate $f_{IM5}/2$ directly or its prior output of $f_{IM3}$ may be divided by two to give $$\frac{f_{IM3}}{2}=\frac{f_{IM5}}{2}$$

since $f_{IM5}$ is being predetermined to be equal to $f_{IM3}$. Low-pass filter 111 in the output of balanced modulator 108 now passes the difference product of $$\left[\frac{3}{2}f_{si}-\frac{f_{IM5}}{2}\right]$$

Accordingly, this signal becomes the higher frequency sweeping tone test signal of the swept pair of tones, that is, $$[f_{2i}]=\left[\frac{3}{2}f_s-\frac{f_{IM5}}{2}\pm\frac{3}{2}\Delta fd\right]$$

Numerically expressed, for a constant $IM_5$ value of 400 c.p.s., and making use of the same $f_{1i}$ values, then $f_{2i}=1787.5\mp562.5$ c.p.s. and $$f_{IM5}=3f_{1i}-2f_{2i}=3(1325\mp375)-2(1787.5\mp562.5)$$
$$=400 \text{ c.p.s}$$

Hence in the feeding back of the generated sweeping pair of tones signals via the previously described non-linear path through non-linear device 116, the constant frequency term of $f_{IM5}$ is produced. In the numerical example given, it is noted that $$\Delta F_i=(1787.5\mp562.5)-(1325\mp375(=462.5\mp187.5$$

and thus coincidence can occur between $f_{IM5}$ and $\Delta F$ at one moment in time. To eliminate such possible ambiguity, non-linear device 116 must be of the odd function type that avoids the development of even order intermodulation products. In an alternate manner, coincidence of $f_{IM5}$ and $\Delta F$ is avoided by the altering of the center frequency of the audio swept frequency oscillator 101 to $f_s=f_1=1755$ c.p.s. In this case, the numerical expressions become $f1_i'=1755\mp375$ and $f2_i'=2432.5\mp562.5$, giving $\Delta F_i'=677.5\mp187.5$ and $f_{IM5}=400$ c.p.s. separable from the lowest $\Delta F$ value of 490 c.p.s. The sweep width and ratios remain unchanged, i.e., $SW_1=750$ c.p.s. and $SW_2=1125$ c.p.s. Note also that in those applications wherein sweeping tone relationships are required such that $f_{IM}$ constant equals the $\Delta F$ value, a constant value $f_{IM}$ signal feedback approach in a linear manner as in FIG. 6 can be utilized. Low pass filter 117 passes the 400 c.p.s. signal now representative of $f_{IM5}$, and feeds this signal to frequency divider ÷2 117a. The divider 117a output of $$\frac{f_{IM5}}{2}=200 \text{ c.p.s.}$$

as connects contact 2 of IM mode selector switch 117b, which may be ganged to switch 101a, along with the frequency switching of $f_{IM3}$ audio reference oscillator 119. The momentary signal input is replaced by switch 117b in position 2, and $f_{IM5}/2$ is supplied to balanced modulator 110 upon passing through AGC'ed audio amp. 118.

Figure 4A:
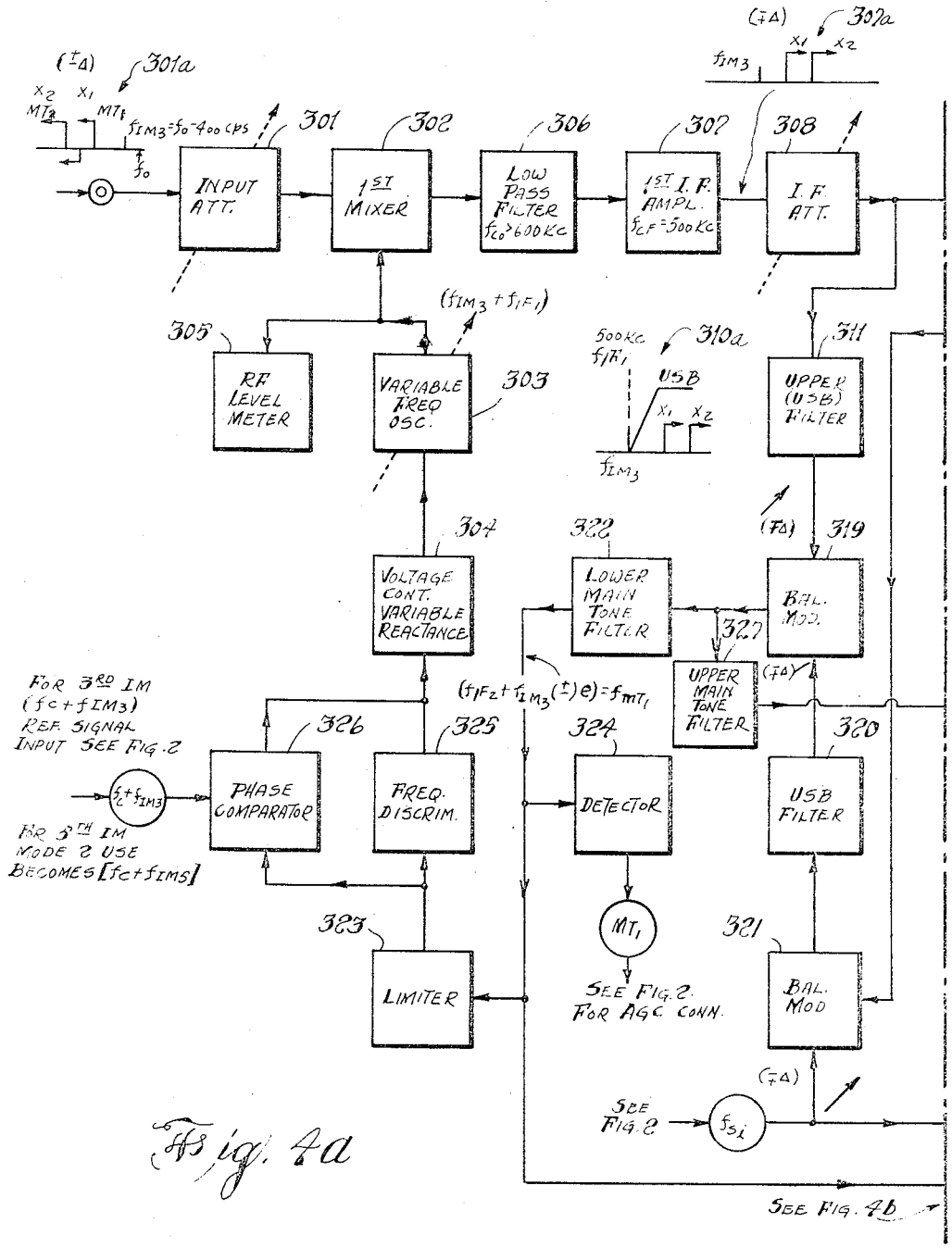
FIG. 4 (comprising FIGURES 4a and 4b) is a block diagram of the circuit arrangement for the analysis of the transmitter SSB mode output and also illustrating the dual control technique of automatic frequency stabilization in the frequency translation operation, with automatic gain control of the test signal source amplitudes.

A shown in FIG. 2, $(f_c+f_{IM5})$, used as the mode 2 reference frequency signal in the AFC operation of FIG. 4, is generated much in the same manner as $(f_c+f_{IM3})$ of mode 1. Hence $f_{IM5}$ is fed by another path directly from the output of low-pass filter 117 to the signal input of balanced modulator 110a; which is also receiving as its carrier input, the reference signal, $f_c$, from crystal reference oscillator 105.

Upper sideband filter 109a in balanced modulator 110a output passes only the sum product term of $(f_c+f_{IM5})$, which is connected to position 2 of selector switch 109b, and in mode 2 feeds to the reference input of phase comparator 326 of FIG. 4.

While it is recognized that the momentary use of an audio frequency reference signal serves separately to actuate the self-sustaining signal generating process shown in either FIG. 1 or FIG. 2, continued useage of such audio reference oscillation in the modulation process performs no more novel function than the earlier described undesirable use of two separate reference oscillators. It is by the antitone $f_{IM3}$ uniquely derived self-sustained action disclosed as IM–FB herein which replaces the momentary audio reference $f_{IM3}$ oscillation that the featured operation by way of but one reference oscillator is then attained with the desired performance resulting therefrom.

In the practical ISB transmission system, the audio amplifier stages are likely to be somewhat identical though not necessarily possessing flat uniform characteristics of gain throughout their bandwidth. The sweep audio frequency excursion through the ISB channels may be taken over those portions of the amplitude-frequency response characteristics that are flat and uniform but perhaps not of equal gain. A static two tone test position, i.e., sweep made inoperative, usually allows for the adjustment of the tones to secure the equal amplitude relationship upon being analyzed.

The erroneous effects resulting in the tone-to-intermodulation splatter ratio and non-symmetrical distribution when an equal amplitude relationship for the two tone type test signal is not maintained is detailed in a technical article "SSB Performance as a Function of Carrier Strength" by Dr. W. Firestone in Proceedings of the I.R.E., December 1956, vol. 44, pgs. 1839–1848. In view of such experimental facts, it is to be observed that where the audio range stages of the ISB transmission system being tested possess varying degrees of gain at particular frequency locations, the equal amplitude relationship of the input test signal is not maintained throughout. Hence, at one moment in time, the gain at particular frequencies may be identical and the related amplitude of the tones being unchanged, remain equal. However, at another moment in time of the sweep frequency excursion, different absolute tone frequency values exist; and since one tone frequency may be at the amplifier response characteristic of a particular gain value, the other spaced tone may be at a different gain thus unbalancing the equal amplitude relationship. To compensate for such amplitude discrepancies between the sweeping main tone test signals during their excursion through the audio bandwidth of the transmission system, gain adjustment of each of the test signal source channel audio amplifiers is made in an automatic manner. This automatic gain control (AGC) system, receives the amplitude error signals from the output analysis section shown in FIG. 4.

The variable gain audio amplifiers 112 and 113 are adapted to vary the amplitude of the particular channel generated signals in accordance with control signals applied thereto as automatic gain control (AGC) voltages from the respective detector outputs 330 and 324 of FIG. 4.

In conventional automatic gain control operation, the input signal slowly varies while the output response is sampled and a proportional amount thereof is fedback to correct the stage gain in accordance with input signal variation so as to maintain the output level constant. Within the closed control system disclosed, the input signal to the stage whose gain is being controlled is of constant level. In the course of the controlled excursion of the signal, through the slowly varying gain characteristic of its signal path, a proportionate output amplitude is sampled and compared, thereupon rapidly varying the gain characteristic of the controlled amplifier to correct the signal amplitude.

The extracted $MT_1$ signal is detected and applied to $f_{si}$ amplifier 113, as a gain control voltage, whereby any difference in $MT_1$ signal amplitude due to amplifier discrepancies within audio bandpass region of transmitter under test 200 varies the gain of the $f_{si}$ amplifier 113 to selectively control the amplified signal as a function of frequency for maintaining the amplitude frequency characteristic of the detected signal substantially flat in spite of characteristic discrepancies.

Conventionally the automatic gain control amplifier may consist of a number of stages with variable "mu" characteristic pentodes connected in triode manner. AGC operation is obtained by way of detected AC signal $MT_1$ (or $MT_2$) from FIG. 4 producing a varying DC component to control the grid bias circuits, as applied to a difference amplifier. A variable potentiometer feeding from a stable DC power source, supplies a suitable reference potential to the difference amplifier, and produced therefrom is an output that is the algebraic difference of the applied inputs.

Equal input levels to like variable gain audio amplifiers 112 and 113 may be set by a separate tone amplitude adjustment using an external voltmeter. Thereupon the two separate outputs of AGC'ed amplifiers 112 and 113 are also adjusted to be of equal amplitudes upon being detected signal outputs of detectors 330 and 324 of FIG. 4, this being done at zero sweep width, that is, at the center frequency.

The pair of amplitude error signals, one proportional to the tone designated $MT_1$ and the other related to $MT_2$, are each separately derived from the individually separated and detected amplified RF signals from the transmission output which are thereafter fed into a difference amplifier also supplied by a zero reference set voltage which initially balances for the operation at the center of the control range.

The difference amplifier acts as a voltage comparator whereby the reference amplitude signal represents the predetermined amplitude level at which the controlled signal is to be maintained and the error signal produced at the comparator output represents the deviation of the controlled signal from the preset reference level.

*Input-output for system under test*

FIG. 3 represents block diagram of a typical ISB–SSB type transmission system under test 200, and illustrates the development of the constant IM terms of interest in the given spectrum sketches due to existing non-linearities thereof.

The two separate audio swept signals, their frequency excursion shown sketched as 202a for $f_1$ and $f_2$; and 202b for $\Delta F_i$, and the subsequent time base for CRT horizontal beam deflection are derived from the common sweep voltage generator 102 of FIG. 2 such that the sweep period is identical for all paths that the sweep output follows. The operational description given by FIG. 3 will mainly concern the functioning for the SSB test mode operation and the measurement of the 3rd lower IM terms being of interest. From the following description, it becomes apparent that the 5th IM term development functions in a similar operational manner, and additional reference will be made to the spectrum nature of the newly introduced palatineus signal as defined herein.

Audio two tone sweeping signal is applied to audio amplifier 204 of ISB channel II 202, from the output attenuator 115 of FIG. 2 when the wiper of channel selector switch 201a is in position 1, position 2 of switch 207a connects to the LSB channel input, and the SSB test mode operation is essentially similar to that of the USB channel alone.

Channel selector switch 201a is a two section ganged singlepole, triple throw switch that is wired as follows. The contact 1 of 01 section connects to contact T of 02 section and to input of audio amplifier 204; the contact 2 and contact T of section 01 connects to the wiper of section 02, and also to the input of audio amplifier 203. Contact 2 of section 02 is not used.

The total ISB test mode is obtained at the center or T position of selector switch 201a which supplies the audio test signal as the common audio input for the two independent channels. This mode of operation is covered in greater detail in the section and paragraph concerned with the description of FIG. 6. At this point, only the SSB test mode is to be described, with the selector switch 201a in position for application of the test signal input to USB operation of ISB channel 202.

It is understood that the automatic gain control (AGC) operations and the like of the ISB transmission system 200 must be disabled to make the system varient.

In sketch 202a, for $f_1$, the sweep covers 950 c.p.s. to 1700 c.p.s. while sketch 202a shows $f_2$ has an excursion of from 1500 c.p.s. to 3000 c.p.s., thus being of like variation direction as that of $f_1$.

Audio dual sweep signal of $f_{11}$ and $f_{21}$ may be also applied to ISB channel I 201 input and, upon passing through audio amplifier 203, becomes the modulating signal input to balanced modulator 205. Now audio dual sweep of $f_{1i}$ and $f_{2i}$ is herein for SSB test being applied to the input of ISB channel II 202, after further amplification by audio amplifier 204, is applied to the input of balanced modulator 206. Amplifiers 203 and 204 are like unto each other, as are the balanced modulators 205 and 206. The balanced modulators 205 and 206 have a stable common carrier frequency input designated $f_{c0}$, which may be any I.F. value and in the given example is 100 kc., that is generated and supplied by frequency synthesizer 207. Frequency synthesizer 207 is conventional with its frequency output being derived from a single crystal standard 208.

Frequency synthesizer 207 also usually serves to supply the local oscillator tuning signals for the IF–RF stages of the transmitter, which for a double heterodyning arrangement are shown designated as $f_{loIF}$ and $f_{loRF}$.

In SSB test ISB channel I, balanced modulator 205 feeds its output to lower sideband crystal filter 209, that selects the inverted difference frequency product and readily suppresses the carrier signal and sum frequency components, to produce the inverted spectrum output in the manner as shown sketched 209a.

For shown SSB test of ISB channel II, the output of balanced modulator 206 is applied to upper sideband crystal filter 210 which passes only the sum frequency components and heavily attenuates the carrier and lower sideband terms. The upper sideband filter 210 output spectrum is representatively shown by sketch 210a.

The crystal sideband filter outputs, that is inverted sweeping tone pair signal $f_{11}'$ and $f_{21}'$ of LSB filter 209 and non-inverted sweeping tone pair signal $f_{11}''$ and $f_{21}''$ of USB filter 210 are fed to separate inputs of linear combining network 211.

The combined dual tone pair at the output of the linear combiner 211 thereby results for T–ISB test and constitutes the usable composite test signal as earlier defined and described for FIG. 1 as Palatineus signal test as shown by sketch 211a to the common remaining stages of ISB transmission system 200. In the course of the sweep frequency test signal excursion through the channel bandpass region of IF–RF section under test 212, the lower 3rd odd order IM terms of $f_{IM3}'$ or $f_{IM3}''$ further develop at the same relative fixed frequency location of $f_{IM3}$ existing in the audio range.

For the example SSB mode test, no signal is present at the lower sideband input of combiner 211 since ISB channel I, 201 is not being used. The spectrum output of the linear combiner 211 is then similar to that of sketch 210 and is applied to the common remaining transmission stages 212 of the transmitter 200.

It can now be understood that wherein the generation due to existing non-linearities of the particular main lower IM term of constant frequency in the audio region is normally expressed as $(2f_1-f_2)$, in this uniquely derived technique it formulates itself in the SB content $[f_{c0}+2f_1-f_2]$ when referenced about the virtual carrier frequency value. This relationship, that is, spaced from the suppressed carrier value by the amount of $f_{IM3}$, is further maintained throughout the upward frequency translation of the transmission system due to the high stability of crystal oscillators or frequency synthesizers normally used.

For USB output, $$f_{IM3} = f_{c0} + (f1_i - \Delta Fi)$$

where $$\Delta F_i = \Delta F_{cf} \mp \Delta f_d$$

and $$f_{1i} = f_{1cF} \mp \Delta f_d$$

$$f_{IM3} = f_{c0} + f_{1cf} \mp \Delta f_d - \Delta F_{cf} \pm \Delta f_d$$
$$= f_{c0} + f_{1cf} - \Delta F_{cf} = \text{constant}$$

For $$f_{c0} = 100 \text{ kc.}, f_{1cf} = 1325; \Delta F_{cf} = 925$$

Then $$f_{IM3} = 100 \text{ kc.} + 400 \text{ c.p.s.} = 1004 \text{ kc. p.s.}$$

Accordingly, the IF-RF frequency translation stages 213 convert the combined sweeping test signal to the high frequency region of 2–32 mcs. The linear RF power output amplifier 214 develops the rated power output into the transmission systems dummy load 215, which substitutes for the antenna during the test measurement.

The power output monitor 216 of the transmission system provides data on the rated PEP (peak envelope power) obtained in the following way. By suitable switch means at the test signal source section, one sweeping tone may be removed from the test signal input. Power monitor 216 then measure the mean power output due to the remaining single tone input signal. Rated PEP thereby equals four times power output in watts due to single tone.

Accordingly thereafter the power output may be monitored and the third order $f_{IM3}$ distortion product be measured for each scan cycle as the audio input level is changed by discrete intervals. In this manner a relationship between power output and distortion may be obtained.

As sketched 212a at the transmitter output, the main $IM_3$ term locates itself at a RF frequency value, that is constantly maintained, as in the illustrated example, 400 c.p.s. above the transmitter output carrier frequency that is tuned. Thus at the carrier channel frequency in the region of 2–32 mcs.; say operating frequency $f_0 = 10$ mcs., then $f_{IM}$ lower 3rd is above at $(f_0 + fIM_3)$ static or (10 mcs.—2400 c.p.s.) = 10.0004 mcs.

The predetermined frequency separation becomes increasingly greater in a linear manner as the sweep cycle proceeds with its frequency excursion, and the minimum frequency separation amount affords adequate spacing between adjacent signals to readily achieve the tracking of this fixed IM frequency component by the most selective narrow band analyzer of FIG. 4. In the illustrated example of FIG. 1, the conventional frequency synthesizer tuned analyzer served well to provide this function. The high stability of such an analyzer's tunable local oscillator for spectrum translation, the wide linear dynamic range, the selectable variation of its resolving bandwidth, its log detection capability and finally its integrated CRT (5") indicator are likewise obtained in FIG. 4.

Note in having the prior "momentary" $f_{IM3}$ signal controlling a frequency synchronized type $f_{IM3}$ audio reference oscillator 119, or by direct $f_{IM3}$ generation from reference oscillator 105, then either tone is useable in the single tone power output measurement by power monitor 216 without interrupted operation. Typical power relationships and representative waveforms, including a four tone somewhat close to a special case like unto a static "palatineus" signal, are given on pages 52–55, "SSB Handbook," by W. Henneberry, publisher Technical Material Corp., New York, 1964.

*Output analysis section—FIG. 4*

Refer now to FIG. 4 which illustrates an embodiment of the output analysis section of the disclosed test set that performs the signal processing of the high frequency test response output of the transmission system under test 200. FIG. 4 further features the unique circuits arrangement that provides for the dual control capabilities in the SSB mode of test. The automatic frequency control (AFC) and stabilization of the variable frequency oscillator (VFO) replaces the previous conveniently used frequency synthesizer of FIG. 1 in accordance with one of the stated objectives of this invention. The automatic gain control (AGC) operation being for the tone equal amplitudes adjustment in FIG. 2 test signal source. As shown by spectrum sketch 301a, the test response for FIG. 4 is chosen from lower sideband test and the output to be analyzed is applied to input attenuator 301, which allows for the proper voltage level input to 1st mixer 302. Variable frequency oscillator 303 supplies the proper local oscillator signal of frequency value $f_{lo1} = (f_{RFIM3} + f_{IF1})$, to the other input of 1st mixer 302, where $f_{RFIM3} = (f_0 - f_{IM3})$ in shown example.

ISB–SSB transmission systems are known to be precise and stable in frequency and the stable nature of the test signal source of FIG. 2 has already been described. Hence the appropriate frequency location of the constant IM term of interest is to be readily determined from the calibrated tuning settings of the test signal source along with the ISB transmission system tuning indicator.

It is to be understood that the operation of the output analysis section of FIG. 4 for measurement of the 3rd odd order term is similar to that required for 5th odd term measurement and the given description will mainly deal with the 3rd or $f_{IM3}$ term. The tuning control and dial indication of variable frequency oscillator 303, as mechanically ganged, may cover, with a suitable band-switching arrangement, the range of the HF-ISB transmission system 200 of 2–32 mcs. plus being at 500 kc. p.s. above such value of the specific constant frequency value IM term of expressed interest, say $f_{IM3}$. Thereupon by way of an automatic frequency control (AFC) operation to be later described, the tuning operation is accomplished, thus exactly frequency translate the $f_{IM3}$ term to the $f_{IF1} = 500$ kc. p.s. location at which it is thereafter stabilized.

VFO 303 output level may be adjusted and set to proper signal amplitude to the mixer 302 as monitored by calibrated indication on RF level meter 305 to thereby provide the desired linear dynamic range relationship between mixer 302 input and output.

With the hetrodyning of these two signals in mixer 302, the sum and difference frequency products along with the input and local oscillator signal appear in the mixer output, and are applied to low pass filter 306. LP filter 306, having its cutoff frequency set greater than the maximum difference frequency value, say at 600 kc., acts to readily suppress the higher frequencies and any other undesired spurious signals that may exist in the mixer 302 output. The passed difference frequency signal becomes the input to 1st IF amplifier 307, which has its center frequency value at 500 kc. and possesses a flat uniform bandpass region having a bandwidth of say 30 kc. p.s. The 1st IF amplifier 307 output as shown by sketch 307a, after passing through IF attenuator 308, becomes the input signal to the 2nd mixer 309 of the double heterodyne arrangement.

A portion of the output from IF attenuator 308 is likewise supplied over another path to upper sideband filter 310, which serves as the AFC and AGC signal path in the stabilization of the first frequency translation and the amplitude control of the tones themselves. The signal processing along this path is discussed in detail in the later paragraphs covering the description of the automatic control operation.

The other input of 2nd mixer 309 is of stable local oscillator frequency value $f_{lo2}=600$ kc. supplied from the output of bandpass filter 311.

In generating the 2nd local oscillator signal of $f_{lo2}$ from the 100 kc. signal output of the single crystal reference oscillator 105 of FIG. 2, note stable oscillator 105 is also common to the generation of each tone signal. This reference and stable signal frequency, which further functions in the reference of the AFC operation, is then supplied to input of harmonic generator 312, which produces a sawtooth type RF waveform at its output. Such a wave contains all the harmonies of the input frequency. Upon being applied to bandpass filter 311, of narrow bandwidth about a center frequency value of 600 kc. only the sixth harmonic term is selected, while all other harmonic terms are readily rejected, and becomes the local oscillator signal to the 2nd mixer 309 as mentioned earlier. The local oscillator signal $(f_{IF1}+f_{IF2})$ is of proper signal level at the mixer 309 to provide a proportional linear relationship between the mixer input and output for over the dynamic range of interest.

Over a second path, $(f_{IF1}+f_{IF2})$ becomes the carrier input of balanced modulator 321, and this signal path is further discussed in the following section and paragraphs on automatic control operation.

Filter 311, of center frequency, $f_{cF}=600$ kc. and narrow bandwidth such that only the sixth harmonic of 600 kc. is passed, supplies the stable 2nd local oscillator signal. Second mixer 309 translated output of sum and difference frequencies along with the input and local oscillator signal feeds, via position 3 of single pole, triple throw selector switch 313, as input to the 2nd IF resolving variable bandwidth selective filter 314. Conventional variable bandwidth crystal filters known in the art may be cascaded in a number of stages and used as filter 314, which at position 3 is switched and fixed at 10 c.p.s., 3 db bandwidth with steep skirt selectivity.

Hence the specific constant frequency term in the difference frequency output of the second conversion process becomes $(f_{lo2}-f_{IF1})=f_{lo2}-$translated $$f_{IM3}=(600 \text{ kc.}-500 \text{ kc.})=100 \text{ kc.}$$

This constant frequency $f_{IF2}$ signal of 100 kc. is selectivity bandpassed by the 2nd IF resolving selective crystal filter stages 314 being of variable bandwidth at center frequency $f_{cF}=100$ kc. in the 2nd mixer 309 output. The second mixer 309 output path feeds to 2nd IF selective filter 314 via the selector switch 313 being in position 3, and the other switch positions will be described in the later paragraphs on the AGC-AFC operation. This filter 314 output is thereafter applied to linear or log detector 315. The resultant varying DC output of detector 315 is then amplified by vertical deflection amplifier 316 to be thereupon applied to the vertical plates of CRT indicator 317. With frequency axis calibration by way of the synchronization voltage supplied from sweep generator 102 of FIG. 2, the visual traceout represents the frequency response characteristics of the IM term of interest within the SSB channel bandpass region of the ISB transmission system being tested.

The tracking and effective 100% interception of the translated fixed IM term is made by the analyzer section's IF resolving strip 314, which usually, at 10 c.p.s. BW consists of three or more cascaded stages of highly selective crystal filter circuits. Use of three stages readily secures the 60 db log dynamic range of response. With the IM term of interest translated downward to be coincident with the center frequency value of the narrow resolving $IF_2$ bandpass region usually set at 100 kc., the other varying frequency components of the transmitter output are fully attenuated at this location in the analyzer signal path.

The bandwidth setting of the resolving $IF_2$ is dependent upon the initial frequency separation of the sweep test tones, that is, $(f_2-f_1)$ which for desirable operation becomes the band base selectivity criteria at greater than 60 db.

This is more than adequately attained by the fixing of the static resolving $IF_2$ bandwidth for selector switch 313 position 3 at a 3 db setting of 10 c.p.s. or less. The following log detection and vertical deflection amplification processes of the analyzer section are conventional and well known. Thus, with the ready availability of the output analyzer, direct IM plotting is developed either on the CRT screen, or using the X–Y input of a graphical record recorder by plotting the video output with synch 'X' driving voltage from the sweep source.

In the case of repeated scan display on the CRT screen, use may be made of conventional CRT beam trace blanking techniques in the course of the sweep flyback time.

The output analyzer unit is made to achieve the 100% intercept probability of the constant (now a HF value) frequency main IM tone of interest by tuning the variable frequency, an AFC controlled oscillator, of the analyzer to accept at the center of its input passband the frequency component of interest, which in the illustrated example, locates itself 400 c.p.s. below the transmitter virtual carrier frequency output value.

In essence, this SSB distortion measurement technique represents, at the transmission output at any one instant of time during the excursion cycle, a two-tone RF signal of variable frequency separation with time; the frequency separation being like lower tone variation and fixed, then frequency location of the lower 3rd odd order IM term is of constant (RF) frequency value.

In the like typical system of FIG. 3, there may be an ISB-SSB transmitter where double conversion occurs after the linear combining and the output amplifier stages are tuned to the difference frequency mixer output after each conversion. For this situation a frequency inversion occurs at the first frequency translation since the local oscillator frequency being used is below the input signal frequency. An odd order IM term still develops, or if of prior existence is accordingly similarly translated.

For this case of signal processing where inversion results, the sweep excursion occurring at twice the width becomes the lower frequency tone, where the upper frequency tone is of one-half the sweep width. The direction of the changing frequency of the sweep excursion is reversed, but both are proceeding in a like scan direction. Actually the constant main IM relationship now becomes $(2f_2-f_1)$ wherein the 3rd upper odd order term is being developed to occur at the same frequency location that the prior constant frequency location IM term exists, or if none has developed, at the location which is being monitored at the transmitter output. Thus, irrespective of the translation process that is in effect, the main IM term distortion is continuously being accummulated through the system and is the specific IM term that is to be tracked by the analyzer section of FIG. 4. To accommodate direction reversals, the variable frequency oscillator 303 may be set at 500 kc. below IM term of interest.

In rapid testing, it is not always necessary to measure or determine the distortion level of all the odd IM terms developed. It is only at times required that it be indicated that the particular level is at least below a specified limit. Hence, if the 3rd (main) IM term meets the specified level, then the probability is great that the other terms, 5th, 7th, etc. are at least below this value, and this indication may serve as signal to distortion ratio plotting.

For the integrated test set, the dynamic range for plotting purposes would include a 60 db calibrated screen rather than on the vertical scale breakup of 40 db–20, used by spectrum analyzers for individual "pip" response displays. Calibration of the zero db reference line is obtained by having the amplitude of one tone of the main two tones set to deflect to the zero db line. This is to be a static calibration, that is, all sweeping frequencies made stationary by disconnecting the sweep voltage source.

Automatic control operations of FIG. 4

It is to be noted from the recent results of prior art static two-tone intermodulation measurements that at particular levels of test signal voltage drive, the intermodulation components of $IM_3$ and $IM_5$ at times apparently vanish. (See reference technical publication in IRE Transactions on Communications Systems, "Linearity and Intermodulation in High Power Tuned Amplifiers," R. C. Cumming, June 1962, p. 219–220.)

Further novel use is herein made in view of this newly revealed fact to undertake and insure the unique AFC operation of variable frequency oscillator 303 in a linear path feedback error signal approach. Also it is long known that in the CCIF method of measuring intermodulation distortion where two static frequencies of equal amplitude are applied to a system and the lowest frequency difference, 2nd order product is extracted with a low-pass filter, has a recognized drawback in its failure to determine odd order distortion, which usually is the principal distortion in push-pull systems. Herein this observation has been put to advantageous use by the application of the input audio test signal producing the response of interest, to a non-linear pull-pull device in the course of accomplishing an AFC operation by the supplying of reference signal $(f_c + f_{IM_3})$. Within the embodiment of this present invention, as illustrated by the integration of the test signal generation of FIG. 2 and the output analysis signal processing of FIG. 4, the basic principles of sweep frequency removal and audio frequency shifting are further implemented in a novel technique to obtain automatic control operation of the overall test set.

Now consider the second path output of IF attenuator 308 that, as earlier described, feeds to upper sideband filter 310, USB filter 310, is of asymmetrical selective characteristic and is set to pass frequencies located from 250 c.p.s. to 6250 c.p.s. above the $IF_I$ reference frequency value of 500 kc. In the course of the tuning operation to attain the proper translation to $f_{IF_1}$, the sweeping tones are first injected into the passband of USB filter 310, appear at its output, and thereupon applied as modulating signal input to balanced modulator 319. The carrier signal input to balanced modulator 319 is of like sweep frequency direction as the modulating input signal and of equal sweep frequency deviation as that of the lower main tone signal of $f_{1i}$, thus resulting in a sweep frequency removal operation, SFR #1. The upper main tone is extracted later on in the process of SFR #2. The automatic control operation of the present invention innovates via a linear error signal feedback path the dual control feature of AFC and AGC.

The carrier input to balanced modulator 319 is supplied from the output of USB filter 320 in the following way. Audio sweep frequency oscillator 101 of FIG. 2 supplies modulating signal $f_{si} = f_{1i} = 1325 \mp 375$ c.p.s. to the input of balanced modulator 321, which is also receiving the carrier input of $fl\ 0.2 = 6f_c = 600$ kc. from the output of bandpass filter 311. Balanced modulator 321 double sideband output feeds to upper sideband filter 320, which allows unattenuated passage of the sum frequency products only. The USB filter 320 output of $$[(f_I F_1 + f_I F_2) + f_1 \mp \Delta f_d]$$

becomes the carrier input to balanced modulator 319, wherein sweep frequency removal operation 1 takes place. The double sideband outputs of balanced modulator 319 results in the main difference products in the lower sideband $$[(f_I F_1 + f_I F_2) + f_1 \mp \Delta d] - [(f_I F_1(\pm)e + \Delta F \mp \Delta f_d)]$$

and $$[(f_I F_1 + f_I F_2) + f_1 \mp \Delta f_d] - [(f_I F_1(\pm)e + 2\Delta F \mp 2\Delta f_d)]$$

The first term becomes static lower tone of $$[f_I F_2(\mp)e + (f_1 - \Delta F)] = f_{IF_2}(\mp)e + f_{IM_3}$$

The second term for the higher tone becomes $$[f_I F_2 + f_1(\mp)e - 2\Delta F \pm \Delta f_d] = [f_I F_2 + f_{IM_3} - \Delta F \pm \Delta f_d(\mp)e]$$

Hence, the sweeping lower tone related to $f_1$ becomes a static frequency component of $(100.4\ \text{kc.} (\mp)e)$, where $(\mp)e$ represents frequency error resulting in the frequency translation from the exact $IF_1$ value desired.

Though not shown in the simplified spectrum sketches of FIG. 4, the sweeping difference frequency component $(\Delta F \mp \Delta f_d)$ and other sweeping IM terms are present. However, the difference frequency term for $\Delta F$, while also appearing as a stationary component in modulator 319 output can be shown to locate itself above the lower static term by $f_{IM_3}$ amount or numerically at $(100\ \text{kc.} + 400 + 400) = 100.800$ kc. With modulator 319 output feeding tone filters, 322 and 327, lower main tone filter 322 passes only the static MT difference product and upper main tone filter 327 passes the $MT_2$ sweeping difference frequency product in the lower sideband of the double sideband output.

USB filter 310 serves to suppress the $f_{IM_3}$ component at its $f_{IF}$ value. Lower main tone filter 322 thereafter further suppresses the static $f_{IM_3}$ component to a negligible level and also serves to readily attenuate the static $\Delta F$ term in modulator 319 output.

Lower and upper main tone filter 322 and 327 respectively may each be of the conventional flat topped bandpass filter type, comprising for example a crystal lattice cascade structure, which exhibits sharp skirt selectivity. $LMT_1$ filter 322 is of center frequency value $(f_I F_2 + f_{IM_3})$ and 600 c.p.s. bandwidth. $UMT_2$ filter 327 is then of sufficient bandwidth to encompass the $MT_2$ sweep excursion of $\mp \Delta f_d$, about the center frequency value of $(f_{IF_2} + f_{IM_3} - \Delta F)$. $LMT_1$ filter 322 output feeds over three paths, one path being to input the detector stage 324 to allow for the automatic amplitude control of the dual control operation. This detection process is likewise repeated for the upper main tone by obtaining a static component in the second sweep frequency removal operation in balanced modulator 328. This receives sweeping upper main tone from filter 327 as input, and $f_{s1}$ as its carrier to produce sum product output which is a static output signal MT2 passed by upper sideband filter 329. Conventional use of a disabling switch between filter 322 and the detector 324 may be made as well as in the path to detector 330.

At this point, note is made that the desired linear dynamic range relationship between the input and output of balanced modulators 310, 319 and 328 in the dual automatic control feedback paths are maintained by having the carrier input signals of a much greater level than the input modulating signals.

Detector 324 produces a DC output proportional to the amplitude of the input signal $(f_{IF_2} + f_{IM_3})$, which is applied for comparison with a reference for development of the automatic gain controlling voltage being fed to variable gain audio amplifier 113 of FIG. 2 as earlier described.

A second path $(f_{IF_2} + f_{IM_3})$ connects to contact 1 of selector switch 313. The setting of switch 313 to position 1 along with the new bandwidth setting of 2nd IF resolving selective filter 314 results in the frequency response traceout of the lower main tone component in the course of its frequency excursion through the bandpass region of the transmission system under test 200, since the filtered static signal $(f_{IF_2} + f_{IM_3})$ is representative of the lower main tone signal of $MT_1$.

LMT Crystal filter 322 output is supplied to the input of limiter 323 and consists of the translated static term $(f_{IM_3} + f_{IF_2})$ with frequency error, or $100.4\ \text{kc.}(\pm)e$. In the course of initial tuning, wherein the swept energy signals are brought into the bandpass region of LMT filter 322, the rate of their frequency excursion usually exceeds the follow-up capability of the feedback arrangement and are not slow enough to remain within the lock-in bandwidth range of the control loop.

The $(f_{IM3}+f_{IF2})$ error signal output from limiter 323 of $[100.4\ kc.(\pm)e]$ is fed over two paths; one path to the input to frequency discriminator 325; and over a second path, to one input of phase detector 326, whereby frequency and phase comparisons are respectively made. As described earlier, phase detector 326 receives its other reference input of $(f_{IM3}+f_c)=f_{IF2}+f_{IM3}=100.4$ kc. from crystal upper sideband filter 109 of FIG. 2. Discriminator 325 has its reference center frequency value predetermined to be at $f_cF=f_{IF2}+f_{IM3}=100.4$ kc.

Discriminator 325 and detector 326, like conventional comparators, are subject to amplitude variation errors of the input signal and limiters, such as limiter 323, are normally used in the signal paths prior to the comparator inputs. The parallel arrangement of discriminator 325 and detector 326 operates concurrently in a combined manner, whereby automatic control due to discriminator 325 is of a coarse nature in having a large capture range to bring about the closing of the frequency difference in the loop to within the narrow capture range of the phase detector 326. Combination frequency-phase comparators and their operation are known in the art, a suitable example of which is referenced in McGraw-Hill 1964 publication, "'SSB' Principles and Circuits," by E. Pappenfus, etc. FIGS. 8–21, p. 137. The overall effect of such combination signal comparison is that unless the applied error input signal of $f_{IM3}+f_{IF2}(\pm)e$ and the comparator 326 reference input signal are of equal frequency value of 100.4 kc. p.s. and in phase lock, a polarized DC correction signal is supplied by way of conventional loop low pass filter to control the frequency of operation of variable frequency oscillator 303 in the conventional manner until the phase locking of the two signals is accomplished.

Loop low-pass filters serve to stabilize the gain characteristic of the closed frequency control loop, and comparator 326 applies its output of DC voltage proportional to $(\pm)e$, to the voltage controlled variable reactance 304 of variable frequency oscillator 303.

Voltage controlled variable reactance 304, which may be a voltage sensitive variable capacitance diode in its association with the tunable inductance-capacitance network of variable frequency oscillator 303, determines the output frequency of this oscillator. Within the closed loop arrangement, voltage controlled reactance 304 varies in response to the DC correction voltage being supplied by the comparators 325 and 326 to accordingly coact with the frequency determining circuitry of variable frequency oscillator 303 in the conventional manner. Thereby VFO 303 changes its frequency such that the translated test signal response spectrum locates itself in the first IF bandpass region with the constant $f_{IM3}$ component appearing exactly at the $f_{IF1}=500$ kc. value and thereafter stabilized at this position. Thereupon the exact second conversion operation translates this stable $f_{IM3}$ component at $f_{IF1}$ to within the exceedingly narrow pass slot of the $IF_2$ selective filter 314. Normally proper AFC operation is insured since only one static frequency component is present by which the error signal can be obtained. Hence, upon stabilization, the frequency response plotting may be immediately effected by the enabling of the AGC system thru conventional switch connecting in the closing of the amplitude control loop.

Returning now to the output of upper sideband filter 329, the static MT2 component over one path feeds to detector 330 and by the other path connects to contact 2 of selector switch 313. Here detector 330, like detector 324, rectifies the constant frequency signal of $$(f_{IF2}+f_{IM3}-\Delta F+f_1)=f_{IF2}+2f_{IM3}$$

or 100.8 kc., whereby the resultant DC output is proportional to the amplitude of the upper main tone signal $f_2$ or MT2. The DC control voltage is supplied to correct the gain of AGC'ed audio amplifier 112 of the upper tone channel of the test signal source of FIG. 2. Position 2 of switch 313, with a new and greater bandwidth of filter 314, plots the response of MT2.

While a linear sawtooth modulating waveform has been used throughout this description, a triangular waveform may also be used. Here a switchover of sweep direction that accompanies the triangular excursion allows for negation of amplitude variations.

So far the entire operational description of FIGS. 2, 3 and 4 for this distortion test approach has, in its Mode 1, centered upon the tracking of the 3rd IM distortion term. This is a preferred, and rapid test operation, most significant to the in-the-field evaluation of ISB-SSB transmission systems by relatively unskilled test personnel. However, where more elaborate tests are required, this SSB-IM distortion measurement technique is also directed to include the next most prominent IM term of interest. This is the lower 5th odd order IM frequency component, conventionaly expressed as $(3f_1-2f_2)$ with $m=3$ and $n=2$, giving the order $m+n=3+2=5$th. To secure a constant frequency location for the 5th IM component, the ratio between the sweep width excursions become related in a two lower to three higher ratio, or 1:1.5 rather than the one to two ratio for the prior 3rd IM term. Again the range of audio sweep frequencies can be selected; as in FIG. 2 wherein the sweep frequency deviation of the lower main tone is unchanged and the 5th IM term location is to be maintained within the flat bandpass region of the upper or lower sideband channel at the designated position where $f_{IM3}=400$ c.p.s. occurred. In most applications, the measured response for the within band case would be substantialy indicative of the transmission system's characteristics. Hence, in accordance with the prior given description for the derivation of the 3rd term, the 5th is readily established to be at the same relative frequency location thus allowing the output indicating analysis section to remain relatively unchanged. Hence as far as the sensitivity, frequency response, and bandwith setting are concerned, the comparative measurement of the 3rd and 5th term are directly related for the output indication.

The following observations apply for the automatic control operations in the case of $f_{IM5}$ measurement. The sweep excursion is one to one and one half ratio and encompasses a lesser portion of the channel bandwidth of the transmission system under test than experienced by the $f_{IM3}$ measurement and the automatic gain control (AGC) operation need not be exercised as it was in the prior case. Where desired a like procedure as given for $f_{IM3}$ mode may be effected with the exception that in the SFR #2 operation, a frequency deviation of one-half or $\Delta fd$ 2 is to be supplied by the test signal source of FIG. 2, from the output of frequency divider 101b.

For the AFC operation in the stabilization of $f_{IM5}$ at $f_{IF1}$, the following relationships are changed.

The nature of the test input signals for Mode 2 of FIG. 2 in the measurement of the $f_{IM5}$ term are as follows:

|  | Start | Center | Finish | $\Delta fd$ | SW |
|---|---|---|---|---|---|
| $f_{s1}=f_1$ | 1,380 | 1,755 | 2,130 | $\mp 375$ | 750 |
| $f_2$ | 1,870 | 2,432.5 | 2,995 | $\mp 562.5$ | 1,125 |
| F | 490 | 677.5 | 865 | $\mp 187.5$ | 375 | where $f_{IM5}=3f_1-2f_2=400$ c.p.s.

From the above expressions, it is clear that the lower main tone $MT_1$ is now located at $2\Delta F_i$ above $f_{IM5}=f_{IF1}$.

Hence the difference frequency output of lower main tone filter 322 of FIG. 4 becomes:

Since
$$[f_{\mathrm{IF}}+f_{\mathrm{IF2}}+f_{si}]-[f_{1\mathrm{F1}}(\pm)e+2\Delta F_1]$$

$$\Delta f_{F1}=\Delta F \mp \frac{\Delta fd}{2} \text{ and } f_{si}=f_{1i}=f_1 \mp \Delta fd$$

then $$[f_{1\mathrm{F1}}+f_{1\mathrm{F2}}+f_1 \mp \Delta fd]-[f_{1\mathrm{F1}}(\mp)e$$
$$+2\Delta F \mp \Delta fd]=[f_{1\mathrm{F2}}(\mp)ef_1-2\Delta F]$$

As $f_1-2\Delta F=f_{\mathrm{IM5}}$, the feedback error signal becomes of value $(f_{\mathrm{IF2}}(\mp)e+f_{\mathrm{IM5}})$, and a reference frequency signal of $(f_c+f_{\mathrm{IM5}})$ where $(f_c=f_{\mathrm{IF2}})$ must be supplied to the phase comparator 326 of FIG. 4, the frequency discriminator 325 remaining unchanged as $$(f_c+f_{\mathrm{IM3}})=(f_c+f_{\mathrm{IM5}})=f_c+400 \text{ c.p.s.}$$

It now becomes evident that the sweeping audio frequencies can be made to assume a triangular frequency variation with time with the modulating voltage waveform being a triangular generated voltage. With this manner of operation, it is readily possible to track and plot the 3rd IM term on one excursion across the 5″ CRT screen of the analyzer system and, rather than flyback quickly and repeat the plot, on the equal rate return of the horizontal beam deflection, the 5th IM term can be tracked and plotted. This allows for the dual presentation of the two IM terms of importance on the same CRT display since the persistance characteristics of the P7 screen phosphorous coating is sufficient to maintain the pattern traced out by the 3rd term portion of the cycle.

The common synchronizing voltage of this type arrangement becomes the triangular sweep generation of which numerous methods of such generation are known. It is necessary to establish and maintain the sequence of sweep frequency deviations as given in calculations of this specification.

Also using this novel approach in the development of the sweep-audio frequencies, it can be seen that the frequency addition serves for the generation of sweep signal during 3rd IM tracking and also delivers signals required for 5th IM term operation. It is clear that a synchronized pulse output from a sweep voltage generator may be derived at the termination of a linear sawtooth waveform; and during the flyback time, actuate a switching signal alternator. This alternator operation may control the on-off position of a relay, wherein the ganged switching of spdt selector switches shown in the diagrams may be replaced by relay contact positions. Hence in this manner, one scan gives 3rd IM measurement and the succeeding scan cycle gives 5th IM measurement, both appearing on the screen at the same time due to normal CRT screen persistence. The mode of operation is more advantageous than tri-angular wave sweep wherein a less complex audio sweep generation is required.

It is also now evident that the disclosed method of ISB-SSB systems test can be evolved with a sequence of programming established to effectively secure, in a graphical recording manner, the evaluation of ISB-SSB transmitters by relatively unskilled personnel on a production test basis if so desired.

It is further evident that the additive sidebanding increase of input tone $f_{2i}$ coupled with the audio frequency local oscillator heterodyne principle eliminates any subsequent discrepance in this originated distortion measuring technique due to harmonics of the input signal $f_1$. In normal usage for common IM test, it can be seen that $(2f_1-f_2)$ and $(f_3-f_2)$ are equal when $f_3=2f_1$ or second harmonic. Stated verbally, the 3rd odd order term and the 2nd order difference frequency between a 2nd harmonic of tone and the other tone coincide. By direct application of sweeping fundamental input tone $f_{1i}$ from sweep oscillator source 101 of FIG. 2, harmonic injection is minimized.

Relatively high scanning velocities are allowable through this unique technique and the cathode beam trace remains continuously visual. The envelope delay of the ISB-SSB channel transmission system under test, particularly those of the crystal sideband filter type limits the maximum changing rate. The buildup time of the resolving filter of narrow bandpass which lies in the signal processing path before it is detected also is a factor in determining the setting of the most rapid sweep rate. However, with the location of the swept frequency energy having started sufficiently away from the constant frequency location of the predetermined 400 c.p.s. relative value of the IM term being monitored, no swept energy is injected in time coincidence with the resolving IF$_2$ bandwidth and ringing distortion is avoided.

To secure vertical scale calibration, only one static pair of tones is applied. The sweep voltage generation is disengaged (at 0 volts) and the two sweeping audio signals ($f_{1i}$ and $f_2$) are then generating singular frequencies of $f_{1cF}$ and $f_{2cF}$ respectively (as in example 1325 c.p.s. and 2250 c.p.s.). As this setting represents a static tone test, both tones must be set to the ODB calibration line of the screen and so adjusted to be equal by their output amplifiers or through the linear combining network adjustment.

It is to be observed that this narrow band highly selective output response analyzer must have a minimum residual intermodulation self distortion itself which is much below the expected distortion level to be measured of the transmissions output. A linear dynamic range for the measuring of 60 db or greater is possible.

It can now be seen that the uniqueness of this distortion tracking technique FIG. 4 is primarily based on the properties of additive sidebanding and sweep frequency removal, and further takes novel advantage of the well-known operations as commonly supplied with most ISB-SSB transmission systems to originally produce this newly derived SSB manner of IM distortion test of typical ISB-SSB transmitters, either upper or lower channel.

While this example presentation has been primarily concerned with the nominal total ISB-SSB common channel bandwidth of 6 kc.p.s. (with or without the presence of carrier frequency notch filtering), it is applicable to other narrow bandwidths with suitable modifications of the parameters as derived from the theory of operation herein disclosed and formulated.

*Static SSB-ISB common test FIGURE 5*

Having described the SSB test method for constant IM term measurement by way of FIG. 2 and FIG. 4, now additional consideration is given to a static ISB common test in particular which further utilizes the active selective filter of FIG. 1 along with the test signal generator features of FIG. 2. As high drive levels are experienced in the common IF-RF stages, the major amount of distortion is produced therefrom. Recognizing the fact that indeed modulation of the ISB channels by a single common audio signal is but double sideband generation, hence the two frequencies being combined are phase coherent, that is, of equal but opposite phase with respect to the suppressed carrier phase. In actual field operation, however, each of the ISB modulation inputs receives distinct separate information resulting in a composite signal being combined that is not phase coherent. Accordingly, a combined two frequency equal amplitude signal wherein tone phases are not equal and opposite would more suitably simulate field conditions. Such a non-phased and unique two tone test signal derived from but a single audio signal by way of the earlier described test signal source of FIG. 2 is herein provided for the ISB-common test mode being disclosed; along with the novel output response analysis means that measures individual intermodulation terms which result therefrom.

Refer now to FIG. 5 given as a block diagram arrangement that embodies the operating principles of the overall method of static SSB-ISB test and analysis for a typical SSB-ISB transmission system, and more particularly, for the common IF-RF stages. The associated main sections are shown and designated as follows: 120 audio frequency signal generation section "1" which functions to generate and provide the SSB test signal of static audio two tone nature to a single audio input channel for the SSB operating mode of the SSB-ISB system under test 600. Also the $f_{IM3}$ ISB test signal of dual single tone, and of differing phase, frequencies separately applied to the two audio input channels for the ISB common IF-RF stages operating mode of the system under test. Reference frequency signal of $f_{IM3} = \Delta F/2$ c.p.s., value is also supplied for phase comparison and subsequently stabilization of the RF to IF frequency translation, and finally selectable audio tuning operating signals of $$Mf_{IM3} = M\Delta F/2$$

c.p.s. value, where the M term equals 1, 3, or 5, are fed to the audio carrier channels of the active selective filter unit of the output measuring section 500 for the filter tuning and measurement of the main and intermodulation components of interest in accordance with the selection of the related M factor. 300-RF to IF frequency translation section 2, which functions to down frequency convert the RF two tone response output from the transmission system under test to accordingly locate the center of mean frequency of the resultant spectrum content to be at the predetermined I.F. value; and where thereafter the translation is maintained by the automatic phase control action of frequency control section 4, 400, 500-output measuring section 3, which functions to selectively filter in an audio tunable manner and thereupon respectively measure the frequency components representative of the main tones and intermodulation terms of interest existing in the spectrum content of the transmission system's two-tone response output, that has been translated and stabilized to have its spectrum center frequency established at an I.F. frequency value equal to the I.F. carrier frequency value of the active selective filter unit. 400-frequency control section 4, which functions to control and frequency stabilize the RF to IF frequency translation operation in an automatic phase control manner by the indication and monitoring of the filter $$Mf_{IM3} = \Delta F/2$$

c.p.s. feedback value within the signal processing path of the active selective filter unit, and the subsequent phase comparison with the reference $\Delta F/2$ c.p.s. value with corresponding frequency correction of the RF to IF translation to bring about phase lock.

Test signal source of FIG. 2 performs at $SW=O$ as generator 121. Accordingly, two tone audio generator 121 produces two tone test signal of static frequencies $f_1$ and $f_2$, where $f_2 = (f_1 + \Delta F)$; and also separately supplies tone frequencies $f_1$ and $f_{IM3}$ independently to the two inputs of differential frequency converter 122. Converter 122, which comprises a mixer and low pass filter combination, provides $\Delta F$, the audio difference frequency signal output. $\Delta F$ is then fed to 2:1 frequency divider 123, which may be a divide by factor two regenerative frequency divider, to produce audio frequency signal of $\Delta F/2$ c.p.s., value at its output. For ISB Test Mode, $f_{IM3}$ equals $\Delta F/2$ directly. The signal $\Delta F/2$ is applied simultaneously over five paths in the following manner. Two path leads for $$f_{IM3} = \frac{\Delta F}{2}$$

to contacts 3 of sections $a$ and $c$ of triple pole-triple throw (3P3T) switch 124. Another $$f_1 = \frac{\Delta F}{2}$$

path feeds to input of phase shift network 125. The fourth and fifth paths for SSB test mode operating signal of $\Delta F/2$ connect to contacts 1 and 2 respectively, of section $c$ of 3PST switch 124.

The wiper of section $c$ supplies signal $\Delta F/2$ as the reference frequency to the phase comparator 404 of frequency control section 400. From wiper of section $c$, another path applies signal $\Delta F/2$ to the input of variable audio frequency multiplier 126. A.F. multiplier 126, which may consist of an odd harmonic generator feeding to a selective audio frequency amplifier, is tunable and produces a selectable audio frequency output of $M\Delta F/2$ c.p.s. value, where the factor M may be 1, 3, or 5, as the common audio carrier frequency signal to the output measuring section 500.

The output of phase shift network 125 is fed to contact 3 of section $b$ of switch 124. Likewise the static audio two tone test signal output from generator 121 is applied to contact 1 of section $a$ and contact 2 of section $b$ of switch 124, which functions as the test mode selector switch. Accordingly setting switch 124 to position 1 supplies the two tone test signal to the audio modulation input of lower sideband (LSB) channel I-601 of SSB-ISB transmission system under test 600 for SSB-I test mode. Position 2 of switch 124 applies the test signal to the modulation input of upper sideband (USB) channel II-602 for SSB-II test mode. The ISB test mode is obtained at position 3 switch 124, where switch wiper of section $a$ then connects signal $f_{IM3} = \Delta F/2$ to the audio input channel I, while wiper of section $b$ applies this same signal $\Delta F2$ but of offset differing phase to channel II audio input.

ISB system under test 600 in general

Transmission system under test 600, a typical SSB-ISB transmitter, in essence is composed of independent lower sideband channel I-601, independent upper sideband channel II-602, common carrier crystal oscillator 603, linear summing network 604, and common stages functioning as tunable IF-RF frequency translation stages, RF driven linear power amplifier frequency synthesizer controlled section 605, terminated into dummy load 606.

The sideband transmission system under test 600, being modulated by the applied two tone audio test signal, translates the two tone wave to the high frequency region of say 2–32 mcs. at the specific frequency to which the transmitter is tuned. The resulting high frequency two tone response signal appearing at the transmitter 600 output across the dummy load 606, which is substituting for the transmitters' antenna during the test, consists of the translated two tone equal amplitude signal of $f_1$ and $f_2$ and new frequency signals of odd intermodulation (IM) difference frequency product terms $(2f1RF\text{-}f2RF)$, $(2f2RF\text{-}f1RF)$, $(3f1RF\text{-}2f2RF)$, $(3f2RF\text{-}2f1RF)$, etc. that have developed due to the non-linearities. The typical spectrum representation of the transmitter is response output that is to be analyzed is as shown sketched 600$a$. Here it is seen that a symmetrical IM frequency component distribution occurs about a mean or center frequency value of $f_m$, and the existing RF components are separated from each other by frequency intervals equal to $\Delta F$.

It is here noted that the method and apparatus, illustrated and described, wave analyzes an RF spectrum response that contains the main RF tones and the associated IM terms of interest, such as the 3rd and 5th odd order difference frequency products. Accordingly the two tone test signal by which SSB type transmitter is modulated should preferably be of absolute tone frequency values that avoid the development of the audio difference frequency signal, i.e. the $\Delta F$ term, within the audio frequency bandpass of the SSB system under test. Ideally then, the maximum frequency separation, $\Delta FMAX$; would be most often limited to be less than the lowest audio input modulating signal allowed of the transmission system's audio bandpass region.

It is likewise desirable for the second harmonic of the lower audio input tone frequency, i.e. ($2f_{1a}$) be prevented from appearing within the transmission audio bandwidth. For this condition, the minimum frequency value of the lower audio tone ($f_{1a\ min.}$) is preferably limited to be greater than one half the highest specified audio input modulating signal of the transmission system's audio bandwidth. By way of example, for an audio transmission bandwidth of from 300 c.p.c. to 3000 c.p.s.; and $f_{1a}$ at greater than 1500 c.p.s., i.e. say $f_{1a}=1600$ c.p.s., $f_{2a}=1850$ c.p.s. and $\Delta F=250$ c.p.s.

However, in general practice and without reduction of the system's apparatus performance, the absolute audio frequency value of the lower tone of $f_{1a}$ may be set to $$f_{1a} > \frac{1}{2}\left[\frac{(f_{2a}+f_{1a})}{2}+7\Delta F/2\right]$$

that is, equal to or greater than one half the sum of the mean audio frequency value of the tones $$\frac{(f_{2a}+f_{1a})}{2}=f_{c1a}$$

and seven times one half the audio frequency difference or ($7\Delta F/2$). Likewise, the general useful relation for $$\Delta F = \leq \left[\frac{(f_{2a}+f_{1a})}{2}-\frac{7\Delta F}{2}\right]$$

that is, equal to or greater than one half the difference between the mean audio frequency value of the tones $$\frac{(f_{2a}+f_{1a})}{2}=f_{c1a}$$

and the value of $7\Delta F/2$. Alternately, $\Delta F \leq (f_1-3\Delta F)$.

From the above, it is clear that the difference frequency term $\Delta F$, and the second harmonic of the lower audio tone ($2f_{1a}$), if allowed to develop within the audio bandpass region of the transmission system under test, should usually be selected to locate themselves outside the spectrum bandwith that is centered about the RF mean frequency value which extends to the 7th odd order difference frequency components above and below the RF mean frequency; but must be outside $\pm\Delta F$ range of the RF mean frequency. In this case, only one sideband portion of the spectrum is measured. It is thereby noted that since second harmonics of all audio components below midband of the transmitter sideband selecting filter, along with the IM distortion terms, are passed without attenuation, within the limits of the transmitter filter, they are thereupon translated to the RF region. Thus where typical transmitter under test has a passband of say 250 to 2700 c.p.s. the example two tone input of say 1600 and 1400 c.p.s. is applicable, where $\Delta F=200$ c.p.s. Note that while voice modulation itself covers many octaves, the actual energy density is known to be much greater at the moderately low frequencies than at the high audio frequencies. In practice, for example, the spacing between two strong equal amplitude tones in speech normally is very small, say, being 100 to 200 c.p.s. (Ref. "Speech and Theory," Harvey Fletcher, D. Van Nostrand Co. Inc. 2 ed. 1953.) Such a two-tone test signal can be accommodated by test system herein as first disclosed. Hence, in SSB-ISB transmission system testing, it is a further advantage to have this closely spaced two-tone test signal located in the low frequency region of the transmitter's bandwidth.

In the ISB test mode, however, the single common tone therefrom may well locate itself very close to the carrier frequency and cross-talk interference between the two co-channels of an independent sideband system may so develop and be measurable. The noted limitations on the frequency separation term $\Delta F$ do not apply in the case of the ISB test mode obtained at position 3 of test mode selector switch 124. In such operation, any of the $\Delta F$ values provided by the test signal source are useable if within the transmission bandpass and the resultant RF two-tone type response is essentially of similar spectrum content as obtained for the overall transmitter. It is notable from the illustrated embodiment of FIG. 2 that the audio reference signal $f_{IM3}=\Delta F/2$ supplied for the phase control operation of the output analysis means may remain unchanged in the course of selecting either SSB—ch. I test, SSB—ch. II test or ISB test, that is, positions 1, 2, and 3, respectively of mode selector switch 124. Hence the following description of the output measurement means equally applies toward either of the three test modes.

For SSB mode testing, i.e., LSB of transmitter 600 by position 1, and USB at position 2, respectively, of test mode switch 124, the LSB or channel I overall transmitter test is shown being used. It is of note that the ISB mode of test as herein makes further use of the existing audio two-tone test signal source 121 as shown. Thereby one accommodates a wide range off different I.F. frequency locations for existing transmitters and allows for common ISB IF-RF channel testing as well. For ISB test accordingly, position 3 of test mode switch 124 applies singular tone frequency of $$f_{IM3}=\frac{\Delta F}{2}$$

to input of audio amplifier input of LSB channel I, 601 and also to audio amplifier input of USB channel II 602. Phase shifter 125 serves to phase offset by $\Delta\phi$ the signal $\Delta F/2$ input to channel II. The separate modulating channels translate the input audio tone $\Delta F/2$ to thereupon combine and locate symmetrically about the common carrier signal frequency, which represents the 1st I.F. frequency value of the common IF-RF stages of the transmission system. Thereby at the output at the linear summing stage 604 is formed the like well-known two-tone test signal, wherein the lower (see 601a) tone frequency is $$f_1=f_c-\frac{\Delta F}{2}$$

and the upper tone (see 602a) value $$f_2=f_c+\frac{\Delta F}{2}$$

as shown by spectrum sketch composite 604a for an audio frequency separation value of $\Delta F=2f_{IM3}$ c.p.s. in consonance with the test method being described.

Observe in the ISB common test mode, the test signal of $\Delta F/2$ is also directly useable as the reference signal in the phase comparison operation of the invention, and in the generation of the audio $M\Delta F/2$ tuning signals to the output measuring means whenever so desired. In general, the $\Delta F/2$ ISB test signal is normally of further value in the ISB common test mode as becomes further clear when it is noted that the phase offset of $\Delta\phi$ for one $\Delta F/2$ signal input can be varied by phase shifter 125, while say the 3rd IM term is being measured and monitored, thereby exhibiting any distortion changes due to phase discrepancies within the ISB transmitter. In measuring intermodulation spectra in actual transmission system, it is often desired to make such measurements at several drive levels, since the relative levels of the intermodulation components are found to be sensitive to the drive levels applied. Variation and setting of the particular selected drive levels at the test signal source section output of FIG. 2 is obtained by way of variable attenuator 115. In the case of the single tone ISB test mode at position 3 of test mode switch 120, variable potentiometer control means in the output of $$f_{IM3}=\frac{\Delta F}{2}$$

may be used.

By analytic relationships, it can be shown that an SSB envelope with small distortion has one-fourth PEP (peak-envelope-power) in each tone of the two-tone signal and the average power dissiapted into the dummy load is ½ PEP. Carried further and useful in the analysis of FIG. 6 operation later on, the power in each tone of a four tone-equal amplitude signal becomes 1/16 of the PEP, and the power average of ¼ PEP.

*Frequency translator 300 in general*

The high frequency transmission response output is applied to the input of stabilized, frequency translation section 2. Frequency translator 300 comprises a variable frequency oscillator (VFO) 303, a voltage controlled variable reactance 304, and with a converter 302, being a combination of a mixer and an I.F. amplifier. The translation section 300 functions to frequency convert the mean or center frequency value of the high frequency two-tone test response output to a predetermined I.F. value, that equals the I.F. carrier reference value of the test system, and thereupon maintains it thereat through the stabilization action of APC section 400. However, translator 300 operation will further be described in conjunction with the operation of APC Section 400. For the moment, to aid and make convenient the description of the active selective filter unit 300 that is fed the translated spectrum, consider that translator 300 has been tuned to be at $(f_1+f_{IF})$ and stabilized, with the spectrum response output now being centered about I.F. value.

The attenuation beyond the bandpass of an I.F. amplifier stage, which may be of conventional design and may consist of two or more stages, acts to readily suppress all other signals and selectively pass the difference frequency components, that is, sharp skirt selectivity characteristics allows unattenuated passage of the difference frequency product output only and eliminates all other signals from converter 302 output. The incoming RF two tone type response spectrum to be examined is made up of a sideband component distribution about a center or mean frequency value of $f_m = f_1$. Such a distribution constitutes the upper and the lower main and intermodulation signal components developed within the signal channels of the transmission system under test 600. Since the local oscillator frequency $f_{lo} = (f_1 + f_{I.F.})$ to be, say, 500 kc. above the mean frequency $f_1$, then the resultant difference frequency output of the frequency converter 302 becomes [$f_{lo} - f_1 \pm$ main tone audio components and IM odd term audio components of $M\Delta F/2$]. Hence, it can be seen that with $$\left(f_i + 500 \text{ kc.} - f_i \pm \frac{M\Delta F}{2} \text{audio terms}\right)$$

where $M=1, 3, 5$, thereby then equals $$\left(500 \text{ kc.} \pm \frac{M\Delta F}{2}\right)$$

and the incoming spectrum distribution is down frequency converted from about a mean frequency value of $f_1$ to about the predetermined I.F. carrier frequency value of 500 kc. A subsequent frequency reversal occurs that now locates component terms, originally above the mean frequency of $f_1$, an equal frequency interval below the I.F. carrier frequency value, and vise versa for incoming component terms located below the mean frequency value. As is known in the art, the spectrum distribution of the two tone signal response is commonly symmetrically displaced about the mean frequency value of the two tone test signal applied, and thus the frequency inversion of the spectrum components about the new IF center frequency value is usually inconsequential. This fact similarly governs the upper sideband or the lower sideband IM terms of the test spectrum. However in those situations of test wherein a specific IM frequency component term is of particular interest, the operational procedure of the measuring apparatus can readily be designated to properly indicate the method to acquire a polarity identification of the sideband component with respect to upper or lower term being examined and measured.

The following circuit description and analysis is common for the three FIG. 5 test modes, that is, either for the two static SSB tests or the common ISB test method.

The frequency converted two tone test signal response to be analyzed, as shown sketched 600a consists of lower and upper main tone frequency components of $f_1''$ and $f_2''$ respectively, where $(f_2''-f_1'') = \Delta F$; lower and upper third odd order difference frequency (IM3) intermodulation distortion signal components of $$(2f_1''-f_2'') = (f_1''-\Delta F)$$

and $(2f_2''-f_1'') = (f_2''-\Delta F)$, and lower and upper fifth odd order difference frequency IM products of $$(3f_1''-2f_2'') = (f_1''-2\Delta F) \text{ and } (3f_2''-2f_1'') = f_2''2\Delta F)$$

respectively.

Now for the purposes of convenience, consider only the main two tone components of the test spectrum input being applied, i.e. assume for the moment the transmission system under test 600 to be linear. Here note is made of the fact that a double sideband wave is a suppressed carrier AM signal having its sidebands coherent, that is equal but opposite phase; while the two tone signal is non-coherent, i.e. the phase relation of each tone is independent of the other tone's phase.

Accordingly the two tone signal of main tones $f_1''$ and $f_2''$ of unity tone amplitudes, and their odd order intermodulation components, say the 3rd and the 5th by frequency representation may be expressed as a double sideband suppressed carrier signal with the sideband terms being of differing phase relation. Hence, the spectrum response is then expressed as $$\Big\{(\text{Cos } [(Wm-Wa)t+\phi 1] + (\text{Cos})[(Wm+Wa)t$$
$$+\phi 2] + \frac{1}{K_3} \text{Cos } [(Wm-3Wa)t+\phi 3]$$
$$+\frac{1}{K_4} \text{Cos } [(Wm-3Wa)t+\phi 4] + \frac{1}{K_5} \text{Cos } [(Wm$$
$$-5Wa)t+\phi 5] + \frac{1}{K6} \text{Cos } [(Wm+5Wa)t+\phi 6]\Big\}$$

For the main tones, consider Cos $[(Wm-Wa)t+\phi 1]$ and Cos $[(Wm+Wa)t+\phi 2)]$, the first term being tone $A(f1'') = (fm-fa)$; with the frequency $(fm+fa)$ being the second term tone B $(f2'')$. Here $Wm = 2\pi fm$, where $fm$ is the mean frequency value of the translated two tone signal or $$\frac{(f1''+f2'')}{2}$$

or equal to $f_1 F_1'$, also wherein $Wa = 2\pi fa$ with $fa$ being equal to one-half the audio frequency separation between the tones or $(\Delta F/2)$ where $\Delta F = (f2-f1)$. Finally, $\phi 1$ and $\phi 2$ are the respective phase angles of tones $f1''$ and $f2''$, and are independent of each other.

Referring now to the spectrum sketch 600a showing at the output of frequency converter 302 as translated to the mean frequency value of $f_1 F_1$, wherein $f1F_1 = f0$; then let IF crystal oscillator 503 produce the like common carrier signal of unity amplitude, Cos $Wot$, being supplied to the first pair of balanced modulators 505 and 506 of channels I and II respectively. Whereupon the applied carrier signal passes through lag by 90° phase shift network 504 prior to being applied to balanced modulator 505 of channel I to then be expressed as $$(\text{Cos } Wot-90°) = \text{Sin } Wot$$

Thus the carrier IF signal inputs to modulators 505 and 506 are in quadrature, i.e. 90° out of phase. The resultant product term output of modulator 505, for $Wo=Wm$, becomes ½{Sin [$(2Wm-Wa)t+\phi1$]+Sin [$(2Wm+Wa)t+\phi2$]+Sin $(Wat+\phi1)$—Sin $(Wat+\phi2)$}

The components of $(2Wm-Wa)$ and $(2Wm+Wa)$ represent the translation of the two tone signal to about twice its mean frequency value and are the upper sideband terms; and the terms of $Wa$ only represent the folded over difference frequency components with respect to zero frequency and are the lower sideband terms. Going now to the modulation process for the balanced modulator 506 of channel II, the double sideband output of the product is expressed as the following for $Wm=Wo$, $$\frac{1}{2}\{\text{Cos }[(2Wm-Wa)t+\phi1]+\text{Cos}[(2Wm-Wa)t+\phi2]+\text{Cos }(Wat+\phi1)+\text{Cos }(Wat+\phi2)\}$$

The first two terms constitute the upper sideband and the remaining two terms being the lower sideband. The sine function components of Channel I and the Cos terms in Channel II represent the quadrature relationship that exists between the modulator outputs of these two channels. The audio bandpass filters 507 and 508, that follow modulators 505 and 506 respectively, may comprise a combination of high pass filters in series cascade with low pass filters, wherein the center frequency value of the bandpass region for $M=1$, 3 or 5 is tuned to $$f_{c.f.}=\frac{M\Delta F}{2}$$

Accordingly for the main tone measurement, then $M=1$ and $f_{C.F.}=\Delta F/2=f_a$, where the audio terms of $Wa$ are passed and all other components are eliminated. It is to be noted that the selected audio term consists of folded over signals as a consequence of having the carrier oscillator source $f_o$ identical in frequency value to the mean frequency value of the two tones or $f_m$. The passed audio terms are then the following:

Channel I:

½[Sin $(Wat+\phi1)$+Sin $(Wat+\phi2)$]

Channel II:

½[Cos $(Wat+\phi1)$+Cos $(Wat+\phi2)$]

Thereupon, the double balanced modulators 509 and 510 of each channel have a modulating signal applied to them that contains the folded over audio term of $f_a$ remaining after the bandpass filter action.

The common audio carrier signal for the double balanced modulators obtained from the tuning of M term selector for multiplier 126 being set to be of a frequency value identical to the modulating signal frequency, i.e. with tuning at $M=1$ position. Let the oscillator source of $\Delta F/2$ be expressed as Cos $Wct$, where again the carrier signal undergoes a 90 degree phase shift through phase shift network 511 in its path for channel I, but is directly applied to double balanced modulator 510 of channel II. The product output of modulator 509 becomes, for $Wc=Wa$, at $M=1=¼$[Cos $(2Wat+\phi2)$—Cos $(2Wat\phi1)$+Cos $\phi1$—Cos $\phi2$]

For channel II, the produce output is

¼[Cos $(2Wat+\phi2)$+Cos $(2Wat+\phi1)$+Cos $\phi2$]

Accordingly, the linear additive summation of the two signals at the summer stage 512 results in the output signal of ½[Cos $(2Wat+\phi2$+Cos $\phi1$]

Upon application of this signal to high pass filtering, one removes the DC component term of Cos $\phi1$ whereupon for $M=1$ and with filtering cutoff frequency slightly less than $\Delta F$ c.p.s.; its output becomes Cos $(2Wat+\phi2)$, where $$2Wa=\pi(2fa)=2\pi\Delta F$$

Voltmeter 514 measures the amplitude of this signal component, which represents the amplitude of the main upper tone frequency $(fm+fa)$ or $f2''$.

In a like manner as described above, the selective filtering process tuned for $M=3$, and 5, provides for the amplitude measurement of the upper third and fifth intermodulation distortion components of the test signal spectrum under analysis. In a similar signal process for the intermodulation component terms appearing below the mean frequency value, it is now further evident that use of a subtractive combining network 513 allows for the amplitude measurement of the selected lower main and intermodulation terms below the mean frequency value. As such dual use is herein made of the additive summation and subtractive combining to aid in verifying the subsequent achievement of automatic phase lock-in on a predetermined $\Delta F/2$ value in accordance with the novel $\Delta F/2$ frequency stabilization technique of this invention as described in the following paragraphs of this specification.

Thereupon, the channel outputs are separately applied and combined in two linear summing stages, wherein combining network 512 is additive and combining network 513 is subtractive.

In accordance with the analysis given and described for FIG. 5, voltmeter 514 measures the relative amplitude of the $M\Delta F/2$ component terms selected that are higher than the mean frequency value from the output of additive combiner 512 and by suitable switching the $M\Delta F/2$ component terms lower than the mean frequency from the output of subtractive combiner 513.

*FIG. 5—Freq. stabilization operation 400*

The following section describes the tuning and stabilization operation of translation section 300, which earlier for convenience was assumed to take place in FIG. 1 by use of relatively complex frequency synthesizer. In this respect, the coarse tuning operation for FIG. 5 has been conventionally accomplished, and the following discussion of the automatic phase control operation secured by way of frequency control section 4, 400, concerns the fine tuning, stabilization and maintainance for the exactly tuned frequency conversion of the translator section 300.

APC loop section 400 functions to fine tune, frequency control, and stabilize frequency translation section 300 by phase comparison and error correction between the $f_{IM3}=\Delta F/2$ reference signal derived as described earlier from the audio frequency signal generated section 1, 120 and the $\Delta F/2$ error possessing signal obtained in the following described manner.

Low pass filters 401 and 402, which are shown variable and coupled, also are fed from the IF balanced modulator outputs of channel I and channel II of the output measuring section 3, 500. In channel I, 501, the modulation output of IF balanced modulator 505 is applied over two paths, one path leading to bandpass filter 507 in accordance with the signal processing of the active selective filter unit 500; while the other path feeds to variable low pass filter 401. Similarly in channel II, 502, the modulator output of IF balanced modulator 506 is applied over two paths, one path being to bandpass filter 508 and the other path leading to variable low pass filter 402, which is similar to filter 401.

LPF 401 and 402 have their cut-off frequencies set to be greater, by an amount equal to the capture range of the control loop, than the lowest audio frequency component of the two tone type response under analysis, which is the fundamental term in respect to the main tone relation to the mean frequency value, or $(\Delta F/2)$.

The signal outputs of low pass filters 401 and 402 are always identical to the fundamental term outputs obtained from bandpass filters 507 and 508 at the setting of $M=1$, while the higher order terms are readily rejected by the sharp attenuation characteristics of filters 401 and 402.

The output of low pass filter 402 is further applied to phase shift network 403, which may be inductance circuit introducing a positive or leading 90 degree phase shift to input signal applied to it. Accordingly phase shift network 403, may, in an alternative manner, be capacitance circuit, producing a negative or lagging 90 degree phase shift of its input signal.

The output of low pass filter 401 is thereupon combined with the $\pi/Z$ shifted signal output of phase shift network 403, and the resultant combined error signal, designated $(\Delta F/2 \pm \Delta e)$ is applied to one input of phase comparator 404. The reference input of phase comparator 404 is the $\Delta F/2$ audio reference signal derived in the generation of the two tone test signal being used, or $f_{IM3}=F/2$ in the case of common ISB test mode operation.

As is conventional, phase comparator 404 produces a DC output signal proportional to the phase difference between the two signals being compared, and applies its output as correction voltage to the voltage controlled variable reactance 304 associated with variable frequency oscillator 303 of translator section 300. The feedback loop control voltage from the phase comparator 404 governs the coaction between the voltage sensitive variable reactance 304 and the frequency determining elements of VFO303, such that the output frequency of VFO303 is changed to the proper value that secures phase lock between the two audio signals phase compared. At such a point, the local oscillator signal frequency to frequency converter 302 is precisely greater than the mean or center frequency value of the incoming spectrum under analysis by an equal amount to the pre-determined IF carrier frequency value, and exact frequency translation is established.

For convenience throughout in the description of the automatic phase control operation accomplished, the use of limiter stages to obtain constant amplitude signals prior to the input to the phase detectors, while not shown illustrated, is to be assumed present.

*Phase lock tuning operation*

The description of the overall operation of FIG. 5 is now to be completed with the explanation of the translation tuning operation that insures the proper phase lock stabilization action of translator 300 has in fact occurred. If having obtained the exact translation to about the desired IF value in the description of the automatic phase control operation, it here becomes necessary to describe the locating and verifying the occurance of such tuning.

It is noted from the description of the signal processing of the output measuring section 500, FIG. 5, that use of an additive summing stage 512 gives a component output representative of those frequencies greater than the reference mean frequency value, while a subtractive combiner 513 results in filtering of terms below the mean value. Accordingly, the amplitude comparison of the two separate outputs is best made by way of difference voltmeter 515. Since subtractive combining network operation must normally be provided, then the added feature of monitoring differences in amplitude at the combiner outputs is readily introduced as the preferred means of noting that the proper phase lock is in effect.

Thereupon, having the selective filters of the output measuring section 3 set for $M=1$, then obtaining a zero difference amplitude indication by way of meter 515 is but verification of proper phase lock-in at the $\Delta F/2$ term of interest. This is evident, since lock-in besides occurring at mid-frequency location between the two main tone frequencies, may likewise erroneously result at mid-location between a main tone and the 3rd intermodulation component, term, and in cases, between the 3rd intermodulation term and the 5th intermodulation term. Recognize that in the course of typical two tone testing, the 3rd IM term is usually less than the main tone amplitude and greater than the 5th IM term. As such, only the proper location of lock-in at between the main tones results in equal amplitude measurement outputs, and registers as zero on the difference voltmeter 515, which may comprise a differential amplifier and meter.

Hence, a dual purpose is uniquely derived from the novel use of opposite polarity combining networks, whereby way of voltmeter 514, the upper and the lower sideband terms of $M\Delta F/2$ are measureable, while by way of difference voltmeter 515, correct spectrum translation and lock-in is noted to be in effect. Conventional AFC defeat means may be used to interrupt the loop control action where improper phase lock is noted by meter 515; whereupon with further fine tuning of VFO303, a new phase lock operation goes into effect.

Hence in an optimum case, two improper phase lock-in location may exist in a specific design whereby say only the sideband components above the IF carrier frequency are being phase compared at $\Delta F/2$ value. Hence for example where stabilization is effected between the upper main tone and the upper third IM term, the resultant difference voltage represents the amplitude difference between those components, and serves as a no go indication.

To better understand the signal processing in the path of APC operation, the following analysis, corresponding to the signal processing analysis given by way of FIG. 5, as related to the functioning of the APC loop of frequency control section 4 of FIG. 5 is given. Assuming that now phase lock-in is to occur at its proper location, then the IF balanced modulator outputs of 505 and 506 from channel I and channel II respectively are of similar analytic expression as that at the outputs of balanced modulators 15 and 16 respectively of FIG. 1. Thereupon being applied to separate low pass filters accordingly, then in essence for like reason, the outputs of low pass filters 401 and 402 are of similar analytic expression as that at the outputs of bandpass filters 17 and 18 respectively of FIG. 1 for $M=1$. At this signal process point, rather than undergo further quadratic modulation as shown in FIG. 1, the phase control signal path produces direct quadrature or $\pi/2$ phase shifting of one of the low pass filter outputs LPF402, by way of $\pi/2$ phase shifter 403. Whereas the signal output of LPF401 is expressed as $$\tfrac{1}{2}[\text{Sin }(Wat+\phi 1)-\text{Sin }(Wat+\phi 2)]$$

and that of LPF402 being as $$\tfrac{1}{2}[\text{Cos }(Wat+\phi 1)+\text{Cos }(Wat+\phi 2)]$$

which upon further $\pi/2$ phase change becomes at the output of phase shifter 403

$$\tfrac{1}{2}\Big[\text{Cos }(Wat+\phi 1)+\tfrac{\pi}{2}+\text{Cos }(Wat+\phi 2)+\tfrac{\pi}{2}\Big]$$

or $$\tfrac{1}{2}[\text{Sin }(Wat+\phi 1)+\text{Sin }(Wat+\phi 2)]$$

Thereafter, in combining and summing the two outputs, the following results:

$$\tfrac{1}{2}[\text{Sin }(Wat+\phi 1)-\text{Sin }(Wat+\phi 2)]+\tfrac{1}{2}[\text{Sin }(Wat+\phi 1)+\text{Sin }(Wat+\phi 2)]=\text{Sin }(Wat+\phi 2)$$

Hence, due to the quadratic function operation, one pair of the component terms phase cancel in the summation, while the other pair of terms linearly add in the combining process. In the example case, the resultant singular audio term is representative of the upper main tone frequency. While in an alternative manner, the lower main tone may be used while the other main tone is rejected. This resultant audio frequency, wherein $$Wa = 2\pi fa$$

$$fa = \frac{\Delta F}{2}$$

and $fa = \Delta F/2$ is then used in the phase comparison with the audio reference signal of $\Delta F/2$. In the practical case, $$\left(fa = \frac{\Delta F}{2} \pm \Delta e\right)$$

where $\Delta e$=frequency error, and when in phase lock, $fa = \Delta F/2$ or $f_{IM3}$.

The frequency dial, associated with the tuning of variable frequency oscillator 303 may be accurately calibrated to indicate at 500 kc. p.s. below the frequency value of the local oscillator signal being applied to RF-IF frequency converter 302 and, when phase locking occurs, then gives a direct frequency reading of the mean frequency value of the two tone RF test signal response being produced. A two speed tuning gear mechanism may be used, wherein the rapid speed is usable for coarse type tuning and the slower speed is usable plied for fine tuning adjustment, to bring the translated mean frequency value of the response spectrum within the capture range of the automatic phase control loop system herein described.

Variable frequency oscillator 303 may by itself be of such configuration as to be a substantially stable, well constructed, mechanically tunable, voltage controlled oscillator. Whereas it is intended to provide such wide frequency coverage of say 2–32 mcs., this operation usually is best accomplished by conventional stable tunable oscillator-frequency multiplier arrangement. In a typical embodiment of this nature, the main frequency tuning of the basic range may well be made by substantially linear variable inductance tuning and, accordingly from the description given for the basic unmultiplied tuning range, the control loop bandwidth is therein sufficient to allow automatic phase control action to occur. To thereupon maintain the basic range control bandwidth established, known techniques of range selection frequency translation and frequency division may be herein introduced within the feedback signal path of the ($\Delta F/2$) audio frequency signal that is being error compared to the reference ($\Delta F/2$) audio frequency signal.

Hum test mode

In some SSB systems where first order PM or FM noise may be usually possessed by the injection or local oscillator signals due in part to the main to A-C filament circuits and also power supply ripple on the frequency generating circuits, then such undesired modulation will appear in like amount on all signal components.

With the application of the single frequency test signal $f_{IM3}$, chosen to be placed in its location beyond the center of the pass band region of the system under test sufficiently assuring its second harmonic falling outside the sideband filter or audio output pass band, then the system response output possesses hum components at sideband locations about the translated test signal.

As an added observation in the further utilization of the invention test apparatus of FIG. 5, it is now evident that the test method capability for SSB-ISB communications systems can be readily extended to incorporate a novel hum test mode by way of the following described manner.

The single audio tone test signal $f_{IM3} = f_{a1}$ modulates internally in the transmitter under test and is thereupon translated and appears at the transmitter's output as a single sideband RF signal of say frequency value $$(f_1 + f_{a1})$$

for upper sideband test, where $f_1$ is the output channel frequency to which the transmitter is set tuned.

Where transmitter under test is energized from a 60 c.p.s. power line source, then the existing hum sideband products appear located 60 c.p.s. above and below output signal $(f_1 + f_{a1})$. Likewise sideband products appear due to 120 c.p.s. ripple content of poorly filtered transmitter power supplies at locations 120 c.p.s. above and below the test signal output. Hence $\Delta F/2$ can be equated to 60 c.p.s. The RF-IF converter functions to translate this output response signal such that $(f_1 + f_{a1}) = f_{IF}$. The existence of signal component amplitude at $f_{IF}$ upon subsequent application of the test response to input of the active selective filter unit of the invention test system results in a DC component at the output of the IF balanced modulators which thereinafter can be readily eliminated by having capacitive coupling of the modulator outputs to the succeeding filter stages they are feeding.

The audio frequency operating signals $M\Delta F/2$ accordingly become 60 c.p.s. for $M=1$ and 120 c.p.s. for $M=2$ and the 60 c.p.s signal becomes the audio reference frequency for the phase comparator, and APC operation follows. For the hum test operation an audio amplifier with automatic gain control is inserted in the signal path of the [60 c.p.s. $(\pm)\Delta e$] error signal being applied to the phase comparator to minimize amplitude variation error. Active selective filter unit 300 is thereupon tuned for $M=1$ at 60 c.p.s., and $M=2$ at 120 c.p.s.

Palatineus signal test-total ISB mode

It is of importance in an independent sideband system that the transmitter maintain a constant average output level. Where for example, one of the independent channel outputs become stronger, then the effect of the greater output is to reduce the gain of the weaker channel, so that the weaker sideband is subjected to what is commonly known as syllabic crosstalk. To this extent, ISB systems further employ AGC circuitry that functions to minimize syllabic crosstalk. For intermodulation measurement, AGC systems and the like must be disabled to make the system invarient internally. It is of interest to have an indication of the degree of susceptability to syllabic crosstalk that a particular ISB system under test exhibits; and as so given by this invention.

In general, for independent sideband (ISB) without carrier insertion, the proper output levels of the RF components may be expressed as $USB + LSB = 100$ percent RF out, wherein USB and LSB need not be equal. Once the USB and the LSB percentages have been set, the RF power output is varied and set for rated power output by providing the proper common drive level without altering the sideband proportions in any way.

Now as is well known in the transmission art, it is possible to set the sideband levels in many ways, independently of each other, depending upon the type and form of operation. One may suppose that the maximum total voltage for SSB operation may then be at 100 percent and consist of either LSB content or USB content alone. In the case of ISB operation, both sidebands may be operable at the same time and one may suppose that one-half the available power shall be in each sideband, for unity channel gain ratio. However, it is also possible to apportion the voltages so that one sideband carries more power than the other. For example, the transmission system's channel gain ratio may be factored whereby USB channel gain may be adjusted so that audio peaks drive the system say 20 percent, while the LSB channel is being adjusted for the remaining 80 percent with the total being 100 percent. Such division operation is experienced in practice where the USB channel carries a cuing signal, while the LSB channel handles important information.

Other possibilities normally experienced with separate intelligence occur where voice modulation is in one channel while teletype modulation is present in the other simultaneously.

In view of this nature of practical ISB operation, it is significant then that the defined "palatineus" signal test capability within the IF–RF common section of the transmission system under test most closely relates to being a more satisfactory and useful test and transmission system evaluation criteria than existing prior art techniques, particularly when applied in conjunction with the novel circuit arrangement of the unique output analysis method shown in a typical embodiment by way of FIG. 6.

It is clear that where ISB operation is intended to provide one cuing channel with the other channel supplying the intelligence information, then evaluation of the transmission system's linearity characteristics is best obtained by establishing the test signal level content within the ISB channels of interest closely related to the operation at which the system performs. Failure to do so and allowing like test signal levels to exist would produce a more severe test of the cuing channel, or correspondingly a less indicative test of the full intelligence information channel, and results in measurements that possess difficulties in correlation.

With separate audio gain controls used for each sideband set to produce the level of channel modulation, an RF level setting at the final transmitter power output stage determines rated power. It is of note that metering circuits, as is the case with most VTVM's, have a small amount of waveform error. Due to the presence of modulated envelopes, when the sidebands are independently set to say 50 percent each, the sum may appear as slightly less than 100 percent on the output meter.

With both ISB channels possessing signal content at the same moment, and the gain ratios for separate scan operations individually selectable and of differing levels, the tone amplitude AGC requirements are not pertinent. Relative type measurements are to be secured, and experience with typical measurement data will serve to reflect existing deficiencies if present on a typical ISB transmission system under test.

Relating intermodulation spectra to drive level, the degree of measured distortion is sensitive to the gain ratio of the particular channels. Hence, one may, with suitable calibration, record on succeeding scan operations the relationship between channel gain ratio settings and the dual IM terms under analysis.

Observe now in FIG. 6, the overall ISB test system comprises the elements of the common test signal source section of FIG. 2, the SSB–ISB transmission system under test in the ISB mode position as given by FIG. 3. However, as shown for Mode I in FIG. 6, the audio reference frequency signal of $f_{IM3}$ in position I, and $\Delta F$ and $\Delta F/2$ in position II, are now supplied as an operating signal and a reference signal frequency to the Output Analysis section. The additional novelty of this usage, along with Mode II operation, and the unique performance which results will become clear in the detailed description that follows.

Observe that the elements of FIG. 6 represents the detailed method and apparatus for the test and evaluation of the total ISB transmission system of FIG. 3. The overall apparatus, comprises the test signal source of FIG. 2, wherein further direct use of the generated $f_{IM3}$ signal is made. The resultant dual channel response output of the ISB transmission system under test 300 of FIG. 3, wherein the separate modulation inputs are connected together, undergoes unique signal processing via an advanced technique of intermodulation wave analysis resulting in a frequency response plotting of dual traces of the constant IM3 terms of interest. In essence, the details of FIG. 6 have been partially of concern within the descriptive example embodiments of the FIGS. 1 through 5, and only the additional stages required are detailed in FIG. 6, and described fully in the following paragraphs.

The common test signal source 701 is similar to that shown in detail in FIG. 2, with the following exceptions. The path of $f_C$ from crystal reference, oscillator 105 of FIG. 2, formerly going to harmonic generator 312 of FIG. 4, now becomes $f_c=f_{IF}$ and feeds into the IF common point of poly-modulated quadrature active selective filter 704 in manner similar to that shown for the active selective filter 15 of FIG. 1.

The audio frequency signal of $f_{IM3}$ from the output of amplifier stage 118 of FIG. 2 is also being supplied over three additional paths. One path feeds via position I of selector switch 701a at the Mode I signal input of audio double balanced modulator 707; a second path connects to contact 1 of selector switch 709, with the third path going to contact 1 of selector switch 711.

Finally, the frequency output $f_{11}=f_{s1}=f_s \mp \Delta f_d$ of audio swept frequency oscillator 101 of FIG. 2 formally applied to FIG. 4 is now being statically applied to the carrier input of double balanced modulator 707, as required in calibration.

The resultant test signal output of test signal source 701, shown by spectrum sketch 702a, is applied as the common test input to SSB-ISB transmission system under test 702, which is like that of FIG. 3, with the channel select switch 201 set at the T position for total test. Where it is found more desirable to have the differing phase relation for the two frequency test signal such that discrepancies resulting from first-order phase modulation sidebands become more discernible; then, as done for the common test signal input of FIG. 5, a phase shift operation may be inserted prior to one of the test signal channel inputs of the ISB system.

As an alternative, note well, that if either one of the ISB audio channels is made inactive, the overall test resembles closely the SSB test mode already described except for the output analysis.

With differing intelligence to be transmitted, the input signals are dissimilar and this fact accounts for a resultant wave at the channel combiner output which departs from the conventional carrier suppressed double sideband amplitude modulated wave. It is known that double sideband modulation represents the carrier as shifted oppositely in phase by the respective sidebands. In actual ISB modulation a resultant SSB modulated type wave results having components of phase modulation and associated amplitude modulation components. In this respect, the test signal applications of FIG. 5 as already described and the forthcoming description of FIG. 6 suitably meet these practical conditions.

The transmission system's spectrum response output becomes similarly expressed as a "palatineus" signal shown by spectrum sketch 702b. This newly generated test signal spectrum development has as a prerequisite its regal type authority by establishing a spectrum band between the companion pair LSB-IM3 and USB-IM3 constant frequency IM terms free of frequency components. As herein recognized, the spectrum domain existent between the distortion developed static frequency terms dominates or rules by being disposed between the innermost "pal" components formulating a stationary two frequency type structure. Equally characteristic is the more subtle upset of phase correlation as dual ISB sidebands for the fixed "pal" like IM terms allowing for random phase even for common signal input to the ISB modulation. The generation of this type of signal relies on the regal component free spectrum properties from the plurality of differing radio swept dual frequency tones, and of non-unity gain ratio thereby constituting its definition.

ISB transmission system under test 702 here mainly illustrates the audio channel and the RF metering and gain controls to give a clearer understanding of the types of operation that take place in the course of sweep excursion cycles.

The USB channel I gain control and USB meter controls and indicates the USB channel audio level, while LSB channel II gain control and LSB meter set and indicate the LSB channel audio level of ISB transmission system under test 702. The output gain control and RF out meter relate to the setting and measurement of the transmitter output level.

The high frequency ISB transmission response output of sketch 702b represents the frequency translation of the designated "palatineus" signal with the degree of non-linearity of the common IF-RF stages further contributing to the intermodulation content with a like frequency distribution. The tuning operation of front end section 703 translates the output response spectrum to position the center frequency location of the spectrum to a new value coincident with the $f_{IF}=f_c$ value; and the stabilized and properly translated spectrum becomes the common input signal to the filter arrangement 704. Much in the described manner of FIG. 1, the first local oscillator signal tunes to $(f_o+f_{IF})$ except frequency synthesizer 14 of FIG. 1 which is replaced by a stabilized translation operation featuring single audio signal AFC.

Spectrum sketch 703a shows the intermediate frequency spectrum response as supplied from the output of front end section 703 which is similar in detail to the stages 301 through 308 that comprise front end section 300 of FIG. 4. Section 703 receives two other signals, one input signal being the audio phase reference signal and the other input supplied as the error bearing signal in the automatic phase comparison and correction operation. The audio reference signal is obtained from the wiper of selector switch 709, and the error signal input is supplied from the wiper of selector switch 715.

With the common audio carrier signal $f_a$ supplied to the second pair of audio modulators of selective filter arrangement 704 ($f_a=f_{IM3}$ in position 1), the filter 704 output is $2f_{IM3}$, and for $$fa=\frac{\Delta F}{2}$$

in position 2, the $2f_a$ output becomes $\Delta F$.

Mode I operation, that is, with selector switch 701 in position I and $f_1$ being static, generates both $\Delta F$ and $\Delta F/2$ signals in similar manner as described with reference to FIG. 5. Here double balanced modulator 707 produces sum and difference products in its output, which are fed to low pass filter 708. Low pass filter 708 having its cut-off frequency set slightly greater than $\Delta F$, passes only the lower sideband term of $(f_1-f_{IM3})=\Delta F$ and readily suppresses all other frequency terms. The output of LPF 708 is applied over three paths. One path connecting directly to contact 2 of selector switch 709, another path feeding half frequency divider ($\div 2$) 710. Divider 710 produces an output of $\Delta F/2$ which is connected to contact 2 of selector switch 711.

The third path of LPF 708 output is applied to difference frequency converter 701b and functions in the Mode II operation for the linear development of $f_{IM3}$ when required, as aforementioned with respect to the embodiment of FIG. 2.

In this alternative manner of Mode II, selector switch 701a feeds $f_{2i}$ as one input to double balanced modular 707. The other input to modulator 707 becomes $f_{1i}$ for Mode II.

The lower sideband instant amount difference frequency signal output becomes $\Delta Fi=(f_{2i}-f_{1i})$ which is passed by low pass filter 708.

The instantaneous lower tone signal $f_{1i}$ being applied as the other input to difference frequency converter 701b, develops a lower sideband difference frequency signal in the difference frequency converter 701b output of $(f_{1i}-\Delta F_i)=f_{IM3}$. This passed difference output of $f_{IM3}$ connects to the wiper of switch 701c, which for Mode II is in position II and serves in replacing the previously directly supplied $f_{IM3}$ term of the test signal source.

The active selective filter arrangement of 704 has two separate frequency positions, with two selectable low pass filter cut-off frequencies of $f_{co}=f_a=f_{IM3}$ or $\Delta F/2$ where $$\frac{\Delta F}{2}=(f_1-f_{IM3})$$

$f_1$ being static in Mode I case and instantaneous $f_{1i}$ in the Mode II case.

The USB ($2f_a$) signal output of filter section 704 is applied over two paths; one being to CRT-USB display section 705 and the other to contact A of selector switch 712. Similarly, the LSB ($2f_a$) signal output is applied to CRT-LSB display section 706 over one path, and also to contact B of selector switch 712.

CRT display sections 705 and 706 are supplied by a common sweep synchronization voltage from the sweep voltage generator 102 of FIG. 2.

The CRT display section 705 (and 706) are like CRT display section detection and vertical amplification stages 27 (and 28) CRT indicators 29 (and 28) as per FIG. 1.

The wiper of selector switch 712 connects over two paths, one path passing through AGC controlled audio amplifier 713 to the input of half frequency divider ($\div 2$) 714. The other path leads to contact 2 of selector switch 715. The output of frequency divider 714 connects to contact 1 of selector switch 715.

The wiper of selector switch 715 passes the audio error signal to the phase-frequency comparator of Section 703.

AGC controlled audio amplifier 713 serves to insure of a relatively constant amplitude for the error feedback signal of $2f_{IM3}$ applied as an input to frequency divider 714.

It is shown that selector switches 709, 711, and 714 are mechanically ganged along with the switchable two position low pass filter cut-off frequency control of the active selective filter arrangement 704.

Position 1 for $f_a=f_{IM3}$ is the normal total ISB test mode, while position 2 for $$f_a=\frac{\Delta F}{2}$$

pertains to a static main tone calibration test mode. Here, the audio sweep frequency excursion is disengaged such that the frequency deviation $\pm\Delta f_d$ equals zero.

For the resultant stationary two tone test signal the conventional intermodulation spectrum response develops at the output of the transmission system under test 702. Also the audio output of low pass filter 708 is the fixed audio frequency separation signal of $\Delta F$ value. The tuning of front end section 703 is made such that the mean frequency location between the two static main tone test response signals coincides to the IF value of the filter arrangement 704.

In this calibration mode, filter 704 variable low pass filters are set to a cut-off frequency value of $$f_{co}=f_a=\frac{\Delta F}{2}$$

and the common audio carrier signal to the second quadrature modulator pair is $$f_a=\frac{\Delta F}{2}$$

The dual output of filter 704 becomes $2f_a=\Delta F$, which thereupon is fedback as the error signal via frequency control loop operation. The subsequent CRT beam deflection is then proportional to the main tone amplitude and when going into ISB test position 1, a relative amplitude evaluation of the frequency response tracing of the IM3 term can be made.

In the total ISB test, the conventional sequential frequency scanning type spectrum analysis methods as well as other prior art techniques, are impractical in providing as complex an analysis as that attainable through the use of the hereinbefore described "palatineus" signal test and analysis system.

ISB type transmission systems are presently in use where the lowest acceptable audio frequency value is 250 c.p.s., and testing of such systems including those of lower audio range, say 150 c.p.s., that the featured values of the frequency governed highly selective filter output analysis means of FIG. 6 become evident. The full utility and benefit of the filter is evident when one further considers that like active selective filter channels are in simultaneous use, and that the relative frequency response traceouts may be readily correlated with one another in a comparative evaluation of differing level conditions for the two sideband transmission channel operations.

By way of the novel test signal generation is the embodiment of FIG. 2 and the further judicious selection of the "palatine" area being derived from the pal pair of sweep frequency relationship, in conjunction with the dual channel filter operation, analysis is readily made of the intermodulation distortion product of interest, that is, the 3rd odd order terms of $(2f_m-f_n)$. From the earlier described ISB test mode, the two constant IM capability is evident. Handling of the "palatineus" signal test in the total ISB test mode are as follows:

In the example embodiment of FIG. 5, one makes note of the inverting property of the lower sideband channel and the desirability to obtain the IM3 term of the lowest acceptable audio frequency value, say 250 c.p.s. Upon combining of the two channel response, the LSB-IM3 terms and the USB-IM3 terms symmetrically space themselves about the transmission system carrier frequency, $f_{oo}$, and the difference frequency becomes 2 times $f_{IM3}=500$ c.p.s.

Having predetermined the location of the 3rd IM constant frequency term in the given example at 250 c.p.s., and sweep excursion values chosen in accordance with the active filter output analyses arrangement of FIGS. 1 and 5, the spectrum area between the IM3 term is void of any spectrum components and coincidence of any other developed term with the fixed IM3 term is prevented. Since the total separation becomes $2f_{IM3}$ or 500 c.p.s., then the minimum audio frequency separation of $\Delta F$ must be greater, say 600 c.p.s. Therefore, the minimum lowest frequency value of the lower main tone audio frequency of $f_1$ in the course of the test signal sweep excursion becomes $(f_{IM3}+\Delta F)=850$ c.p.s. It is advantageous to have a like amount of sweep width for the ISB test mode as for the SSB test mode exemplified by FIG. 2. that is, a two to one relationship of (1500 c.p.s. to 750 c.p.s.). Hence, main audio tone $f_1$ transverses from 850 c.p.s. to 850+750 or 1600 c.p.s. or $\mp 375$ c.p.s. about 1225 c.p.s. Accordingly in a similarly derived manner, upper main tone $f_2$ is expressed as 2200 c.p.s. $\mp 750$ c.p.s. Since the 5th IM terms (LSB and/or USB), locate themselves $\Delta F$ c.p.s. away from the 3rd IM terms, and the lowest $\Delta F$ value used is 600 c.p.s., possible coincidence between the 3rd term and 5th term is precluded, and adequate component separation exists to allow ready filtering by the active selective arrangement of FIGS. 1 and 5. The $\Delta F_i$ term is expressed as $975\mp375$ c.p.s.

With but minor modification it becomes evident that the Palatineus Signal Analyses method and the apparatus embodiment of FIG. 6 is capable of dual frequency response analysis of the total ISB transmission systems for the $IM_5$ pal disposed pair.

For the development of the $f_{IM5}$ signal in place of the $f_{IM3}$ previously used, the frequency values of the common test signal source 701 (also see FIG. 2) are changed in accordance with the procedure for the derived example values of $f_{IM3}$ used in FIG. 6.

As a typical example where the ISB bandpass region covers say 250 c.p.s. to 3200 c.p.s., then for plotting of LSB and USB constant IM5 terms, the relationships of $$f_{1i}=1825\mp375 \text{ c.p.s.}$$

$$f_{2i}=2612.5\mp562.5 \text{ c.p.s.}$$

and $$\Delta F_i=787.5\mp187.5 \text{ c.p.s.}$$

which in turn produces $$f_{IM5}=250 \text{ c.p.s.}$$

It now becomes of final interest to demonstrate the ready accomplishment of the SSB only test mode by way of the further utilization of the active selective filter arrangement 15 of FIG. 6. Let the test signal of 702a be applied to only but one audio channel input, say for example, the upper sideband (USB) channel of the ISB transmission system under test 702. Novel use in this method of SSB test is made of the carrier signal reinsertion capability that is a conventional feature of typical ISB transmitters. A small amount of carrier signal is provided after the linear combiner stage of the transmitter, and inserted into IF-RF common bandpass region. Hence the resultant composite spectrum now formed is of the type whereby the carrier component injected and the constant frequency IM3 distortion component that develops constitute a static two frequency signal themselves. At the transmitter 702 output, the fixed audio frequency separation between the static components is $f_{IM3}$ c.p.s. and the mean frequency value $$\left(f_o+\frac{f_{IM3}}{2}\right)$$

The audio carrier input to filter arrangement 15 is $f_{IM3}/2$, which may be obtained by simple frequency division by two of the constant audio frequency IM term of $f_{IM3}$ from test source 701.

Frequency translation section 703 is tuned to $$\left(f_o+\frac{f_{TM3}}{2}+f_{IF}\right)$$

for proper frequency conversion of the SSB test response spectrum to the center frequency input of filter arrangement 15.

In accordance with the prior description of active selective filter arrangement 15 operation, it is tuned to have its low pass filters cut-off at $f_{IM3/2}$ c.p.s., the sum USB output of value $f_{IM3}$ c.p.s. and proportional to the amplitude of the constant frequency IM3 term is applied to display section 705 for the frequency response plot. The other difference LSB output is also $f_{IM3}$ and proportional to the injected carrier signal amplitude and connects to position B of selector switch 712. Feeding then by way of position 2 of selector switch 715, which in this case is not ganged to switch 709 or 711, the LSB output $f_{IM3}$ signal becomes the error signal input to frequency translation section 703 in the automatic phase control operation to be phase compared with the test signal source 701 generated $f_{IM3}$ reference signal input. Of course, the dual AGC operation as disclosed and described in the circuits arrangement of FIG. 4 is still in effect for the amplitude control of $MT_1$ and $MT_2$ at the test signal generating circuitry of FIG. 2. In this alternate manner of SSB test where a low amount of carrier insertion is applied, the audio frequency automatic frequency stabilization operation the filter arrangement 15 as described replaces the AFC operation of FIG. 4.

The measurement techniques that make use of active selective filter arrangement 15 may, if desired, be operated in an alternative manner than hereinbefore described. Note that in accordance with the signal processing action of active selective filter 15, each combiner network 25 and 24 respectively, has a two component output representation of the two frequency IM component input. Earlier, one term being DC is readily removed, and the other term being AC signal of $2f_{IM3}$ is thereafter used. The AFC operation that for $2f_{IM3}$ as the error correction signal is unchanged. However, by way of separate vertical amplification and direct connecting CRT paths, without a detector, the response of the DC terms from combiner 25 and 24 of FIG. 1 plot on respective CRT 28 and 29 screens as the IM distortion.

The palatineus signal test and analysis system of FIG. 6 may be fully utilized since once the described ISB mode AFC operation is in effect by the correction control of one resolved sideband term, say USB-$f_{IM3}$; then the other LSB channel content may be omitted or reduced to zero resulting in a SSB only type test mode of the remaining USB channel.

In summary, it has been disclosed with detail that the practical embodiment of FIG. 6 along with the block diagram of FIG. 1 illustrates the use of the dual swept audio frequency signal to obtain the plotting of the constant main intermodulation LSB and USB term response characteristics in the high frequency output of an ISB-SSB transmission system via the highly selective reception, detection and plotting of these dual static RF frequency components. In the SSB-ISB common distortion test mode, wherein FIGS. 2, 3, 4 and 5 are the practical example in one form, it is to be understood and maintained that the systematic arrangement of the combination of these designated circuit blocks in the manner shown, and the pattern of performance resulting from these methods of system operation, as described herein are likewise applicable to test and evaluation of multichannel transmission systems, and further by those skilled, test of such receiving systems.

As the methods and apparatus of the present invention are not intended to be frequency limited or restricted to systems, it now appears to one experienced in the art that the audio two tone generation source of FIG. 2, the operating signal generation being produced is directly operable with the test system's output analysis sections shown in FIG. 4 and 5 in the intermodulation distortion test and evaluation of audio devices and active units such as audio filters and audio amplifiers.

In a similar manner as for an RF two tone type generator source like FIG. 2, the test system is equally usable in direct operation with the RF output analysis apparatus shown in FIGS. 4 and 5 in the intermodulation distortion test and evaluation of RF devices and active units such as RF filters and RF amplifiers. The described method and illustrated apparatus is thus universal in intermodulation distortion test and measurement, and is herein shown in only its most advantageous and novel implementation, as a SSB–ISB communication system linearity test method.

It is to be observed that the block diagrams and circuit stages illustrated show only the functional elements that are necessary to explain the operation made of this intermodulation wave analysis and distortion type test system, and that other instruments may contain many more conventionally known features, depending upon its specific design and further applications.

While the preferred embodiments of this invention as illustrated by the associated drawings and set forth in the specification by way of example has been presented and explained; it is clear that further modifications will become apparent to others skilled in the art. It is thereby not intended to have this invention limited by the particular arrangements shown and described. It is therefore desired that such variations occurring be considered as falling within the true spirit and scope of this invention as defined in the appended claims.

I claim:

1. a circuit arrangement for the measurement of intermodulation distortion of an Independent Sideband transmitter having:
   a pair of variable gain modulating channels,
   a linear combiner connected to receive the outputs of said channels and
   a common IF–RF transmitter output stage connected to the output of said combiner, which comprises
   means for generating a pair of sweeping signals $f_1$ and $f_2$ wherein $f_2$ is swept at twice the rate of $f_1$, and $f_2$ is audio shifted with respect to $f_1$ by an amount $n$ wherein $n$ is an odd order of intermodulation distortion $f_{IM_n}$ to be measured, and having an output connected simultaneously to the inputs of said channels,
   a stable frequency translator connected to the output of said common stage and translating the input thereto to a fixed Intermediate Frequency,
   an active selective filter means for passing only that band of frequencies between the $n^{th}$ order intermodulation terms ($f_{IM_n}$) and including said terms and having a pair of outputs, one of said outputs being the upper sideband of $f_{IM_n}$ terms and the other the lower sideband $f_{IM_n}$ term,
   indicating means connected to receive both of said outputs of said filter and simultaneously indicating the amplitudes thereof as a function of frequency of said signals.

2. The arrangement according to claim 1, wherein said indicating means is a dual sweep oscilloscope and said means for generating includes a sweep generator having its output coupled to the sweep of said oscilloscope for synchronization thereof.

3. The arrangement according to claim 2, wherein said means for generating a pair of sweeping tones includes
   means for generating a swept tone signal $f_1$
   a source of carrier frequency signal $f_c$
   means for combining the outputs of said swept tone $f_1$ generation means and said source to produce an output swept $f_c+2f_1$,
   a series intermodulated feedback loop circuit having connected therein
   a first balanced modulator with one input receiving said source output and its output connected to the one input of
   a second balanced modulator, the other input thereof receiving the output of said means for combining and having its output connected to a
   first low-pass filter having its output connected to one input of
   a combiner which has its other input connected to receive the output of said means for generating said tone signal $f_1$ and having its output connected to a non-linear device which has its output connected to a
      second low-pass filter for passing only the $n^{th}$ order intermodulation distortion term $f_{IM_n}$ generated in said non-linear device, and having its output connected to the other input of said first balanced modulator,
      an oscillator means for generating a signal frequency $f_{IM_n}$,
      a momentary switch connected between the output of said oscillator means and the said other input of said first balanced modulator whereby when said switch is momentarily operated the output of said combiner is a stable pair of equal amplitude swept tones one sweeping at twice the rate of the other and being audio shifted therefrom by $f_{IM_n}$.

4. A circuit arrangement for generating a stable pair of swept frequency tones for the measurement of intermodulation distortion which comprises:
   means for generating a swept tone signal $f_1$
   a source of carrier frequency signal $f_c$
   means for combining the outputs of said swept tone $f_1$ generation means and said source to produce an output swept $f_c+2f_1$,
   a series intermodulation feedback loop circuit having connected therein
      a first balanced modulator with one input receiving said source output and its output connected to the one input of
      a second balanced modulator, the other input thereof receiving the output of said means for combining and having its output connected to a first low-pass filter having its output connected to one input of a combiner which has its other input connected to receive the output of said means for generating said tone signal $f_1$ and having its output connected to a non-linear device which has its output connected to a second low-pass filter for passing only the $n^{\text{th}}$ order intermodulation distortion term $f_{\text{IM}_n}$ generated in said non-linear device, and having its output connected to the other input of said first balanced modulator, an oscillator means for generating a signal frequency $f_{\text{IM}_n}$, a momentary switch connected between the output of said oscillator means and the said other input of said first balanced modulator whereby when said switch is momentarily operated, the output of said combiner is a stable pair of equal amplitude swept tones with one sweeping at twice the rate of the other and being audio shifted therefrom by $f_{\text{IM}_n}$.

5. The arrangement according to claim 4, wherein said oscillator means is a synchronous type oscillator connected to receive its sync signal from the output of said second low-pass filter and having its output connected directly to the other input of said first balanced modulator.

6. A circuit arrangement for the generation and combining of two separate sweep tones of equal amplitude and like direction but having differing deviation ratio which comprises:

a variable sweep frequency audio frequency generator having a sawtooth sweep voltage generator and a voltage controlled audio oscillator, a source of stable reference frequency higher than the frequency of said audio generator, a first balanced modulator having connected to its inputs the outputs of said audio sweep generator and said stable source, a first upper sideband filter connected to receive the output of said first modulator for passing only the upper sideband frequencies thereof, a second balanced modulator having connected to one of its inputs the outputs of said audio sweep generator and said first sideband filter, a second upper sideband filter connected to the output of said second balanced modulator for passing only the swept sum frequencies at the output thereof, a third balanced modulator having connected to one of its inputs the output of said source of reference frequency, frequency generation means for providing a signal at a frequency value equal to the difference between twice the lower valued tone to be generated and the higher valued tone to be generated, connecting means for applying the output of said frequency means to another input of said third balanced modulator, a third upper sideband filter connected to the output of said third balanced modulator for passing static sum frequency at the output thereof, a fourth balanced modulator having connected to its inputs the outputs of the said second and the said third upper sideband filters, a first low-pass filter connected to pass therethrough only the difference frequency output of said fourth balanced modulator, a linear summation means for additively combining its input to provide the output of a combined pair of equal amplitude first tone and second tone sweeping frequencies, a first variable gain amplifier connected to receive the output of said first low-pass filter and passing only the sweeping difference frequencies and having its output connected to one of the inputs of said linear combining means, said amplifier output thereby providing higher valued said second tone of said separate pair sweep tones being combined, a second variable gain amplifier connected to receive the output of said audio sweep generator and passing the generated sweep frequencies as of equal amplitude to the output level of said first variable gain amplifier, then having its output connecting to the other input of said linear combiner means whereby the output thereof is the other lower valued said first tone of said separate sweep tones being added, which sweeps in a same directional sense and at one-half the sweep width amount of said second tone of said separate tones, a level adjustment means receiving the output of said linear summation means whereby the adjusted output thereof serves as a test signal input for the frequency response determination of the linearity characteristics of SSB-ISB transmission systems, a non-linear means to receive the output of said linear summation means whereby said non-linear means produces intermodulation products of said combined pair of first and second sweep frequency tones, a second low-pass filter connected to pass therethrough only the constant frequency intermodulation product term of value that is equal to the difference between twice lower valued said first tone and the higher valued said second tone, an automatic gain controlled audio amplifier connected to the output of said second low-pass filter, and having at said AGC'ed amplifier output a substantially constant amplitude signal of said constant frequency intermodulation product term, whereby said constant frequency intermodulation signal synchronizes said frequency generation means connected input to said third balanced modulator thereby stabilizing the signal generation action of the said circuit arrangement.

7. Circuit apparatus to check the distortion introduced by the total stages of an Independent Sideband (ISB) transmitter also having both Lower-Sideband (LSB) and Upper Sideband (USB) as dual channels operable with each being capable of handling separate, different intelligence, and separate inputs to each of said dual channels comprising:

a source of two non-harmonic sweep tones of equal amplitude, sweeping in like directions with one sweeping twice the sweep width of the other, and having output terminals for each of said sideband channels, and for both in common, electrical means connecting one of said output terminals to one of said channels and the other of said terminals to the other of said channels, both said channels receiving thereby in common said source, selectable, variable translation converter means for translating down in frequency the output of said transmitter total stages including the pair of constant frequency third order intermodulation terms LSB-$f_{\text{IM}_3}$ and USB-$f_{\text{IM}_3}$ thereof, about some intermediate frequency having connected thereto said output of said transmitter, resolving active quadrature filtering means for further converting down in frequency the constant frequency outputs of said translation means to a reference audio frequency of twice $f_{\text{IM}_3}$ frequency value and connected to the output of said translation means, detector and amplification pair means for detecting the pair of outputs of said resolving means, a sweep sawtooth voltage source of a sweep period equal to the period of said sweep tones, a pair of indicator means for coordinately and continuously plotting the relationship of two input signal levels, of LSB-$2f_{IM3}$ and USB-$2f_{IM3}$.

connecting means applying to one pair inputs of said pair indicator means, the outputs of said detector pair means and to the other inputs, said sawtooth source, whereby said indicator will display the total 3rd odd order distortion amplitude introduced by said inependent sideband transmitter stages as a function of frequency.

8. The circuit apparatus according to claim 7, wherein said translation converter means comprises:
a variable frequency synthesizer having a reference frequency input,
a source of stable reference frequency connected to said reference frequency input whereby said synthesizer will generate a single frequency equal to $f_{IM3}$ plus a multiple (N) of said reference frequency,
a frequency converter having a mixer and amplifier and having connected to one of its inputs the output of said synthesizer.

9. The circuit apparatus according to claim 8, wherein said resolving means comprises:
a pair of frequency converters,
a frequency multiplier of factor $(N+1)$ and having connected to its input said source of stable frequency and its output connected to one input of said pair of converters.

10. The circuit apparatus according to claim 9, wherein said indicator means is a cathode ray oscilloscope and said one pair input thereto are the vertical deflecting plates and the said other input is the horizontal deflection.

11. An AFC and frequency stabilized frequency translation closed loop circuit for translating a pair of equal amplitude, sweeping tone signals $f_1$ and $f_2$ of like scan direction and the audio difference $\Delta F_i$ frequency between said pair of tones is being linearly varied such that one odd order difference frequency modulation component term is of constant frequency location of $f_{IM_k}$, is positioned at a pre-determined first intermediate frequency of $f_{IF_1}$ comprising:
a first frequency converter receiving said pair of sweeping tone signals of $f_1$ and $f_2$ as a first signal input,
a voltage controlled local oscillator generating a first local oscillation signal at a frequency of $(f_{IM_k}+f_{IF_1})$, where $f_{IF_1}$ is said first intermediate frequency value, and having its output connected to the other input of said first frequency converter,
a second frequency converter receiving the output of said first converter as its signal input,
a source of single crystal controlled reference signal of frequency value $f_{IF_2}$, where $f_{IF_2}$ is a second intermediate frequency value,
a frequency multiplier of factor "$n$" having said single reference frequency $f_{IF_2}$ as its input,
said frequency multiplier output applied as second local oscillator input to said second frequency converter,
a narrow bandwidth band-pass filter of center frequency value $f_{CF}=f_{IF_2}$ receiving difference product odd order distortion output of said second frequency converter,
said bandpass filter passing only said constant frequency intermodulation component term of $(f_{IF_2}(\pm)\Delta\epsilon)$ where $\Delta\epsilon$ solely represents frequency translation error of first frequency conversion operation which is being minimized,
a first upper sideband (USB) filter receiving a portion of said output of said first converter as its signal input,
and passing only difference frequency products above $f_{IF_1}$,
a first balanced modulator receiving the output of said first USB filter as its signal input,
a second balanced modulator receiving a portion of said local oscillator input as its carrier input,
a source of audio swept frequency $f_{1a}$ producing an amount of frequency deviation equal to frequency deviation of said sweeping tone signal $f_1$, but swept in an opposite direction,
said audio sweep source connected to the signal input of said second balance modulator,
a second USB filter receiving the output of said second balanced modulator, and passing only the sum products thereof,
said second USB filter sum product output applied as carrier input to said first balanced modulator,
a second crystal reference source of $(f_{IF_2}+f_{IM_k}$ audio), where $f_{IM_k}$ audio represents the audio frequency amount of $f_{1a}-\Delta F_i$,
a second narrow bandwidth bandpass filter of center frequency value $f_{CF}=(f_{IF_2}+f_{IM_k}$ audio) receiving output of said first balanced modulator, and passing only the constant frequency component,
a frequency discriminator and phase comparator combination with a center frequency reference of $f_{CF}=(f_{IF_2}+f_{IM_k}$ audio) and said phase comparator stage receiving an input from said second crystal source,
said frequency discriminator and phase comparator receiving their error signal from said second bandpass filter,
said frequency discriminator-phase comparator combination responding to said error signal input and closing an automatic frequency control loop by applying the correction voltage output to control said voltage controlled local oscillator frequency input, whereby the constant frequency terms of $f_{IM_k}$ of said input signal to said first converter is exactly frequency translated to be positioned at frequency value $f_{IF_1}$, and stabilized thereat in an automatic control manner.

References Cited
UNITED STATES PATENTS

| | | |
|---|---|---|
| 2,381,940 | 8/1945 | Wallace. |
| 2,705,742 | 3/1955 | Miller. |
| 2,954,465 | 9/1960 | White. |
| 2,958,729 | 11/1960 | Licklider. |
| 2,987,586 | 6/1961 | Berger _____ 179—175.3 |
| 3,119,062 | 1/1964 | Codd. |
| 3,231,819 | 1/1966 | Aaron _____ 325—65 |
| 3,241,059 | 3/1966 | Wu _____ 324—77 X |

JOHN W. CALDWELL, *Primary Examiner.*

B. V. SAFOUREK, *Assistant Examiner.*